United States Patent
Kim et al.

(10) Patent No.: US 8,982,766 B2
(45) Date of Patent: Mar. 17, 2015

(54) SIGNAL TRANSMISSION METHOD PERFORMED BY RELAY STATION IN WIRELESS COMMUNICATION SYSTEM AND APPARATUS THEREOF

(75) Inventors: Hak Seong Kim, Anyang-si (KR); Han Byul Seo, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 323 days.

(21) Appl. No.: 13/264,847

(22) PCT Filed: Apr. 15, 2010

(86) PCT No.: PCT/KR2010/002321
§ 371 (c)(1),
(2), (4) Date: Oct. 17, 2011

(87) PCT Pub. No.: WO2010/120124
PCT Pub. Date: Oct. 21, 2010

(65) Prior Publication Data
US 2012/0044857 A1 Feb. 23, 2012

Related U.S. Application Data

(60) Provisional application No. 61/169,680, filed on Apr. 15, 2009, provisional application No. 61/172,177, filed on Apr. 23, 2009, provisional application No. 61/183,046, filed on Jun. 1, 2009.

(30) Foreign Application Priority Data

Apr. 14, 2010 (KR) ........................ 10-2010-0034097

(51) Int. Cl.
*H04J 3/08* (2006.01)
*H04B 7/26* (2006.01)
(Continued)

(52) U.S. Cl.
CPC .......... *H04B 7/2606* (2013.01); *H04B 7/15528* (2013.01); *H04L 5/0053* (2013.01)
USPC ........... 370/315; 370/203; 370/252; 370/319; 370/330; 370/344; 370/436

(58) Field of Classification Search
None
See application file for complete search history.

(56) References Cited

U.S. PATENT DOCUMENTS 8,503,348 B2 * 8/2013 Kim et al. .................. 370/314
8,565,184 B2 * 10/2013 Seo et al. .................. 370/330
(Continued)

OTHER PUBLICATIONS

Research in Motion, UK Ltd., "Relay Link Control Signalling", 3GPP TSG RAN WG1 Meeting #56bis, R1-091151, Mar. 2009.
(Continued)

*Primary Examiner* — Willie J Daniel, Jr.
(74) *Attorney, Agent, or Firm* — Lee, Hong, Degerman, Kang & Waimey

(57) ABSTRACT

Disclosed is a signal transmission method performed by a relay station in a wireless communication system. The method comprises the steps of: arranging guard time within at least one symbol period in a subframe which is configured with multiple symbol periods in a time domain; and transmitting a control signal or data to a base station by using symbol periods except for the symbol periods which include the guard time in the subframe. The guard time is equal to or shorter than one symbol period. The structure in which the control signal or the data is arranged in each symbol period of the subframe is determined on the basis of the number of symbol periods except for the symbol periods which include the guard time.

6 Claims, 53 Drawing Sheets

(51) Int. Cl.
*H04B 7/155* (2006.01)
*H04L 5/00* (2006.01)

(56) References Cited

U.S. PATENT DOCUMENTS

| | | | |
|---|---|---|---|
| 8,780,843 B2* | 7/2014 | Kim et al. | 370/329 |
| 2005/0237918 A1* | 10/2005 | Asai et al. | 370/203 |
| 2007/0081502 A1 | 4/2007 | Lee et al. | |
| 2011/0228722 A1* | 9/2011 | Noh et al. | 370/315 |
| 2011/0299614 A1* | 12/2011 | Kim et al. | 375/260 |

OTHER PUBLICATIONS

LG Electronics, "Resource Allocation and Downlink Control Channel Structure for Relay Backhaul Link", 3GPP TSG RAN WG1 Meeting #56bis, R1-091194, Mar. 2009.

* cited by examiner

| : Subcarrier on which SRS is transmitted
| : Subcarrier on which R-SRS of relay group 1 is transmitted
| : Subcarrier on which R-SRS of relay group 2 is transmitted
| : Subcarrier on which R-SRS of relay group 3 is transmitted
| : Subcarrier on which R-SRS of relay group 4 is transmitted (a)

(b)

SIGNAL TRANSMISSION METHOD PERFORMED BY RELAY STATION IN WIRELESS COMMUNICATION SYSTEM AND APPARATUS THEREOF

CROSS-REFERENCE TO RELATED APPLICATIONS

This application is the National Stage filing under 35 U.S.C. 371 of International Application No. PCT/KR2010/002321, filed on Apr. 15, 2010, which claims the benefit of earlier filing date and right of priority to Korean Application No. 10-2010-0034097, filed on Apr. 14, 2010, and also claims the benefit of U.S. Provisional Application Ser. Nos. 61/169,680, filed on Apr. 15, 2009, 61/172,177, filed on Apr. 23, 2009, and 61/183,046, filed on Jun. 1, 2009, the contents of which are all hereby incorporated by reference herein in their entirety.

TECHNICAL FIELD

The present invention relates to wireless communication and, more particularly, to a method and apparatus in which a relay station transmits a signal in a wireless communication system.

BACKGROUND ART

In the ITU-R (International Telecommunication Union Radio communication sector), a standardization work for IMT (International Mobile Telecommunication)-Advanced (i.e., the next-generation mobile communication system after the third generation) is in progress. IMT-Advanced sets its goal to support IP (Internet Protocol)-based multimedia service at the data transfer rate of 1 Gbps in stop and slow-speed moving states and of 100 Mbps in a fast-speed moving state.

One of the powerful candidates as a system standard to satisfy the requirements of IMT-Advanced is LTE-A (Long Term Evolution-Advanced) of 3GPP (3rd Generation Partnership Project). LTE-A is an improved version of 3GPP LTE (hereinafter referred to as 'LTE'). LTE is part of E-UMTS (Evolved-UMTS) using an E-UTRAN (Evolved-Universal Terrestrial Radio Access Network). The LTE adopts OFDMA (Orthogonal Frequency Division Multiple Access) in downlink and SC-FDMA (Single Carrier-Frequency Division Multiple Access) in uplink.

In the LTE-A, consideration is taken of a relay station to be included in a wireless communication system. The relay station functions to extend the cell coverage and improve transmission performance. A base station can have an advantage of extending the cell coverage by servicing mobile stations, located in the cell coverage thereof, through relay stations. Further, since the relay stations improve transmission reliability between the base station and the mobile stations, the transmission capacity can be increased. A relay station may be utilized in the case in which a mobile station is located in a shadow region although it is within the coverage of a base station.

A relay station commonly divides subframes into a reception subframe for receiving a signal from a mobile station connected thereto and a transmission subframe for sending a signal to a base station in order to prevent self-interference. Here, guard time needs to be placed in the reception subframe or the transmission subframe of a signal. The guard time is used for stabilization and the prevention of interference according to the transmission/reception switching of a signal in a relay station. If the guard time is included in the transmission subframe, available time resources that the relay station can transmit a signal to the base station are reduced.

Meanwhile, in a wireless communication system environment, fading is generated owing to multi-path time delay. A process of restoring a transmission signal by compensating for the distortion of the signal, generated owing to an abrupt change in the environment due to fading, is called channel estimation. In general, channel estimation is performed using a reference signal (RS) known to both a receiver and a transmitter. A relay station can also transmit the reference signal to a base station.

There is a need for a signal transmission method with consideration taken of the fact that, if a relay station transmits a signal to a base station, available time resources are gradually reduced in a link between the relay station and the base station owing to the guard time.

DISCLOSURE

Technical Problem

An object of the present invention is to provide a method and an apparatus in which a relay station transmits a signal in a wireless communication system.

Technical Solution

A method of a relay station transmitting a signal in a wireless communication system in a wireless communication system includes the steps of placing guard time within at least one symbol period in a subframe including a plurality of symbol periods in the time domain and transmitting a control signal or data to a base station using symbol periods other than the symbol period, including the guard time, in the subframe, wherein the guard time is equal to or shorter than one symbol period, and a structure in which the control signal or the data is placed in each of the symbol periods of the subframe is determined based on the number of symbol periods other than the symbol period including the guard time.

Advantageous Effects

A relay station can transmit a signal through radio resources allocated thereto by taking guard time into account. Interference between a sounding reference signal transmitted by a mobile station and a sounding reference signal transmitted by a relay station is reduced.

MODE FOR INVENTION

Figure 1:
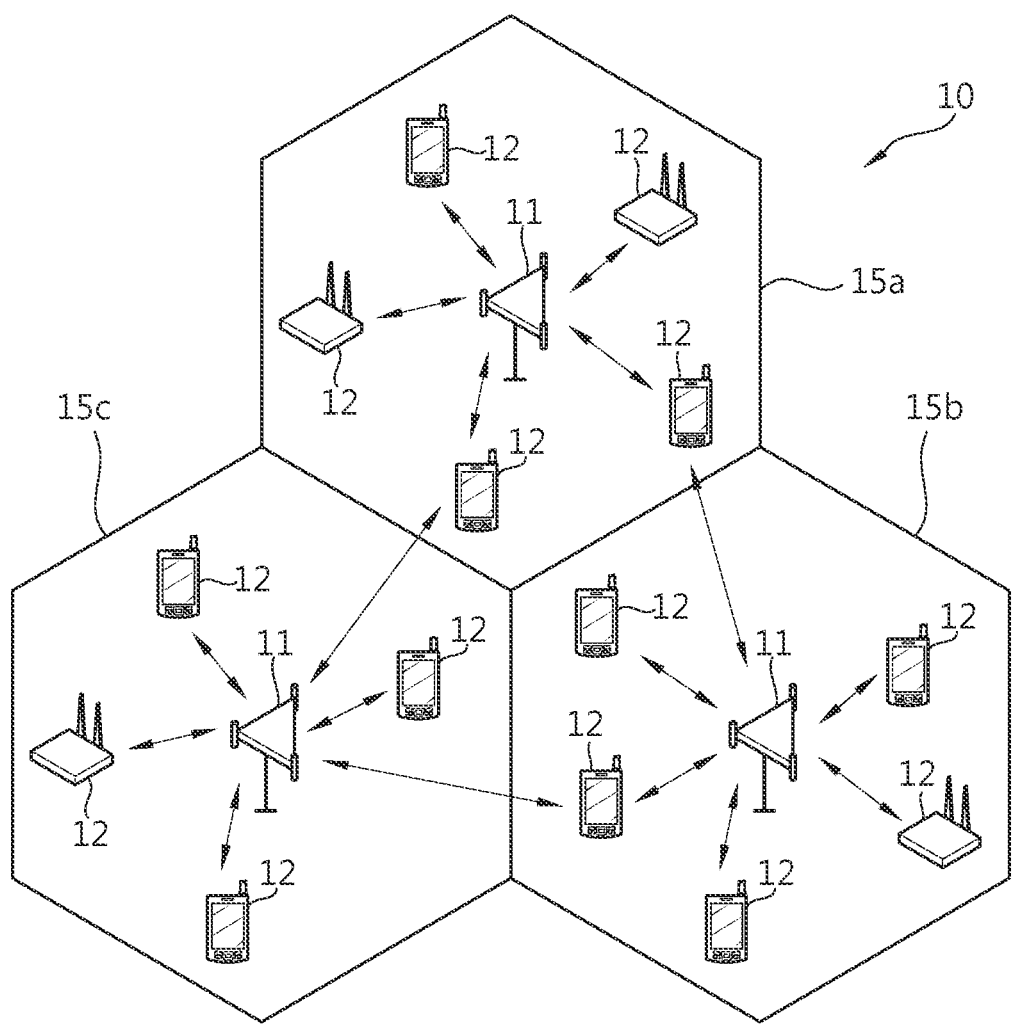
FIG. 1 shows a wireless communication system.

The following technologies may be used in a variety of wireless communication systems, such as CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be implemented using radio technologies, such as UTRA (Universal Terrestrial Radio Access) or CDMA2000. TDMA may be implemented using radio technologies, such as GSM (Global System for Mobile communications)/GPRS (General Packet Radio Service)/EDGE (Enhanced Data Rates for GSM Evolution). OFDMA may be implemented using radio technologies, such as IEEE 802.11 (Wi-Fi), IEEE 802.16 (WiMAX), IEEE 802-20, and E-UTRA (Evolved UTRA). IEEE 802.16m is an evolution of IEEE 802.16e, and it provides backward compatibility with systems based on IEEE 802.16e. UTRA is part of a UMTS (Universal Mobile Telecommunications System). 3GPP ($3^{rd}$ Generation Partnership Project) LTE (Long Term Evolution) is part of E-UMTS (Evolved UMTS) using E-UTRA (Evolved-UMTS Terrestrial Radio Access). 3GPP LTE adopts OFDMA in downlink and adopts SC-FDMA in uplink. LTE-A (Advanced) is an evolution of 3GPP LET. In order to clarify a description, LTE/LTE-A are chiefly described, but the technical spirit of the present invention is not limited thereto FIG. 1 shows a wireless communication system.

The wireless communication system 10 includes at least one Base Station (BS) 11. The BSs 11 provide communication services to respective geographical areas (in general, called cells) 15a, 15b, and 15c. The cell may be divided into a plurality of areas (called sectors). User Equipment (UE) 12 may be fixed and mobile and also referred to as another terminology, such as an MS (Mobile Station), an MT (Mobile Terminal), a UT (User Terminal), an SS (Subscriber Station), a wireless device), PDA (Personal Digital Assistant), a wireless modem, or a handheld device. The BS 11 commonly refers to a fixed station which communicates with the user stations 12, and it can also be referred to as another terminology, such as an eNB (evolved-NodeB), a BTS (Base Transceiver System), or an access point. Hereinafter, downlink refers to communication from the BS 11 to the user equipment 12, and uplink refers to communication from the user equipment 12 to the BS 11.

Figure 2:
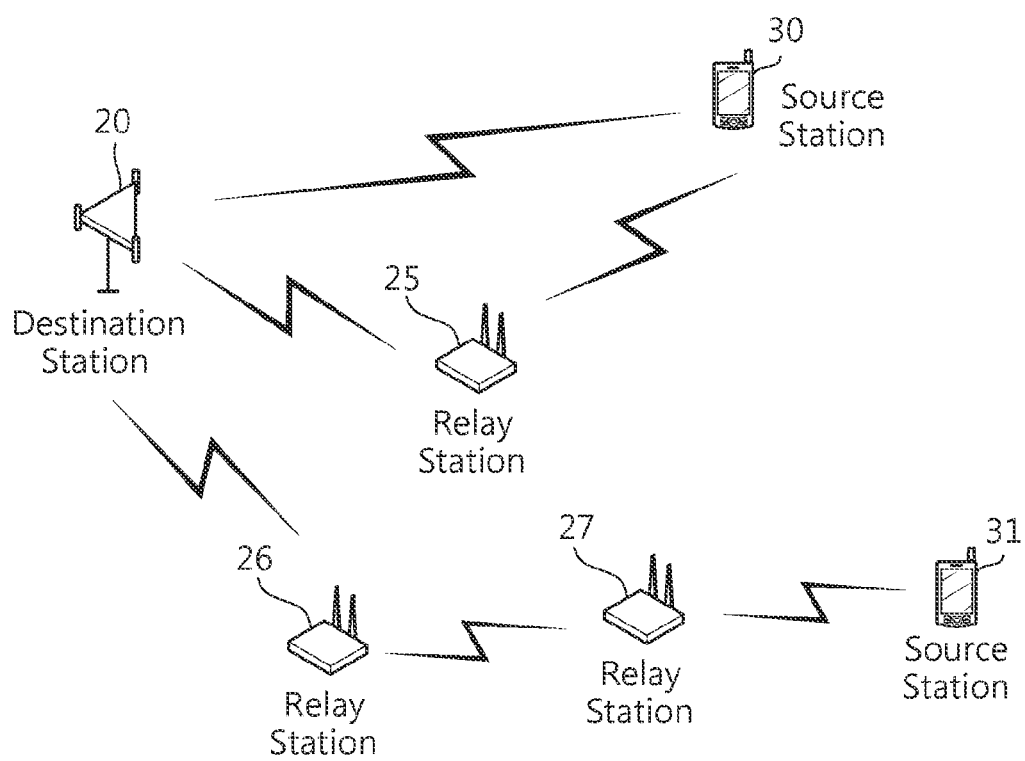
FIG. 2 shows a wireless communication system using relay stations.

FIG. 2 shows a wireless communication system using relay stations.

In uplink transmission, a source station may be an MS, and a destination station may be a BS. In downlink transmission, a source station may be a BS, and a destination station may be an MS. A relay station may be an MS, and an additional relay station may be deployed. A BS may perform functions, such as connectivity, management, control, and resource allocation between a relay station and an MS.

Referring to FIG. 2, a destination station 20 communicates with a source station 30 via a relay station 25. In uplink transmission, the source station 30 transmits uplink data to the destination station 20 and the relay station 25. The relay station 25 retransmits the received data. Furthermore, the destination station 20 communicates with a source station 31 via relay stations 26 and 27. In uplink transmission, the source station 31 transmits uplink data to the destination station 20 and the relay stations 26 and 27. The relay stations 26 and 27 retransmit the received data sequentially or at the same time.

Although one destination station 20, the three relay stations 25, 26, and 27, and the two source stations 30 and 31 are illustrated, the present invention is not limited to the above example. The number of destination stations, relay stations, and source stations included in the wireless communication system is not limited. Any method, such as Amplify and Forward (AF) and Decode and Forward (DF), may be used as a relay method used in the relay stations 25, 26, and 27, but the technical spirit of the present invention is not limited thereto.

Hereinafter, a link between a relay station and a BS is referred to as a backhaul link, and a link between a relay station and UE is referred to as an access link. Communication from a relay station to a BS is referred to as backhaul uplink (hereinafter referred to as backhaul UL), and communication from a BS to a relay station is referred to as backhaul downlink (hereinafter referred to as backhaul DL). Communication from UE to a relay station is referred to as access uplink (access UL), and communication from a relay station to UE is referred to as access downlink (access DL). UE directly communicating with a BS is referred to as a macro UE (Ma-UE), and UE communicating with a relay station is referred to as a relay UE (Re-UE).

Figure 3:
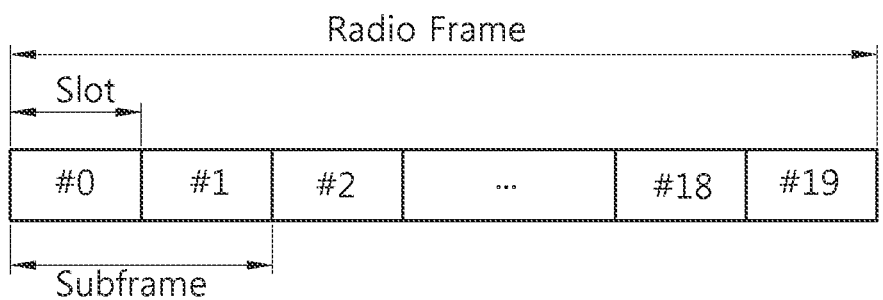
FIG. 3 shows the structure of a radio frame in 3GPP LTE.

FIG. 3 shows the structure of a radio frame in 3GPP LTE. For the structure, reference may be made to section 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)".

Referring to FIG. 3, the radio frame includes 10 subframes. One subframe includes two slots. The slots within the radio frame are assigned slot numbers or slot indices from #0 to #19. The time that it takes to transmit one subframe is referred to as a TTI (Transmission Time Interval). The TTI may be said to be a scheduling unit for data transmission. For example, the length of one radio frame may be 10 ms, the length of one subframe may be 1 ms, and the length of one slot may be 0.5 ms.

One slot includes a plurality of unit times in the time domain and includes a plurality of subcarriers in the frequency domain. The unit time is hereinafter called a symbol period or simply a symbol, for the sake of convenience. That is, the symbol may be a specific interval in the time domain. The symbol may be called another terminology according to a multiple access scheme. For example, an OFDM symbol is used to represent one symbol period because 3GPP LTE uses OFDMA in downlink. If SC-FDMA is used as an uplink multiple access scheme, it may be called an SC-FDMA symbol. 3GPP LTE is defined to include 7 OFDM symbols in one slot in a normal Cyclic Prefix (CP) and 6 OFDM symbols in one slot in an extended CP.

Figure 4:
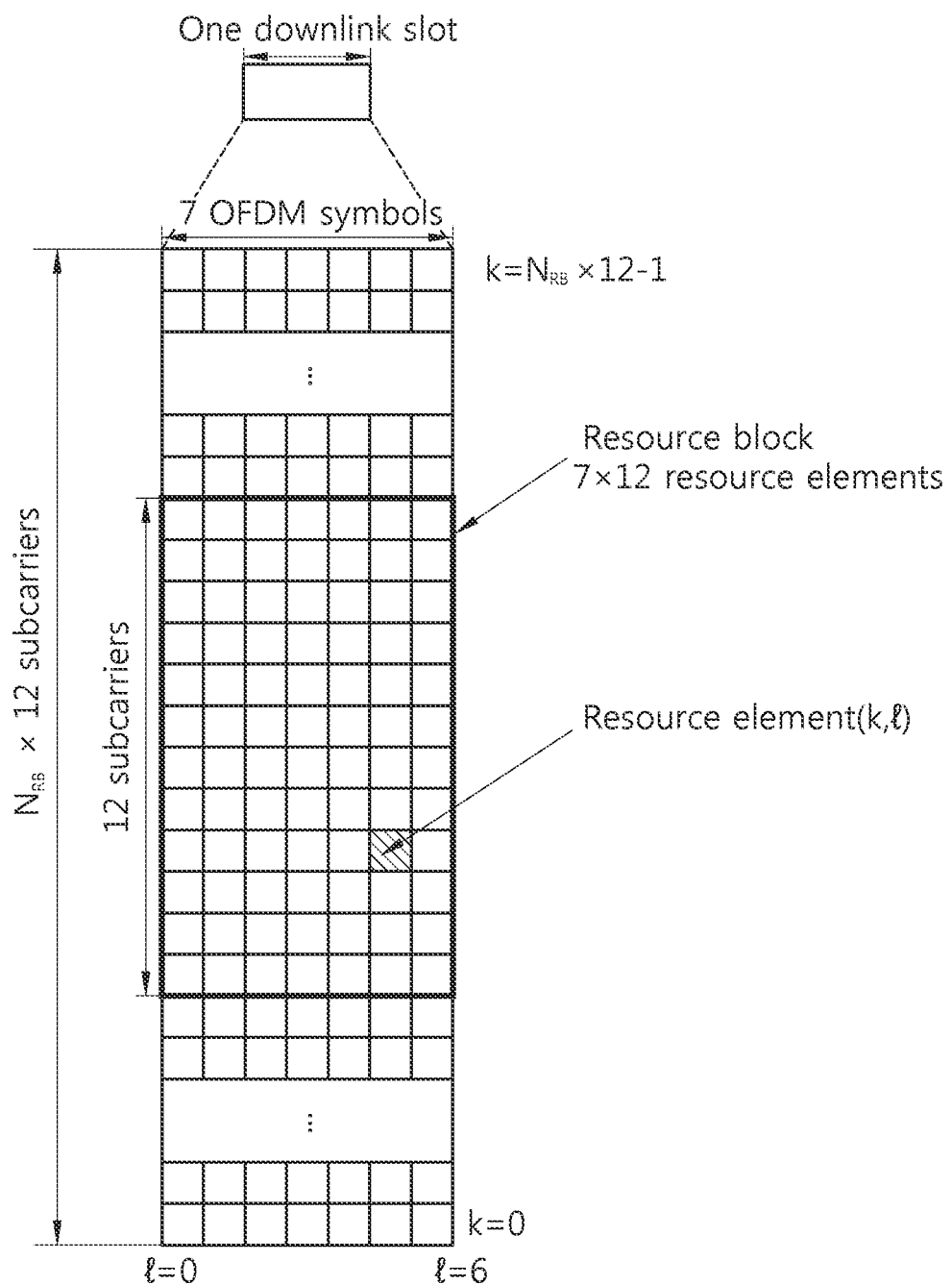
FIG. 4 shows an example of a resource grid for one downlink slot.

FIG. 4 shows an example of a resource grid for one downlink slot.

The downlink slot includes a plurality of OFDM symbols in the time domain and an $N_{RB}$ number of Resource Blocks (RBs) in the frequency domain. The number of resource blocks $N_{RB}$ included in a downlink slot depends on a downlink transmission bandwidth configured in a cell. For example, in an LTE system, the number of resource blocks $N_{RB}$ may be any one of 60 to 110. One resource block includes a plurality of subcarriers in the frequency domain. An uplink slot may also have the same structure as the downlink slot.

Each element on the resource grid is referred to as a resource element (RE). The RE on the resource grid may be identified by an index pair (k,l) within a slot. Here, k (where k=0, . . . , $N_{RB} \times 12-1$) is a subcarrier index within the frequency domain, and l (where l=0, . . . , 6) is an OFDM symbol index within the time domain.

It is hereinafter illustrated that one resource block includes 7 OFDM symbols in the time domain and 12 subcarrier in the frequency domain, resulting in 7×12 REs. However, the number of OFDM symbols and the number of subcarriers within a resource block are not limited thereto. The number of OFDM symbols and the number of subcarriers may be changed in various ways according to the length of a Cyclic Prefix (CP), frequency spacing, etc.

Figure 5:
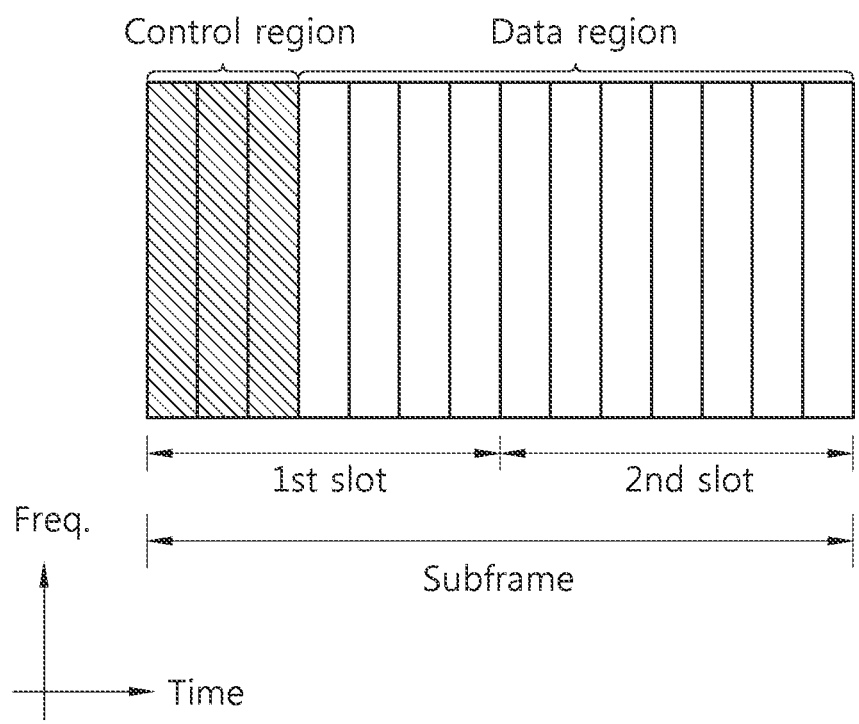
FIG. 5 shows the structure of a downlink subframe.

FIG. 5 shows the structure of a downlink subframe.

The downlink subframe includes 2 slots in the time domain. Each of the slots includes 7 OFDM symbols in a normal CP. A maximum of the first 3 OFDM symbols of the first slot within the subframe correspond to a control region to which control channels are allocated, and the remaining OFDM symbols correspond to a data region to which PDSCHs (Physical Downlink Shared Channels) are allocated. Downlink control channels used in 3GPP LTE include a PCFICH (Physical Control Format Indicator Channel), a PDCCH (Physical Downlink Control Channel), a PHICH (Physical Hybrid-ARQ Indicator Channel), and so on. The PCFICH transmitted in the first OFDM symbol of a subframe carries information about the number of OFDM symbols (i.e., the size of a control region) which is used to transmit control channels within a subframe. The PHICH carries an ACK/NACK signal for an HARQ (uplink Hybrid Automatic Repeat Request). That is, an ACK/NACK signal, transmitted by a BS in response to uplink data transmitted by UE, is transmitted on the PHICH. Control information transmitted through the PDCCH is also referred to as downlink control information (DCI). The DCI indicates uplink or downlink scheduling information and an uplink transmission power control command for certain UE groups.

Figure 6:
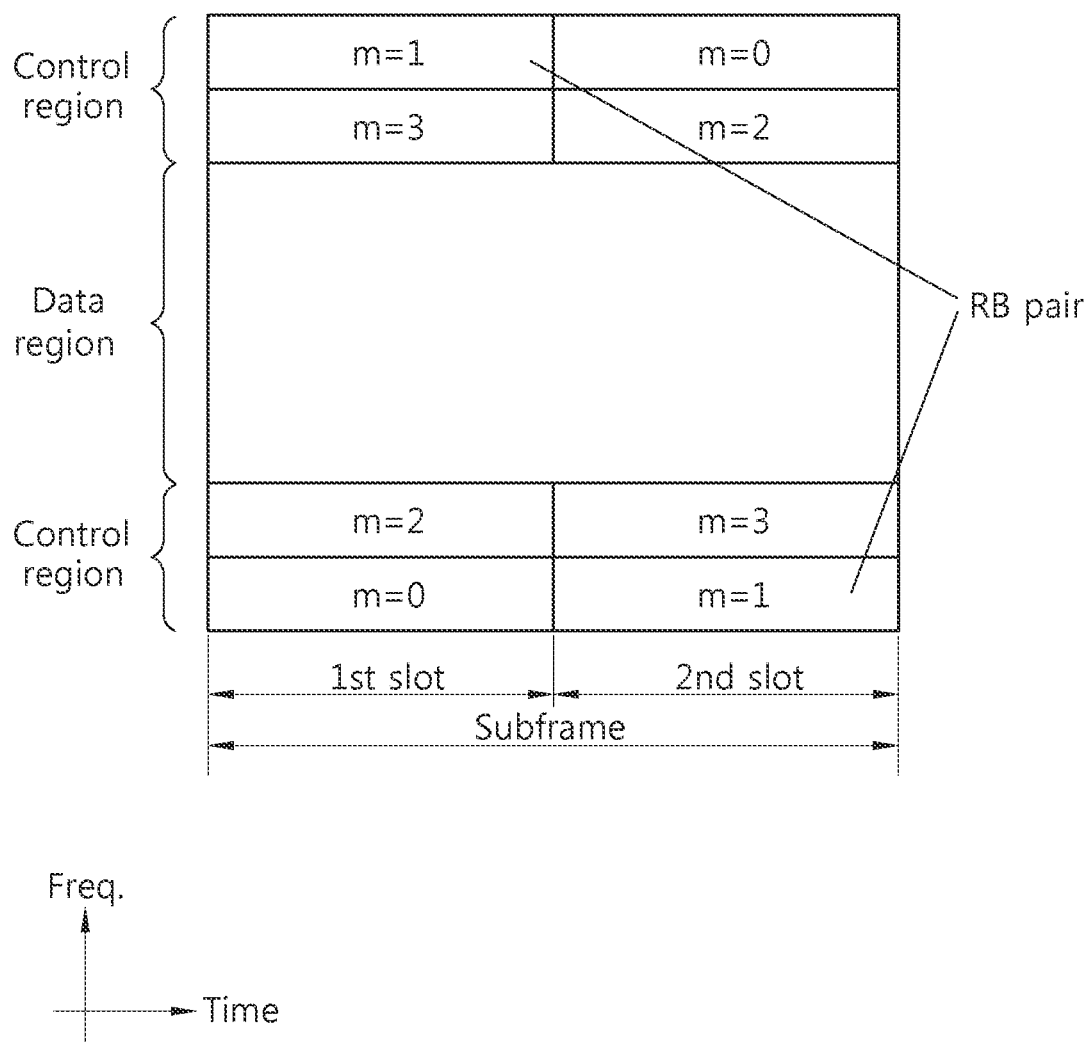
FIG. 6 shows the structure of an uplink subframe.

FIG. 6 shows the structure of an uplink subframe.

The uplink subframe may be divided into a control region and a data region in the frequency domain. A PUCCH (Physical Uplink Control Channel) for transmitting uplink control information is allocated to the control region.

The PUCCH may support a multi-format. That is, the PUCCH may be used to transmit uplink control information having different numbers of bits per subframe according to a modulation scheme. For example, if BPSK (Binary Phase Shift Keying) is used (PUCCH format 1a), the uplink control information of 1 bit may be transmitted on the PUCCH. If QPSK (Quadrature Phase Shift Keying) is used (PUCCH format 1b), the uplink control information of 2 bits may be transmitted on the PUCCH. The PUCCH format may include a format 1, a format 2, a format 2a, a format 2b, and so on (reference may be made to section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)").

After RB pairs are configured within a subframe, the PUCCHs of one UE are allocated. RBs included in the RB pair occupy different subcarriers of each slot. It is said that the frequency of the RB pair allocated to the PUCCH has been frequency-hopped in the slot boundary.

A PUSCH (Physical Uplink Shared Channel) for sending data is allocated to the data region. In 3GPP LTE, in order to maintain the characteristic of a single carrier, UE does not transmit the PUCCH and the PUSCH at the same time.

The above uplink subframe structure is applied between a BS and UE. However, if the uplink subframe structure is applied to backhaul UL likewise, a problem may arise. A relay station receives a signal from a relay UE and transmits the signal to a BS. Alternatively, a relay station receives a signal from a BS and transmits the signal to a relay UE. That is, the relay station performs switching for the transmission and reception of signals in the backhaul link and the access link. Here, a frequency band used by the relay station in order to receive the signal from the relay UE may be identical with a frequency band used by the relay station in order to transmit the signal to the BS (the same principle applies to a case where the relay station is operated in a TDD mode or an FDD mode). A relay station cannot perform the transmission and reception of signals at the same time in the same frequency band because of self-interference. Accordingly, a relay station needs to distinguish a subframe used to receive a signal from a relay UE and a subframe used to transmit a signal to a BS. The guard time is placed for operational stabilization switching when the transmission and reception of signals are performed in the backhaul link and the access link. It is assumed that a relay station is unable to transmit or receive a signal in the guard time.

The guard time may be configured to the time of one symbol or less. For example, the guard time may be set to a ½ symbol, one symbol or the like. If a relay station transmits a signal to a BS, the guard time has to be taken into consideration in a backhaul UL subframe structure. That is, how resources will be allocated is problematic in the control region or the data region of a backhaul UL subframe in which the number of available symbols is reduced owing to the guard time. In other words, the structure of the backhaul UL subframe is problematic.

Furthermore, the allocation of resources to a reference signal (RS) is also problematic within the backhaul UL subframe. The RS is used for channel estimation. Channel estimation is necessary for user scheduling or data demodulation or both. Furthermore, the RS may be used to measure the channel quality for its own cell or other cells, in addition to channel estimation. The RS is known to both a transmitter and a receiver and is also called a pilot.

The RSs, in general, are transmitted in a sequence (this is called an RS sequence). Any sequence can be used as the RS sequence without special restrictions. A computer-generated sequence based on PSK (Phase Shift Keying) may be used as the RS sequence. PSK can include, for example, BPSK (Binary Phase Shift Keying), QPSK (Quadrature Phase Shift Keying), and so on. Alternatively, a CAZAC (Constant Amplitude Zero Auto-Correlation) sequence may be used as the RS sequence. The CAZAC sequence can include, for example, a sequence based on ZC (Zadoff-Chu), a ZC sequence with cyclic extension, and a ZC sequence with truncation. Alternatively, a PN (Pseudo-random) sequence may be used as the RS sequence. The PN sequence can include, for example, m-sequence, a computer-generated sequence, a Gold sequence, and a Kasami sequence. Furthermore, a cyclically shifted sequence may be used as the RS sequence.

The RS sequence $R_{u,v}^{(\alpha)}(n)$ may be defined by Equation 1.

$$r_{u,v}^{(\alpha)}(n) = e^{j\alpha n}\bar{r}_{u,v}(n),\ 0 \le n \le M_{sc}^{RS}$$

In Equation 1, $\alpha$ is a cyclic shift, and $\bar{r}_{u,v}(n)$ is a basic sequence. $M_{sc}^{RS}$ is the length of the RS sequence. $M_{sc}^{RS} = m \cdot N_{sc}^{RB}$, $1 \le m \le N_{RB}^{max,UL}$, and $N_{sc}^{RB}$ is the size of a resource block expressed by the number of subcarriers in the frequency domain. $N_{RB}^{max,UL}$ is a maximum uplink bandwidth configuration expressed by a multiple of $N_{sc}^{RB}$. A plurality of the RS sequences may be defined by variously changing the cyclic shift a on the basis of a single basic sequence.

The RS includes two kinds of signals, such as a DMRS (Demodulation Reference Signal) and an SRS (Sounding Reference Signal). The DMRS is an RS used in channel estimation for demodulating a received signal. The DMRS can also be called a dedicated RS, a user-specific RS, or the like. The DMRS may be associated with transmission of a PUSCH or a PUCCH. The SRS is an RS transmitted from an MS to a BS for uplink scheduling. The BS estimates an uplink channel through a received SRS and uses the estimated uplink channel for uplink scheduling. The SRS is not associated with the transmission of a PUSCH or a PUCCH.

A sequence $r^{PUSCH}$ of a DMRS for a PUSCH may be defined by Equation 2.

$$r^{PUSCH}(m \cdot M_{sc}^{RS}+n) = r_{u,v}^{(\alpha)}(n)$$

In Equation 2, m=0, 1, n=0, . . . , $M_{sc}^{RS}-1$, and $M_{sc}^{RS} = M_{sc}^{PUSCH} \cdot M_{sc}^{PUSCH}$ is a scheduled bandwidth for uplink transmission which is expressed by the number of subcarriers. $R_{u,v}^{(\alpha)}(n)$ is an RS sequence. The $r^{PUSCH}$ may be mapped to a resource block used for PUSCH transmission. The $r^{PUSCH}$ may be mapped to a fourth (l=3) OFDM symbol from the front in case of the normal CP and to a third (l=2) OFDM symbol from the front in case of the extended CP in each of the slots constituting a resource block. The DMRS may be transmitted through the mapped resources.

A sequence $r^{SRS}$ of an SRS may be defined by Equation 3.

$$r^{SRS}(n) = r_{u,v}^{(\alpha)}(n)$$

The sequence $r^{SRS}$ is also mapped to a resource unit, and an SRS may be transmitted through the resource unit. In 3GPP LTE uplink, a macro UE transmits an SRS in the last symbol of a subframe. If a relay station has to transmit its own SRS, a relationship between guard time and an SRS transmitted by a macro UE has to be taken into consideration.

Figure 7:
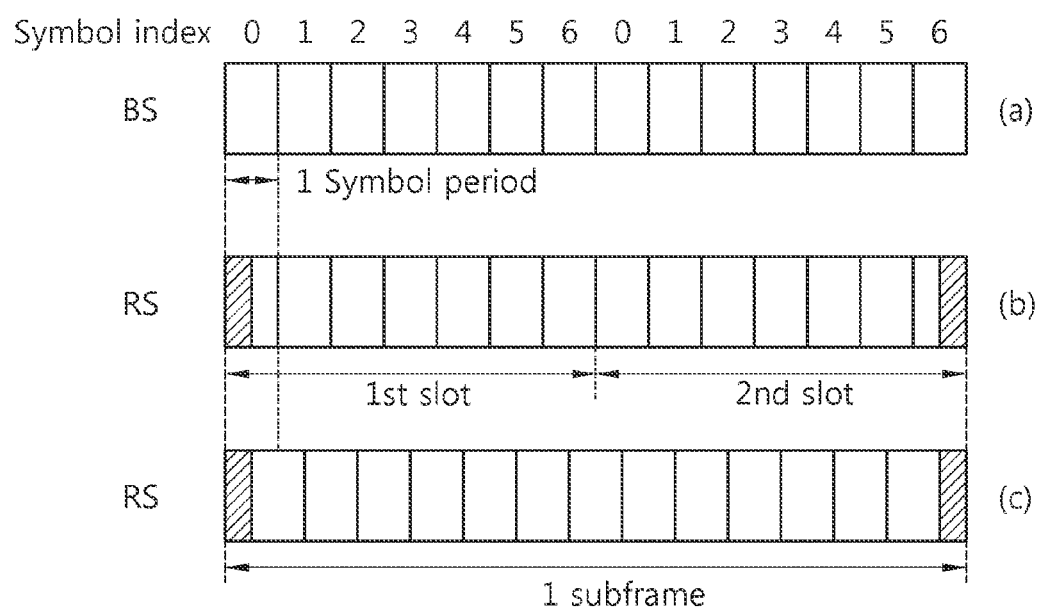
FIG. 7 is a diagram showing a timing relationship between subframes on which a base station receives a signal from a macro mobile station or a relay station.

FIG. 7 is a diagram showing a timing relationship between subframes on which a base station receives a signal from a macro mobile station or a relay station.

FIG. 7(a) shows a subframe on which a BS receives a signal from a macro UE. This subframe is called a BS subframe.

FIG. 7(b) shows a backhaul UL subframe on which a relay station transmits a signal to a BS. The backhaul UL subframe has the same start position and end position as those of a BS subframe in the time domain. That is, the backhaul UL subframe and the BS subframe have the same boundary for every subframe in the time domain. Furthermore, the start position and the end position of the backhaul UL subframe in the time domain for every symbol are identical with the start position and the end position of the BS subframe in the time domain for every symbol. In other words, the symbol boundary of the backhaul UL subframe is identical with the symbol boundary of the BS subframe. The backhaul UL subframe, having the same boundary as the BS subframe for every subframe and for every symbol as described above, is called a non-shifting subframe, for the sake of convenience. However, propagation delay, timing adjustment, and values that may vary according to a radio channel environment and a configuration between a BS and a relay station are not shown in the drawings. In the non-shifting subframe, 1) guard time may be placed in the first symbol of a first slot and in the last symbol of a second slot. Here, the number of available symbols that may be used for a relay station to transmit a control signal or data is 12 (in case of a normal CP). In case of an extended CP, the number of available symbols is 10.

2) A guard time may be placed only in the first symbol of a first slot. Here, the number of available symbols that may be used for a relay station to transmit a control signal or data is 13 (in case of a normal CP). In case of an extended CP, the number of available symbols is 11.

FIG. 7(c) shows a case where in which a backhaul UL subframe has the same boundary as a BS subframe for every subframe, but does not have the same boundary as the BS subframe for every symbol. That is, it may be said that the boundary of the backhaul UL subframe for every symbol has been backward shifted or forward by guard time as compared with the boundary of the BS subframe for every symbol. This subframe is called a shifting subframe. That is, the backhaul UL subframe shown in FIG. 7(c) is an example of the shifting subframe. FIG. 7(c) is for representing available symbols, and thus the start and end of the backhaul UL subframe are not limited as in FIG. 7(c). However, the index of the foremost symbol of available symbols is not limited to 0 in terms of the management of the index of a symbol. Likewise, the index of the last symbol of available symbols is not limited to 13.

Like in the non-shifting subframe, even in the shifting subframe, the guard time may be allocated to the first and the last symbols of the backhaul UL subframe or may be allocated to only the first symbol of the backhaul UL subframe. For example, if the guard time is a ½ symbol, the number of symbols available for a relay station may be 13 in the former case, and the number of symbols available for a relay station may be 13.5 in the later case (in case of a normal CP).

The structures of the non-shifting subframe or the shifting subframe are described below when a relay station transmits a signal to a BS in the non-shifting subframe or the shifting subframe. For a clear description, radio resources allocated so that a macro UE can transmit a signal to a BS are also shown in the drawings. In the following drawings, a PUCCH and a PUSCH indicate a control channel and a data channel transmitted from a macro UE to a BS. An R-PUCCH (relay-PUCCH) indicates a control channel transmitted from a relay station to a BS, and an R-PUSCH (relay-PUSCH) indicates a data channel transmitted from a relay station to a BS. Furthermore, in the following drawings, regions on the drawings where the PUCCH, the PUSCH, the R-PUCCH, and the R-PUSCH are displayed indicate that the relevant channels can be transmitted in relevant radio resource regions. A normal CP is described, for the sake of convenience, but it is evident that an extended CP may also be used.

Furthermore, in the following embodiments, an example in which each of guard time placed in the first or the last or both of a subframe is a ½ symbol is described, but not limited thereto.

Figure 8:
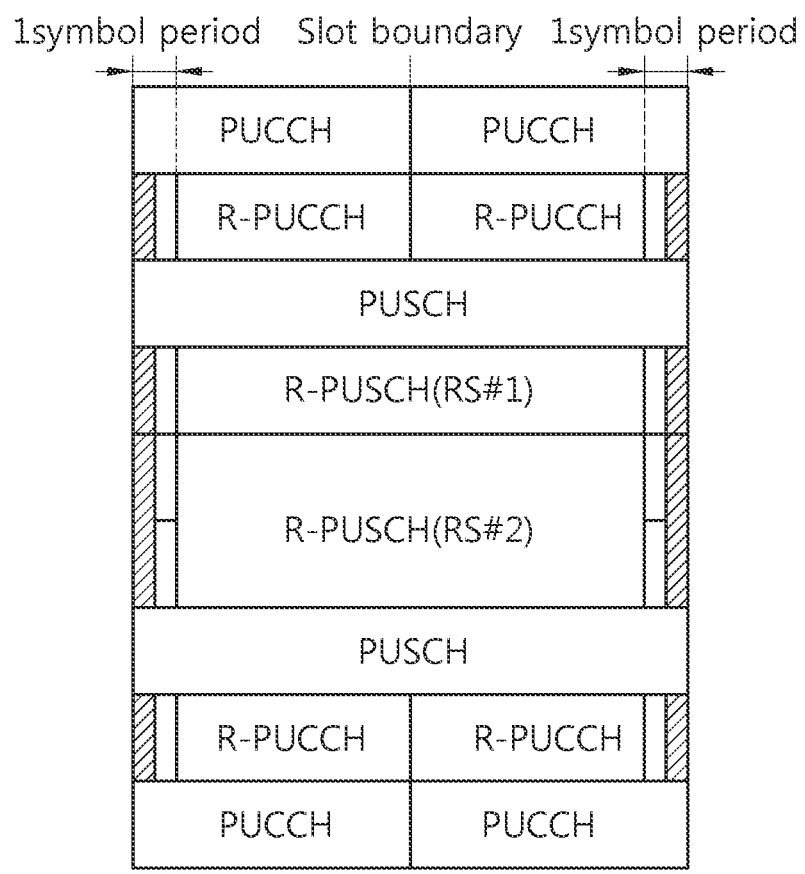
FIG. 8 shows an example of the structure of a non-shifting subframe if guard time is placed in the first symbol and the last symbol of the non-shifting subframe.

FIG. 8 shows an example of the structure of a non-shifting subframe if the guard time is placed in the first symbol and the last symbol of the non-shifting subframe.

R-PUCCHs and R-PUSCHs are allocated between the bands in which PUCCHs are transmitted in the frequency domain. Furthermore, the R-PUSCHs are allocated between the bands in which the R-PUCCHs are transmitted. In this case, the PUSCH may be allocated to a radio resource region to which the R-PUSCH is not allocated. A relay station uses a shortened R-PUCCH format because it has to transmit R-PUCCHs using 12 symbols other than the guard time. The shortened R-PUCCH format means a format that transmits an RS and payloads using the number of symbols smaller than the number of symbols of a PUCCH format.

For example, if an MS transmits an SRS in the last symbol of a subframe, the MS uses a shortened PUCCH format in which the last symbol is punctured and only the remaining symbols are used. That is, in case of a normal CP, payloads, such as ACK/NACK, is not transmitted in the last symbol of 14 symbols. Like in the shortened PUCCH format, the R-PUCCH may also use the shortened R-PUCCH format. The shortened R-PUCCH format will be described in detail later.

An RB (Resource Block) to which an R-PUCCH is allocated is different from an RB to which a PUCCH is allocated. A link between a BS and a relay station and a link between a BS and an MS have different channel conditions. Accordingly, if the R-PUCCH and the PUCCH are allocated to the same RB, the orthogonality of an orthogonal sequence may be broken. Furthermore, it may be difficult to multiplex the R-PUCCH and the PUCCH to the same RB because the R-PUCCH and the PUCCH have different structures according to how the backhaul subframe structure is defined. It is therefore preferred that the R-PUCCH and the PUCCH use different RBs.

Figure 9:
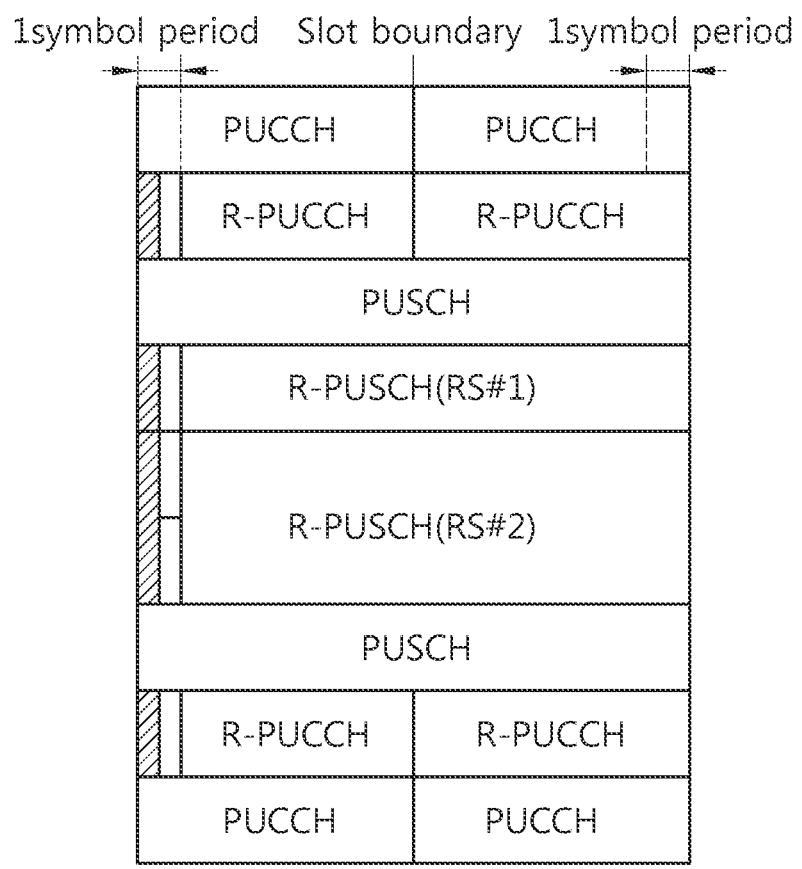
FIG. 9 shows another example of the structure of a non-shifting subframe if guard time is placed only in the first symbol of the non-shifting subframe.

FIG. 9 shows another example of the structure of a non-shifting subframe if the guard time is placed only in the first symbol of the non-shifting subframe.

A relay station may transmit R-PUCCHs using a shortened R-PUCCH format because the number of available symbols within a subframe is 13. Here, unlike in the shortened PUCCH format, symbols remained after a first symbol is punctured instead of a last symbol are allocated to a first slot, and there is no change in a second slot. The indices of the symbols included in the first slot may be backward shifted by one symbol like 0 to 5 instead of 1 to 6.

A guard time may be placed in a subsequent subframe because there is no guard time in the last symbol of the subframe. Accordingly, a relay station may not receive some access signals in the subsequent subframe.

Figure 10:
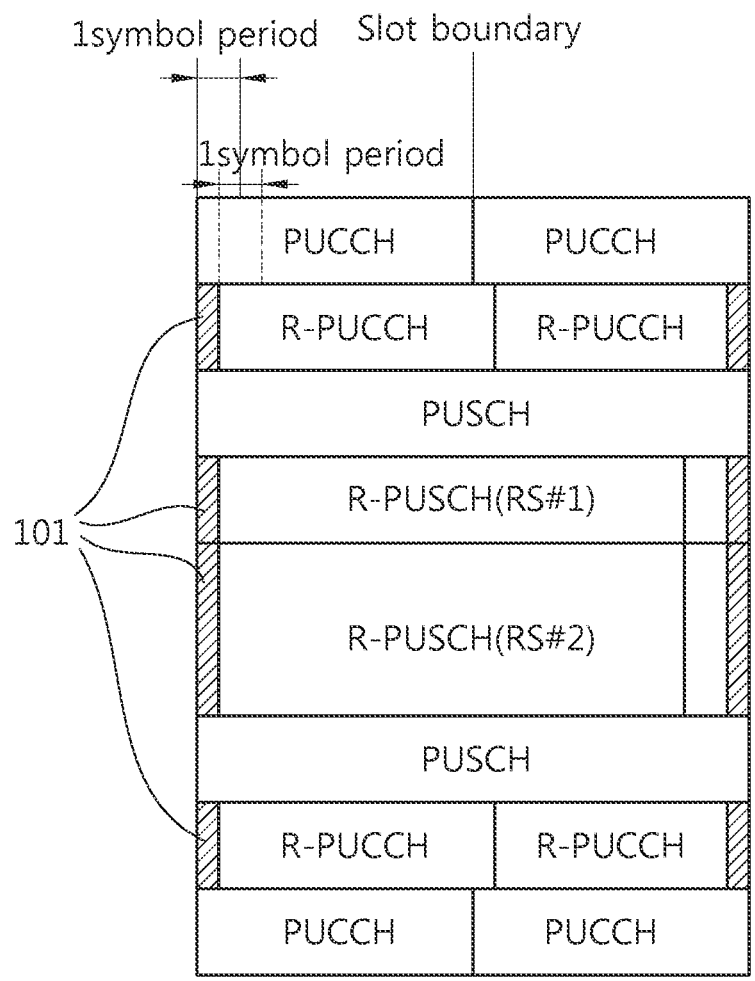
FIG. 10 shows an example of the structure of a shifting subframe if guard time is placed in the first symbol and the last symbol of the shifting subframe.

FIG. 10 shows an example of the structure of a shifting subframe if the guard time is placed in the first symbol and the last symbol of the shifting subframe.

A relay station transmits R-PUCCHs and R-PUSCHs to a BS right after a lapse of the first guard time 101 of the subframe, unlike in the non-shifting subframe. Accordingly, the amount of wasted radio resources can be reduced. If each guard time is smaller than one symbol (e.g., a ½ symbol), interference may be generated because the boundary of symbols on which a macro UE sends a signal is not identical with the boundary of symbols on which a relay station sends a signal. Accordingly, the relay station may use a shortened R-PUCCH format because the number of available symbols is reduced owing to the guard time. The number of symbols available for the relay station is 13.

Figure 11:
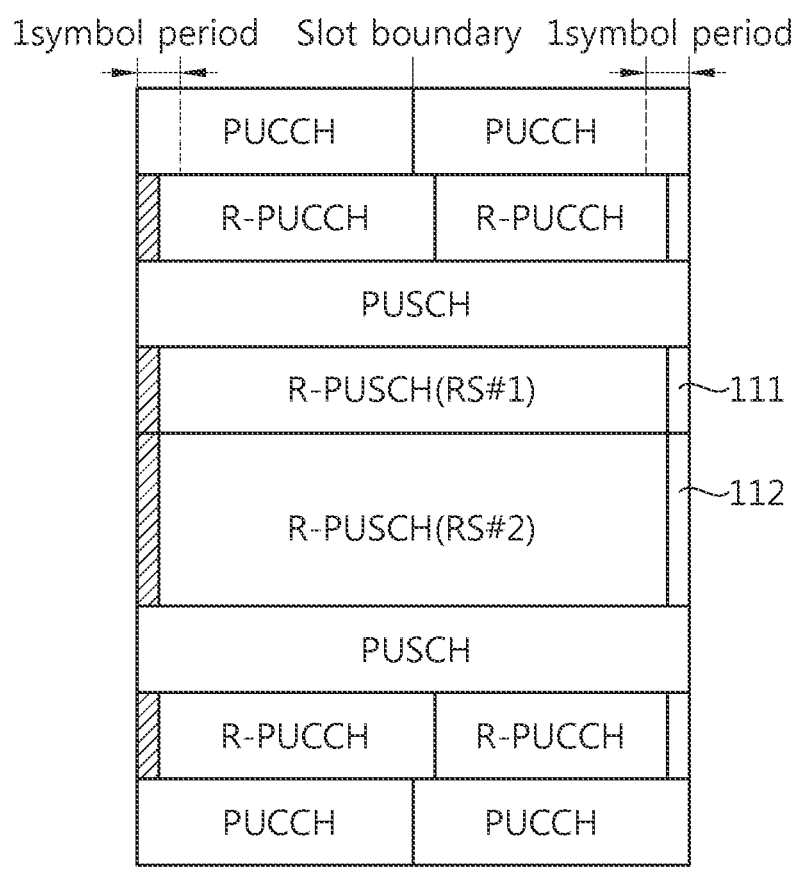
FIG. 11 shows another example of the structure of a shifting subframe if guard time is placed only in the first symbol of the shifting subframe.

FIG. 11 shows another example of the structure of a shifting subframe if the guard time is placed only in the first symbol of a subframe.

Unlike in FIG. 10, a relay station may use 13 or more symbols in case of a normal CP. For example, if the guard time is a ½ symbol, a relay station may use 13.5 symbols. A relay station may transmit a control signal using a shortened R-PUCCH format in 13 symbols. ½ symbols 111 and 112 placed in the last of the subframes in the frequency bands in which respective R-PUSCHs are transmitted may be used to transmit R-PUSCHs or may be used for other special purposes.

In the backhaul UL subframes described with reference to FIGS. 8 to 11, radio resources to which the R-PUCCHs are allocated may be related to the R-PDCCHs. For example, a CCE index to which an R-PUCCH is allocated may be determined according to a CCE index on which an R-PDCCH is transmitted. Furthermore, unlike in the existing 3GPP LTE, both the R-PUCCH and the R-PUSCH may be transmitted at the same time. An RB on which the R-PUCCH is transmitted is different from an RB on which a PUCCH is transmitted. That is, the R-PUCCH and the PUCCH are transmitted through different radio resources.

Furthermore, a relay station may signalize BSI (Buffer Status Information) through an R-PUCCH. If an R-PUCCH is not transmitted, the BSI may be signalized through a higher layer signal or may be piggybacked in R-PUSCH transmission.

Furthermore, as described above, in the backhaul UL subframe structure, the number of symbols available for a relay station is reduced owing to the guard time. The R-PUCCH requires a new structure because the number of symbols available for the R-PUCCH is different from the number of symbols available for PUCCHs. That is, it is necessary to newly define the positions and the number of symbols to which an RS and payloads, such as ACK/NACK, SR, and CQI transmitted through the R-PUCCHs, are allocated. The newly defined R-PUCCH format is called a shortened R-PUCCH format. The shortened R-PUCCH format is described below by way of a detailed example in which the RS and the payloads transmitted through the R-PUCCHs are allocated.

Figure 12:
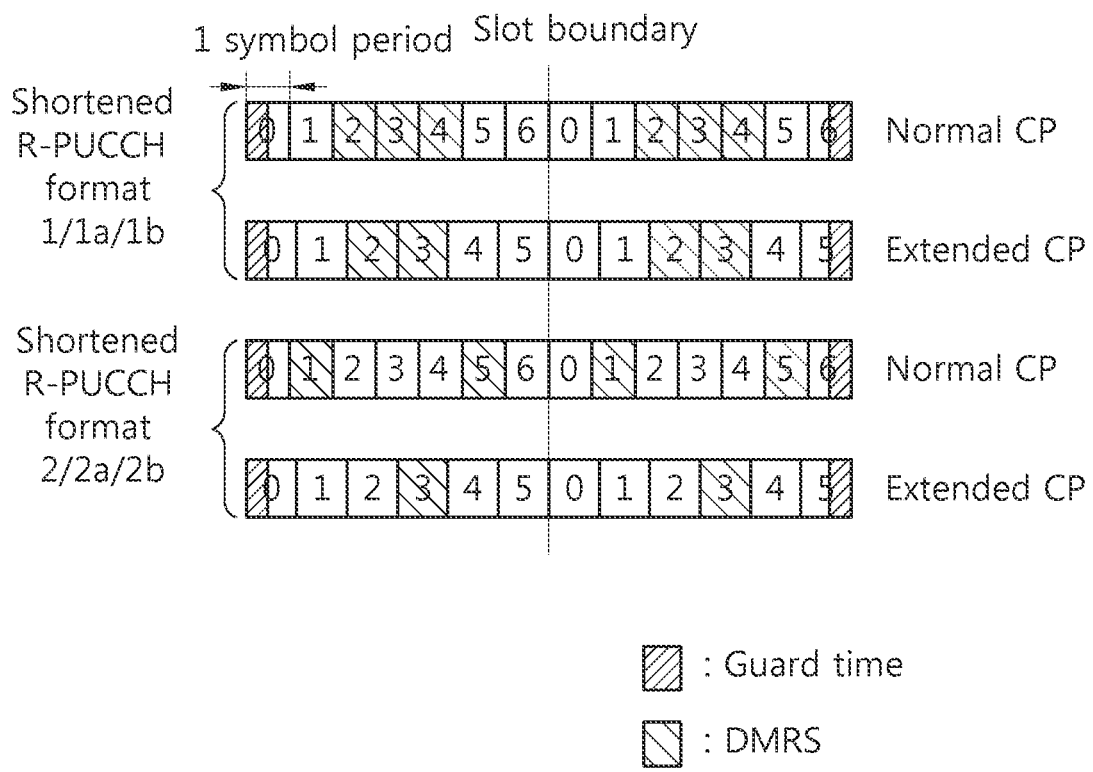
FIG. 12 shows examples of shortened R-PUCCH formats in a non-shifting subframe.

FIG. 12 shows examples of shortened R-PUCCH formats in the non-shifting subframe.

The guard time is placed in the first symbol and the last symbol of the subframe. A relay station may transmit an RS and payloads in the symbol period other than the first symbol of a first slot and in the last symbol of a second slot.

Referring to FIG. 12, in a shortened R-PUCCH format 1/1a/1b, in a normal CP, a DMRS may be transmitted in the symbols #2, 3, and 4 of each slot, and a payload may be transmitted in the symbols #1, 5, and 6 of a first slot and the symbols #0, 1, and 5 of a second slot. In an extended CP, the DMRS may be transmitted in the symbols #2 and 3 of each slot, and the payload may be transmitted in the symbols #1, 4, and 5 of a first slot and in the symbols #0, 1, and 4 of a second slot. In FIG. 12, if the guard time is placed in the last symbol of the second slot, the existing shortened PUCCH format 1/1a/1b may be reused in the second slot. For comparison purposes, however, the shortened format is illustrated to be used both in the first slot and the second slot.

In case of a shortened R-PUCCH format 2/2a/2b, in a normal CP, a DMRS may be transmitted in the symbols #1 and 5 of each slot, and a payload may be transmitted in the symbols #2, 3, 4, and 6 of a first slot and in the symbols #0, 2, 3, and 4 of a second slot. In an extended CP, the DMRS may be transmitted in the symbol #3 of each slot, and the payload may be transmitted in the symbols #1, 2, 4, and 5 of a first slot and in the symbols #0, 1, 2, and 4 of a second slot. If the guard time is placed in the last symbol of the second slot, the existing available PUCCH format 2/2a/2b has not been defined. The shortened R-PUCCH format 2/2a/2b may be applied to only one of the two slots within the subframe. For example, the shortened R-PUCCH format 2/2a/2b may be applied to only the first slot of the subframe or may be applied to both the two slots of the subframe. That is, in the shortened R-PUCCH formats proposed in FIG. 12, a form in which available symbols are reduced in both the first slot and the second slot may be used, or a form in which available symbols are reduced only in the first slot for the degree of freedom of an operation may be used. The two methods may be implemented so that they are configured by higher layer signaling.

That is, the shortened R-PUCCH format of FIG. 12 is the same as the PUCCH format used by an MS except the symbol where the guard time is placed. In other words, the shortened R-PUCCH format is the same as the PUCCH format in the position where the RS is placed, but in the shortened R-PUCCH format, the payload may be allocated to a symbol period other than the first symbol and the last symbol of a subframe which cannot be used owing to the guard time.

Figure 13:
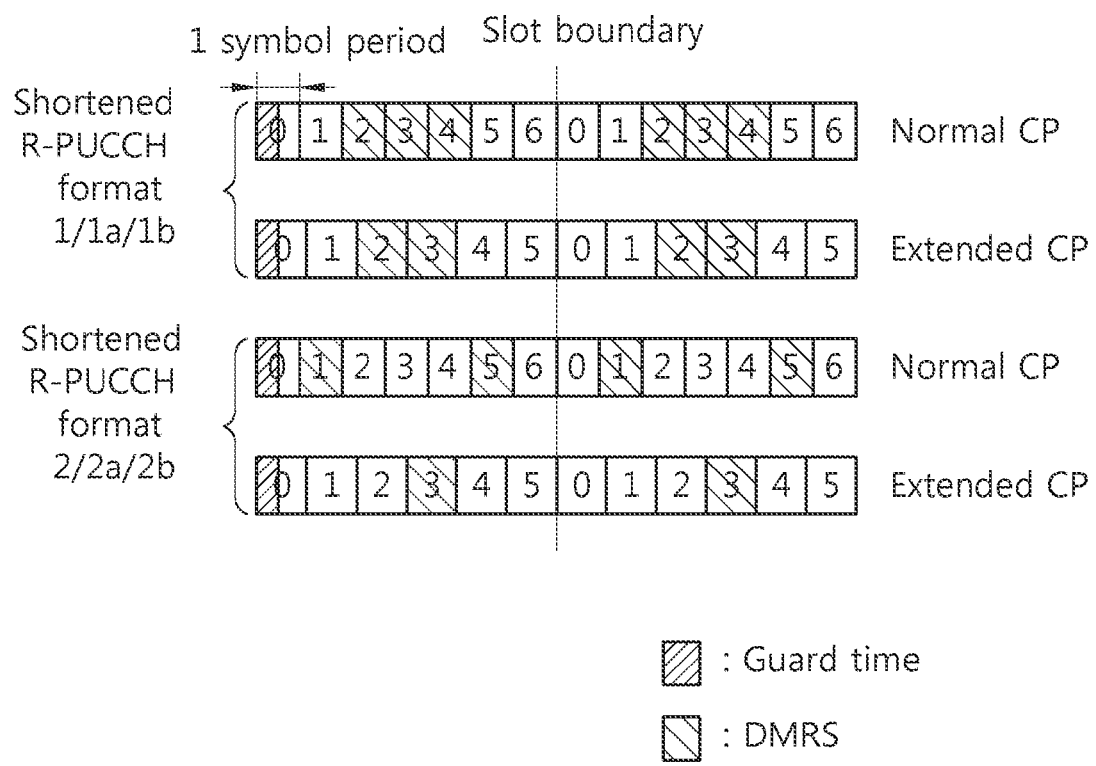
FIG. 13 shows another example of shortened R-PUCCH formats in a non-shifting subframe.

FIG. 13 shows another example of shortened R-PUCCH formats in the non-shifting subframe.

A guard time is placed only in the first symbol of the subframe. The guard time is illustrated to be a ½ symbol, but may be one symbol. In the shortened R-PUCCH format, an RS and a payload may be allocated to symbols other than the first symbol of a first slot. FIG. 13 is different from FIG. 12 in that the RS or the payload may be transmitted in the last symbol of the subframe. The shortened R-PUCCH format is advantageous in that an SRS can be transmitted in the last symbol of a second slot. Alternatively, in the shortened R-PUCCH format, a shortened PUCCH format used in 3GPP LTE may be shifted by one symbol and then allocated to available symbols. This is possible by designating the indices of available symbols as 0 to 12, if symbol indices within a subframe are sequentially designated as 0 to 13 (in a normal CP).

Figure 14:
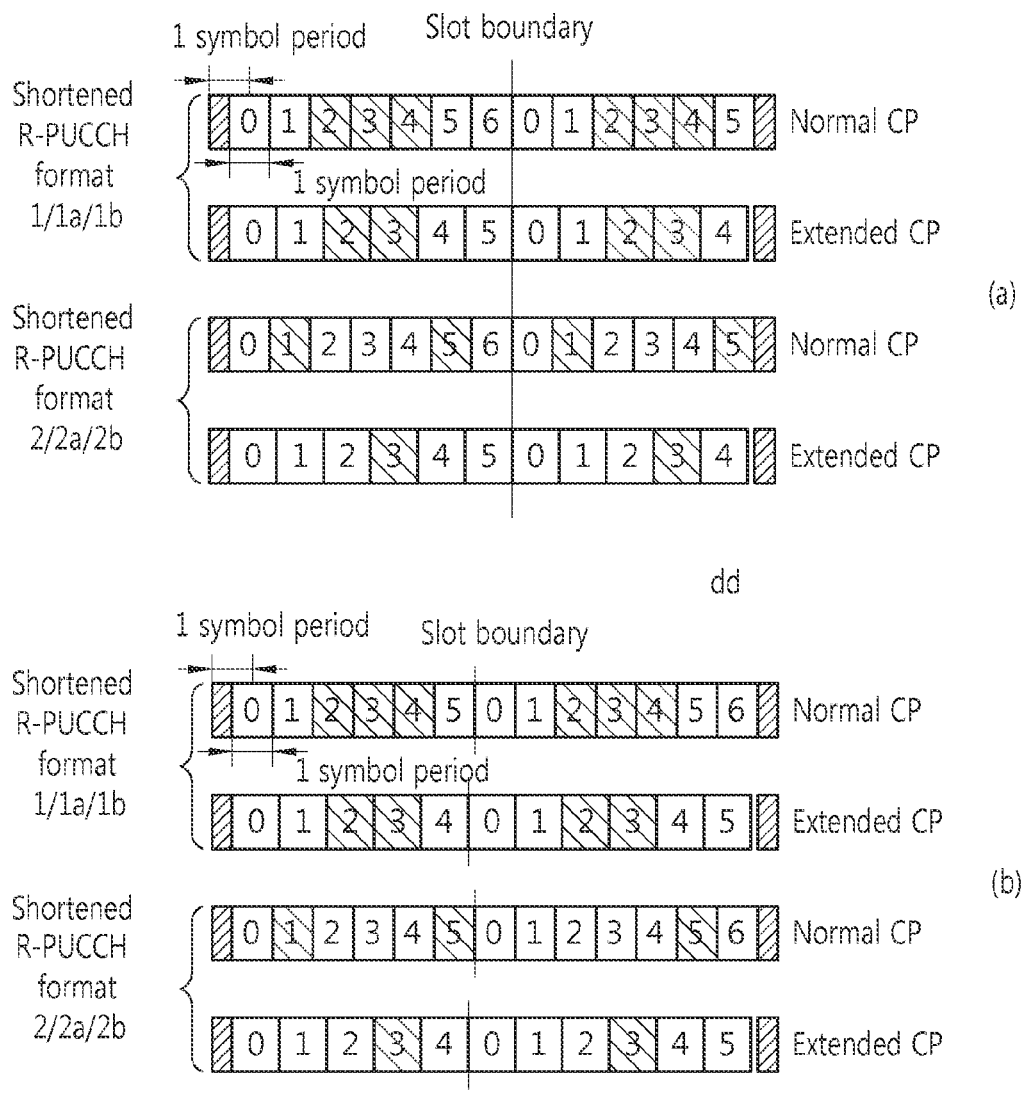
FIG. 14 shows examples of shortened R-PUCCH formats in a shifting subframe.

FIG. 14 shows examples of shortened R-PUCCH formats in a shifting subframe.

The shortened R-PUCCH format may include different numbers of symbols in a first slot and a second slot. 7 symbols may be included in the first slot and 6 symbols may be included in the second slot as shown in FIG. 14(a), and 6 symbols may be included in the first slot and 7 symbols may be included in the second slot as shown in FIG. 14(b) (in case of a normal CP).

The shortened R-PUCCH format may be a format in which a shortened PUCCH format used in an MS is backward shifted by a ½ symbol and a payload allocated to the last symbol of a slot, from among payloads, is then punctured. The shortened R-PUCCH format may be a format in which, as shown in FIG. 14(a), the last symbol of the second slot to which the payload is allocated is punctured and the RSs or the payloads are allocated to only the 6 symbols of the second slot (in case of the shortened R-PUCCH format 1/1a/1b). Alternatively, the shortened R-PUCCH format may be a format in which, as shown in FIG. 14(b), the last symbol of the first slot to which the payload is allocated is punctured and the RSs or the payloads are allocated to only the 6 symbols of the first slot (in case of the shortened R-PUCCH format 1/1a/1b).

Figure 15:
FIG. 15 shows another example of shortened R-PUCCH formats in a shifting subframe.

FIG. 15 shows another example of shortened R-PUCCH formats in a shifting subframe.

FIG. 15(a) is different from FIG. 14(a) in that the position of an RS allocated to a second slot has been forward shifted by one symbol. FIG. 15(b) is different from FIG. 14(b) in that the position of an RS allocated to a first slot is forward shifted by one symbol.

Figure 16:
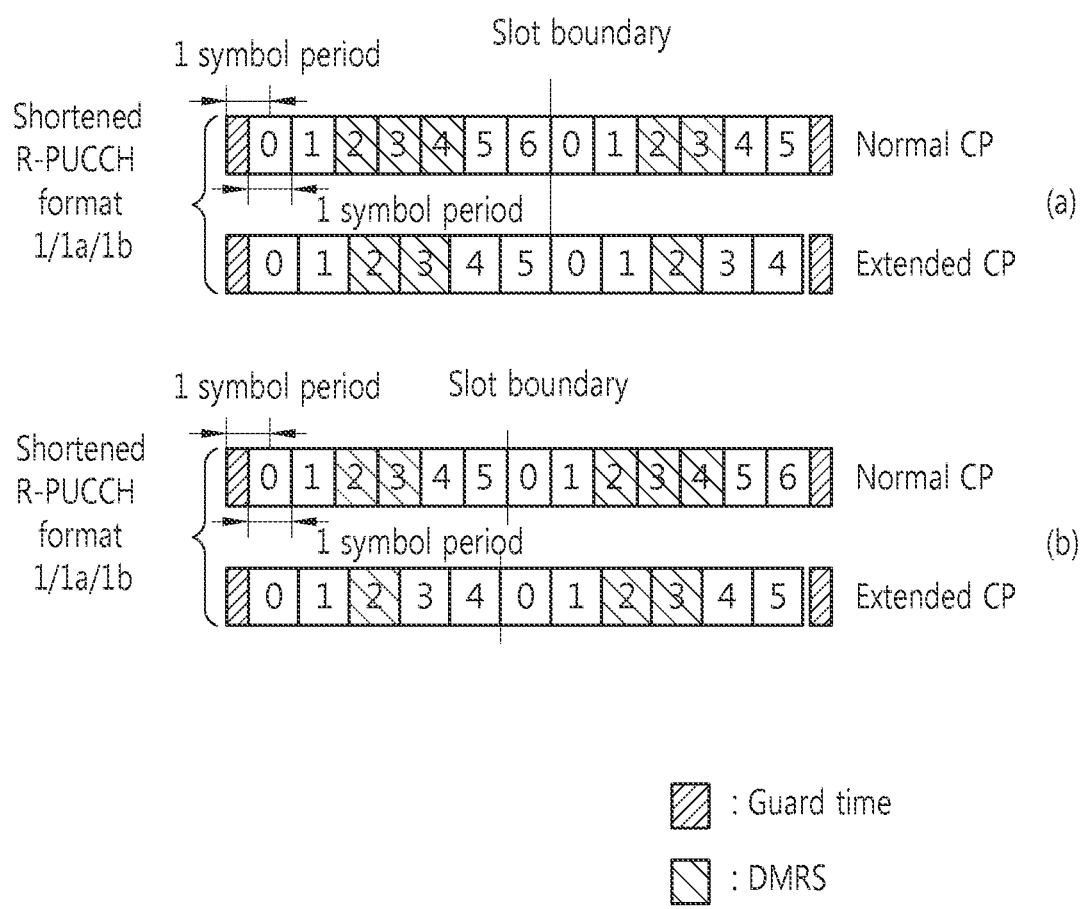
FIG. 16 shows yet another example of shortened R-PUCCH formats in a shifting subframe.

FIG. 16 shows yet another example of shortened R-PUCCH formats in a shifting subframe.

In a shortened R-PUCCH format 1/1a/1b, any one of RS symbols placed in a first slot or a second slot is punctured. For example, an RS symbol placed in the symbol #4 of the second slot may be punctured and RSs may be placed only in the symbols #2 and #3 of the second slot in a normal CP as in FIG. 16(a), or an RS symbol placed in the symbol #4 of the first slot may be punctured and RSs may be placed only in the symbols #2 and #3 of the first slot as in a normal CP as in FIG. 16(b). FIG. 16 is different from FIGS. 14 and 15 in that not the payload, but the RS is punctured.

Figure 17:
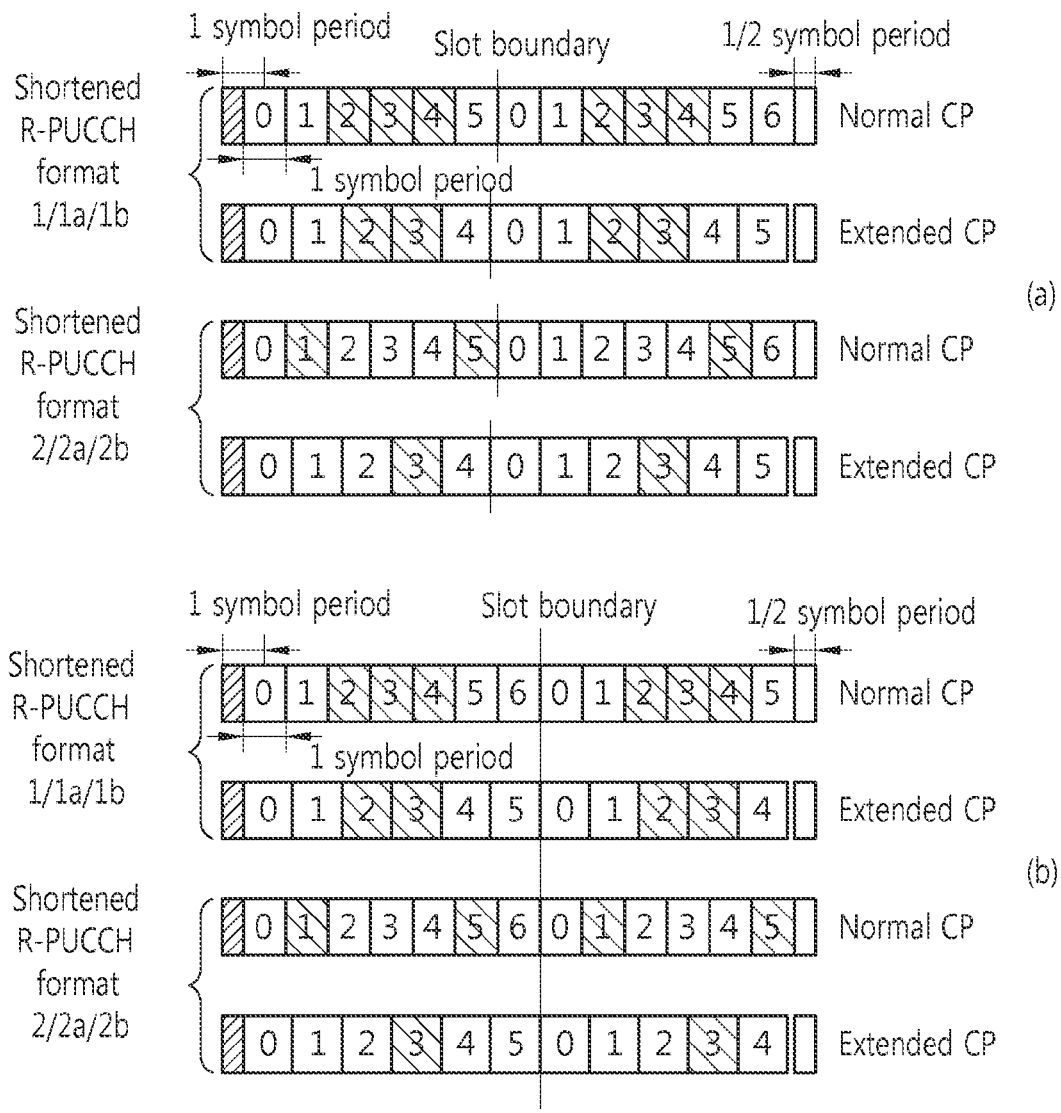
FIG. 17 shows examples of shortened R-PUCCH formats if guard time is placed only in the first slot of a subframe in a shifting subframe.

FIG. 17 shows examples of shortened R-PUCCH formats if the guard time is placed only in the first slot of a subframe in a shifting subframe.

The number of symbols available for a relay station is 13 or more because the guard time is placed in the first slot of the subframe. For example, if the guard time is a ½ symbol, a relay station may use 13.5 symbols. A relay station may puncture the last payload of a first slot or a second slot. FIG. 17(a) shows an example in which the last payload of the first slot is punctured (i.e., a payload allocated to the symbol #6 of the first slot is punctured), and FIG. 17(b) shows an example in which the last payload of the second slot is punctured (i.e., a payload allocated to the symbol #6 of the second slot is punctured).

FIG. 17 shows an example in which the guard time is a ½ symbol. However, the guard time may be one symbol. In this case, a ½ symbol placed in the last slot of the subframe may do not exist.

Figure 18:
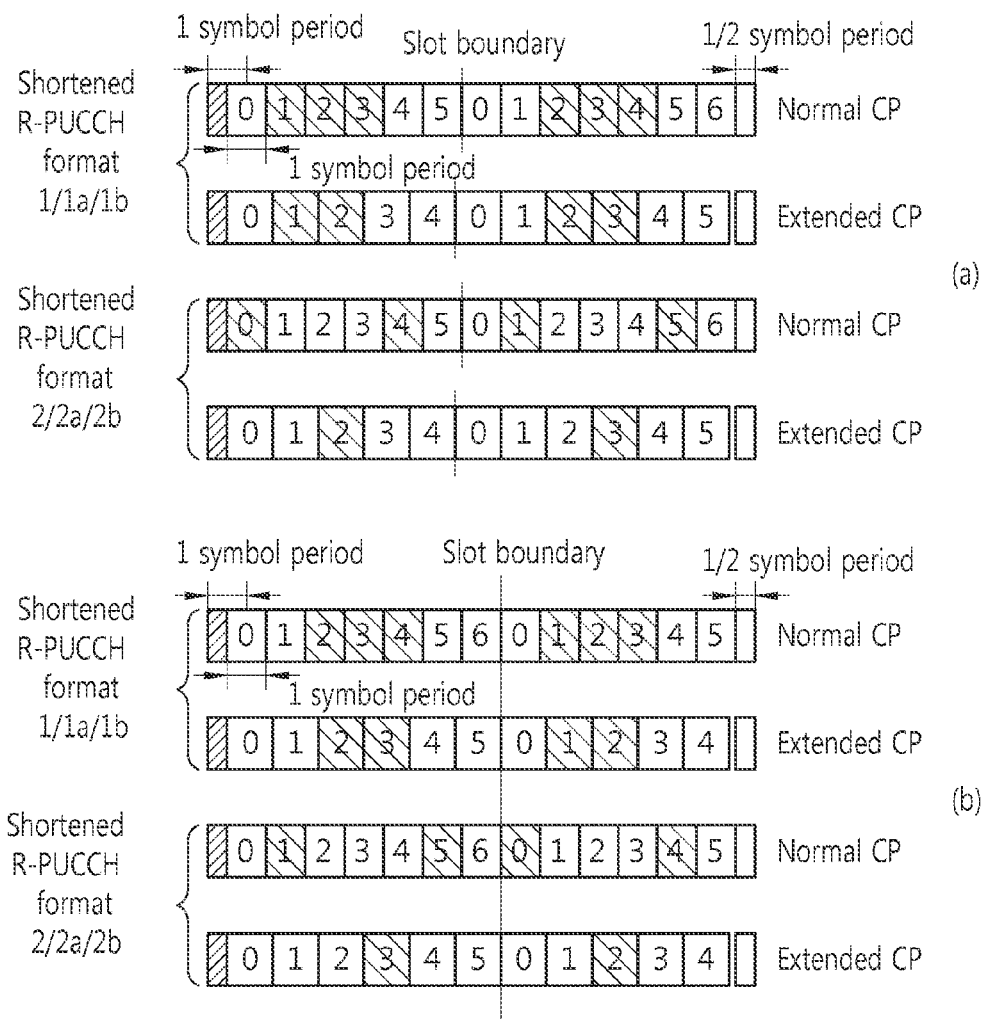
FIG. 18 shows another example of shortened R-PUCCH formats if guard time is placed only in the first slot of a subframe in a shifting subframe.

FIG. 18 shows another example of shortened R-PUCCH formats if the guard time is placed only in the first slot of a subframe in a shifting subframe.

FIG. 18 is different from FIG. 17 in that one payload is punctured in the first slot or the second slot, but the first payload of each slot is punctured. Consequently, FIG. 18(a) is different from FIG. 17(a) in that the position of an RS in the first slot is forward shifted and allocated by one symbol. FIG. 18(b) is different from FIG. 17(b) in that the position of an RS in the second slot is forward shifted and allocated by one symbol.

Figure 19:
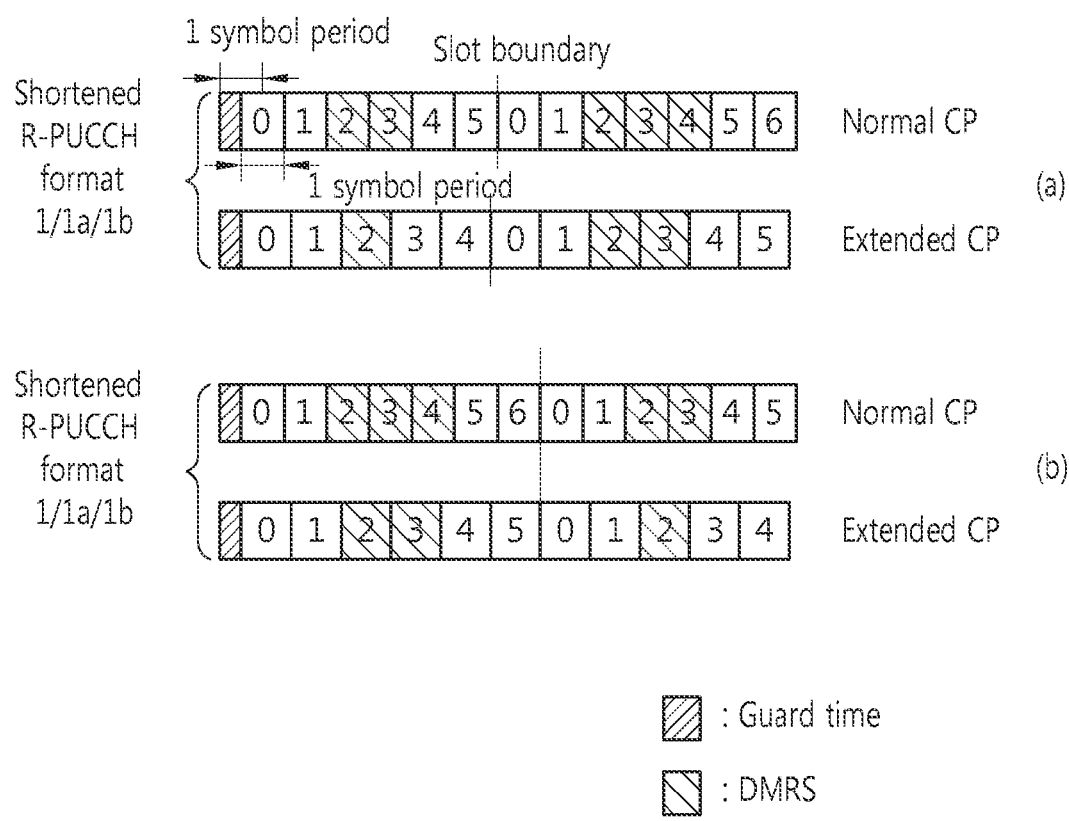
FIG. 19 shows yet another example of shortened R-PUCCH formats if guard time is placed only in the first slot of a subframe in a shifting subframe.

FIG. 19 shows yet another example of shortened R-PUCCH formats if the guard time is placed only in the first slot of a subframe in a shifting subframe.

FIG. 19 is different from FIG. 17 in that one RS symbol is punctured in the first slot or the second slot. That is, in FIG. 19(a), in a normal CP, one of RS symbols allocated to the first slot is punctured. In FIG. 19(b), in a normal CP, one of RS symbols allocated to the second slot is punctured. The number of symbols to which payloads are allocated in the first slot is identical with the number of symbols to which payloads are allocated in the second slot, and the number of symbols to which RSs allocated in the first slot is different from the number of symbols to which RSs allocated in the second slot.

Meanwhile, if the first symbol of a subframe is punctured, the start position of a second symbol in a normal CP is different from the start position of a second symbol in an extended CP. In this case, in order to forcedly make identical the boundaries of the two symbols with each other, additional timing offset signaling may be applied. Alternatively, the boundary of the symbol may be obtained through a blind searching process according to the type of each CP despite some complexity increase.

Even in case of an R-PUSCH through which a relay station transmits uplink data to a BS, the fact that the number of symbols available in a backhaul link is reduced owing to the guard time must be taken into account. Accordingly, the R-PUSCH may use a shortened R-PUSCH format which is a format having the smaller number of symbols than a PUSCH format through which an MS transmits data to a BS. A RS structure used in the shortened R-PUSCH format may be identical with an RS structure used in the PUSCH format in which an MS transmits data to a BS, except symbols used in the guard time. This is called a deletion type RS structure.

Alternatively, the RS structure used in the shortened R-PUSCH format may use a method of shifting the deletion type RS structure. This may be determined according to whether a backhaul UL subframe is a shifting subframe or a non-shifting subframe. If one symbol has been deleted, the indices of R-PUSCH symbols may be assigned 0 to 12 or 1 to 13. Accordingly, the indices of RSs may also be changed.

The RS structure used in the shortened R-PUSCH format may be one symbol type in which an RS is transmitted only in the one symbol of each slot or a type determined according to a resource element (RE) pattern. That is, this is a method of transmitting RSs allocated to some REs, RE groups, and resources blocks (RBs) including REs in a pattern form, not consecutively. The RSs are transmitted only in relevant relay station or relevant resources.

A method of allocating radio resources in order to transmit an R-SRS in a backhaul UL subframe is described below.

Figure 20:
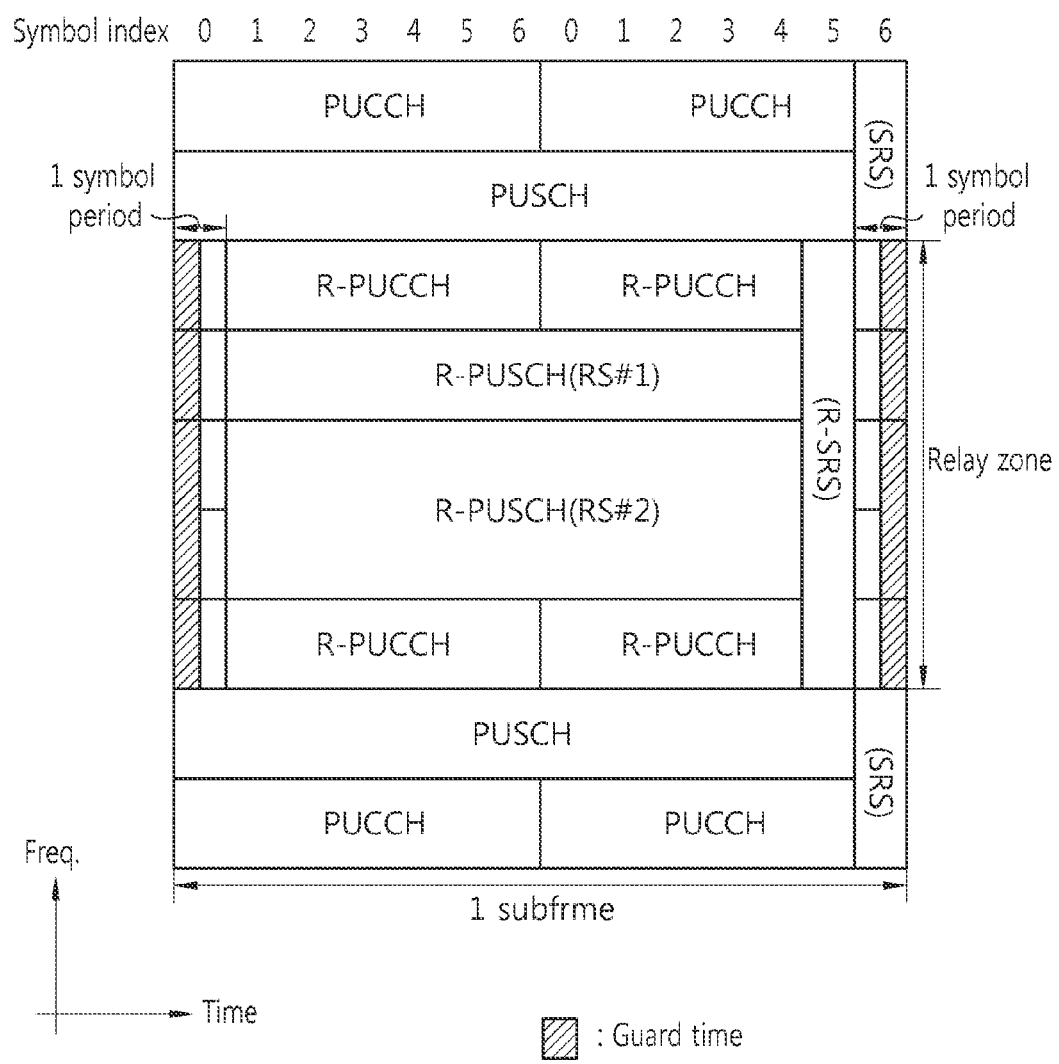
FIG. 20 shows an example in which radio resources are allocated in order to transmit an R-SRS in a non-shifting subframe.

FIG. 20 shows an example in which radio resources are allocated in order to transmit an R-SRS in a non-shifting subframe. The example shows that the guard time is placed in the first symbol and the last symbol of the subframe. FIG. 20 shows an example in which propagation delay, timing offset, and adjustment values are not shown. If propagation delay, timing offset, and adjustment values are taken into consideration, the start and end of available symbols of backhaul channels may be different from those shown in FIG. 20. For example, if the sum total of propagation delay and timing adjustment values is a ½ symbol, the start of available symbols may be behind a ½ symbol.

Assuming that the entire frequency band through which a relay station transmits R-PUCCHs or R-PUSCHs to a BS is a relay zone (this is hereinafter the same), PUSCHs on which a macro UE transmits data to the BS within the relay zone may be determined not to be included.

In this case, the relay station may transmit the R-SRS to the BS through symbols different from those of an SRS transmitted by the macro UE in the time domain. For example, the relay station may transmit the R-SRS in the second symbol from the last of a second slot (i.e., the symbol #5 of the second slot). The relay station may transmit the R-SRS to the BS over the entire relay zone in the frequency domain. Here, the SRS may be transmitted in the bands in which PUCCHs and PUSCHs are transmitted. Accordingly, the BS has only to receive the SRS in the last symbol of a subframe and to perform channel estimation in relation to the macro UE as in the prior art and has only to receive the R-SRS in the second symbol from the last of the subframe and to perform channel estimation in relation to the relay station.

Figure 21:
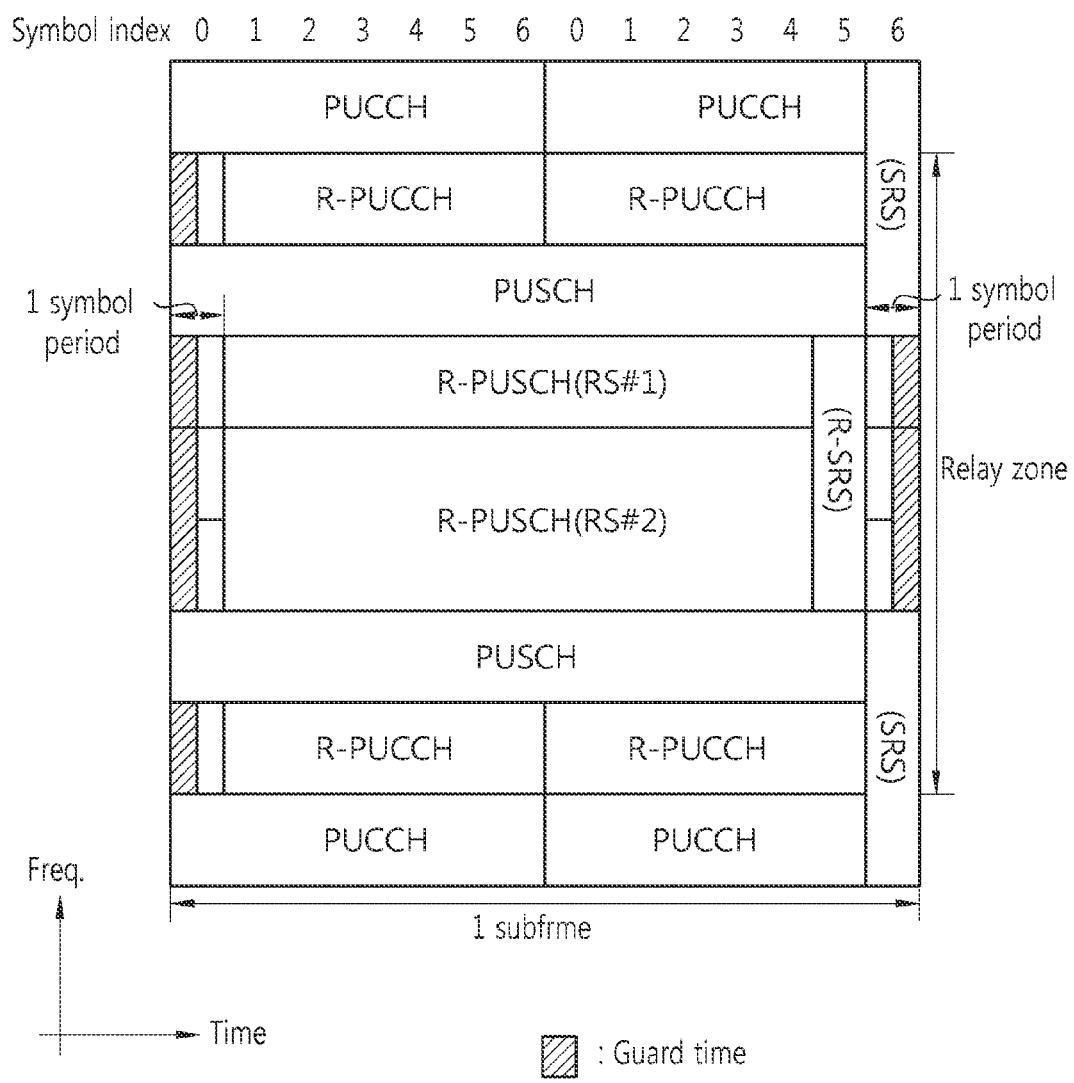
FIG. 21 shows another example in which radio resources are allocated in order to transmit an R-SRS in a non-shifting subframe.

FIG. 21 shows another example in which radio resources are allocated in order to transmit an R-SRS in a non-shifting subframe.

Unlike FIG. 20, FIG. 21 may include PUSCHs transmitted by a macro UE within the relay zone. For example, the PUSCHs may be allocated between bands in which R-PUCCHs are transmitted. In this case, a relay station may transmit the R-SRS to a BS only in relation to the bands in which the R-PUSCHs are transmitted in the frequency domain. The SRS may be transmitted in the bands in which the PUCCH, the R-PUCCH, and the PUSCH are transmitted.

A relay station may transmit the R-SRS to a BS through symbols different from those of an SRS transmitted by a macro UE in the time domain. For example, a relay station may transmit the R-SRS in a second symbol from the last of a second slot (the symbol #5 of the second slot in a normal CP, and the symbol #4 of the second slot in an extended CP). In this case, interference can be minimized by avoiding overlapping with the existing SRS, and multiplexing performance between the existing SRS users is not degraded.

Figure 22:
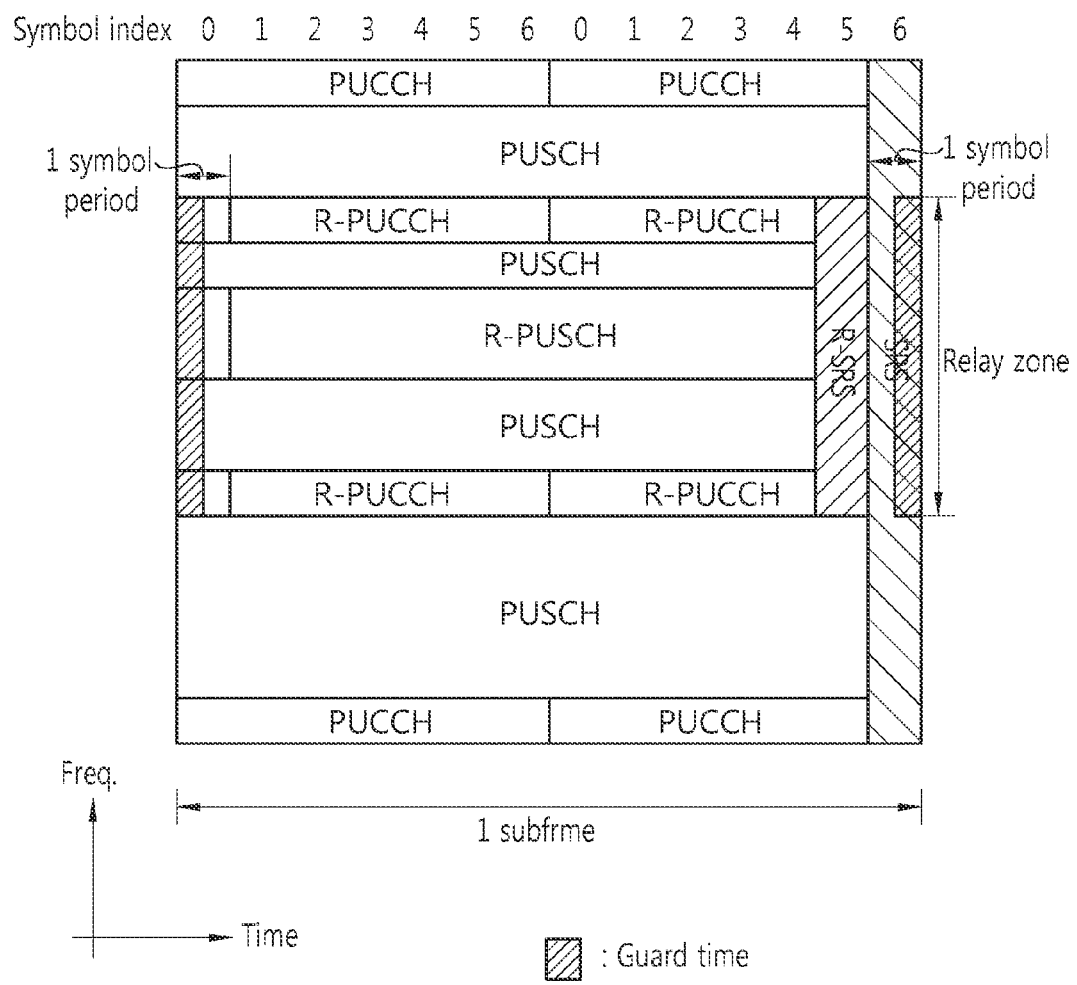
FIG. 22 shows yet another example in which radio resources are allocated in order to transmit an R-SRS in a non-shifting subframe.

FIG. 22 shows yet another example in which radio resources are allocated in order to transmit an R-SRS in a non-shifting subframe.

Unlike in FIG. 21, in FIG. 22, the R-SRS is transmitted over the entire relay zone. That is, the R-SRS is transmitted even in the band to which PUSCHs included in the relay zone are allocated. A relay station may transmit the R-SRS to a BS through symbols different from those of an SRS transmitted by a macro UE in the time domain. For example, a relay station may transmit the R-SRS in a second symbol from the last of a second slot.

It is preferred that the band to which the PUSCHs included in the relay zone are allocated be for only an LTE-A UE. That is, allocation to the LTE MS may be prohibited. If the R-SRS is transmitted within the relay zone as described above, the MS should not transmit uplink data in a second symbol from the last of a subframe. If both the R-SRS and the SRS are transmitted, the MS should not transmit uplink data in the last symbol of the subframe and in the second symbol from the last of the subframe. In order to transmit uplink data using symbols reduced as described above, new rate matching, coding, and interleaving may be used. Accordingly, it is preferred that the uplink data be transmitted in the band to which the PUSCHs included in the relay zone are allocated in relation to only the LTE-A MS. The same rule may be applied to the SRS or the PUSCHs that must be multiplexed with the R-SRS in a relevant subframe period irrespective of whether the R-SRS is transmitted in what frequency band.

In view of characteristic of a backhaul link using resources in TDM, a first symbol, a last symbol, or other symbols may not be actually used for transmission. The symbols are not used as the resources of the backhaul link, but an MS designed to use the symbols may use the symbols for uplink transmission. For example, if a relay station does not use the first symbol of a subframe, the first symbol of the subframe may be allocated to the uplink transmission of a macro UE because the first symbol of a resource block (RB) used by the relay station is all wasted.

Figure 23:
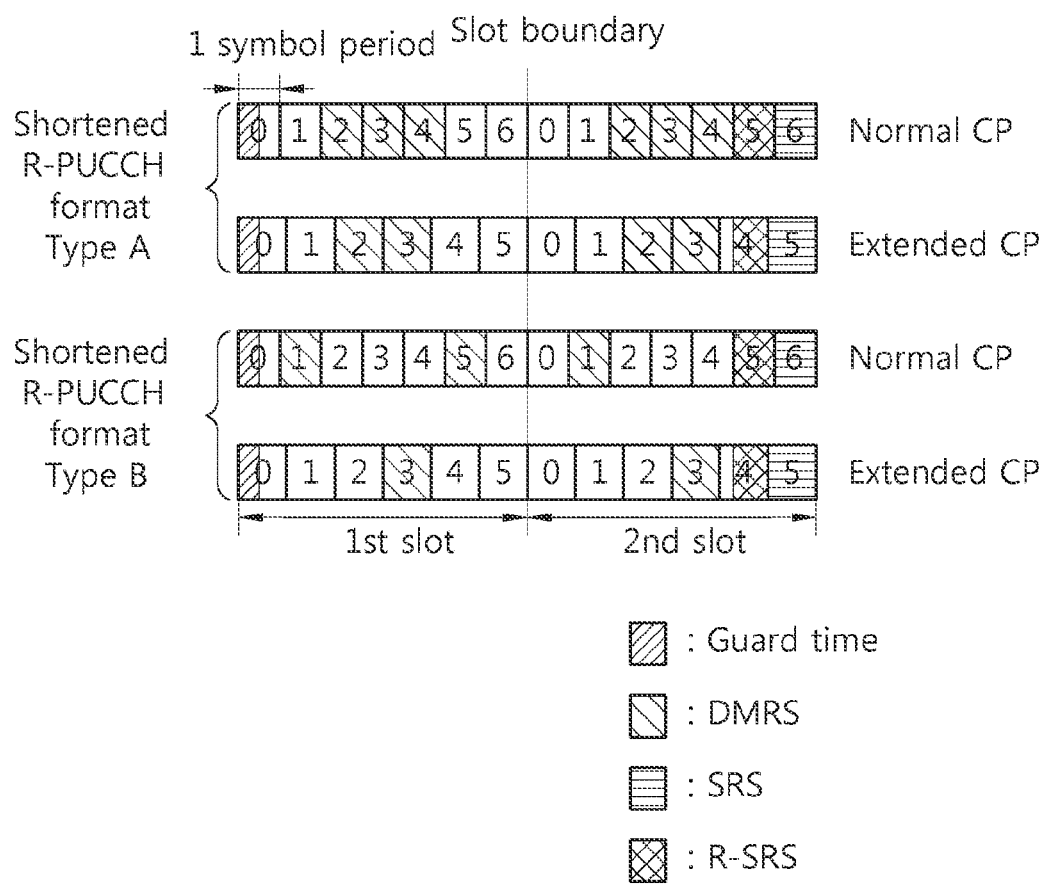
FIG. 23 shows examples of shortened R-PUCCH formats if an SRS and an R-SRS are transmitted in a non-shifting subframe.

FIG. 23 shows examples of shortened R-PUCCH formats if an SRS and an R-SRS are transmitted in a non-shifting subframe.

The shortened R-PUCCH format is the same as the PUCCH format in a scheme for allocating RSs and payloads in each slot, but may be configured to have a format in which a symbol including guard time and a symbol to which an R-SRS or an SRS is allocated are punctured.

For example, in case of a normal CP, a shortened R-PUCCH format type A does not use the first symbol of a first slot owing to the guard time. A DMRS may be allocated to the symbols #2, 3, and 4 of each slot, and a payload may be allocated to the symbols #1, 5, and 6 of a first slot and the symbols #0 and 1 of a second slot. In case of an extended CP, the DMRS may be allocated to the symbols #2 and 3 of each slot, and the payload may be allocated to the symbols #1, 4, and 5 of a first slot and the symbols #0 and 1 of a second slot. In case of the normal CP, an R-SRS is allocated to the symbol #5 of the second slot and an SRS is allocated to the symbol #6 of the second slot. In case of the extended CP, the R-SRS is allocated to the symbol #4 of the second slot, and the SRS is allocated to the symbol #5 of the second slot. That is, the shortened R-PUCCH format type A is the same as the PUCCH format 1/1a/1b in a scheme for allocating the RSs and the payloads, but may be configured to have a format in which a symbol including the guard time and a symbol to which the R-SRS or the SRS is allocated are punctured.

Figure 24:
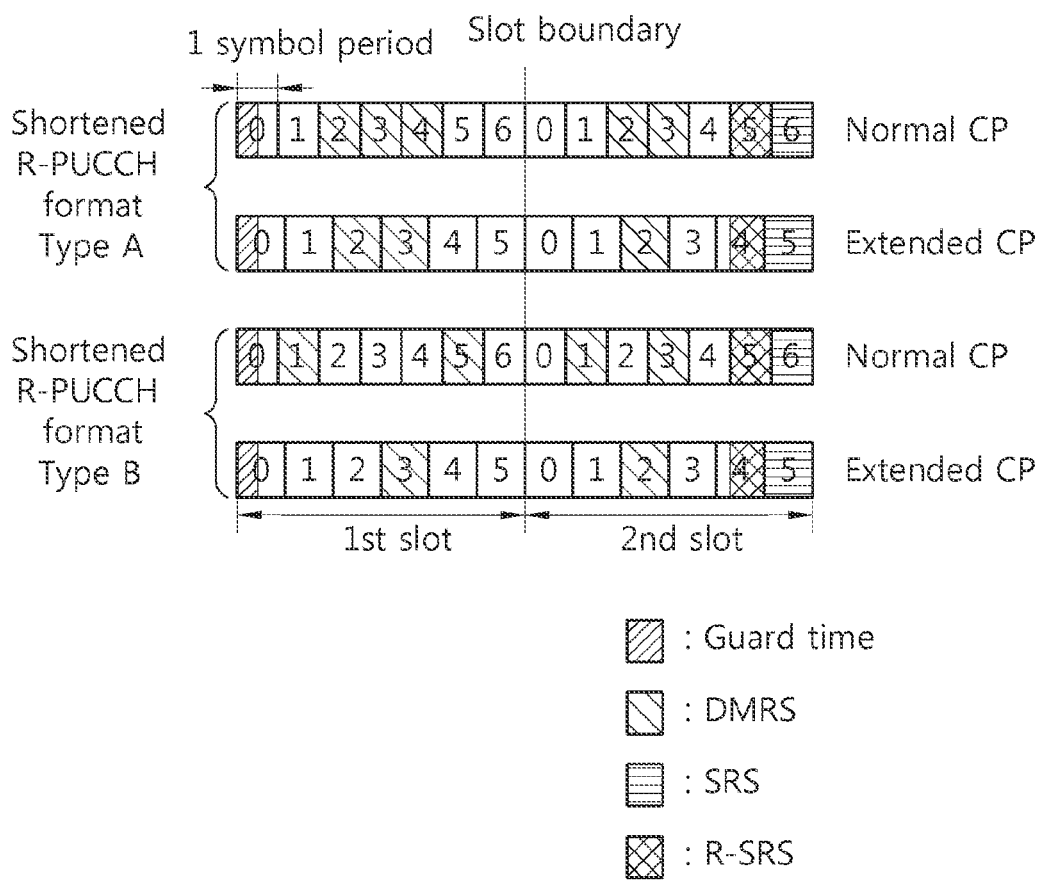
FIG. 24 shows another example of shortened R-PUCCH formats if an SRS and an R-SRS are transmitted in a non-shifting subframe.

In a shortened R-PUCCH format type B, in a normal CP, a DMRS is allocated to the symbols #1 and 5 of a first slot and only the symbol #1 of a second slot. In an extended CP, the DMRS may be allocated to the symbol #3 of the first slot and the symbol #3 of the second slot. That is, the shortened R-PUCCH format type B is the same as the PUCCH format 2/2a/2b in a scheme for allocating the RSs and the payloads, but may be configured to have a format in which a symbol including the guard time and a symbol to which the R-SRS or the SRS is allocated are punctured FIG. 24 shows another example of shortened R-PUCCH formats if an SRS and an R-SRS are transmitted in a non-shifting subframe.

In the shortened R-PUCCH format, a scheme for allocating RSs and payloads may be different for every slot.

For example, in a shortened R-PUCCH format type A, in case of a normal CP, the first symbol of a first slot is not used owing to the guard time. A DMRS is allocated to the symbols #2, 3, and 4 of the first slot and the symbols #2 and 3 of a second slot. A payload may be allocated to the symbols #1, 5, and 6 of the first slot and the symbols #0, 1, and 4 of the second slot. In case of an extended CP, the DMRS may be allocated to the symbols #2 and 3 of a first slot and the symbol #2 of a second slot. The payload may be allocated to the symbols #1, 4, and 5 of the first slot and the symbols #0, 1, and 3 of the second slot. In case of a normal CA, an R-SRS is allocated to the symbol #5 of the second slot, and an SRS is allocated to the symbol #6 of the second slot. In case of an extended CP, the R-SRS is allocated to the symbol #4 of the second slot, and the SRS is allocated to the symbol #5 of the second slot.

In a shortened R-PUCCH format type B, in case of a normal CP, a DMRS may be allocated to the symbols #1 and 5 of a first slot and the symbols #1 and 3 of a second slot. In case of an extended CP, a DMRS may be allocated to the symbol #3 of the first slot and the symbol #2 of the second slot. A payload may be allocated to symbols other than the symbols to which the DMRS, the first symbol of the first slot, the R-SRS, and the SRS are allocated.

Figure 25:
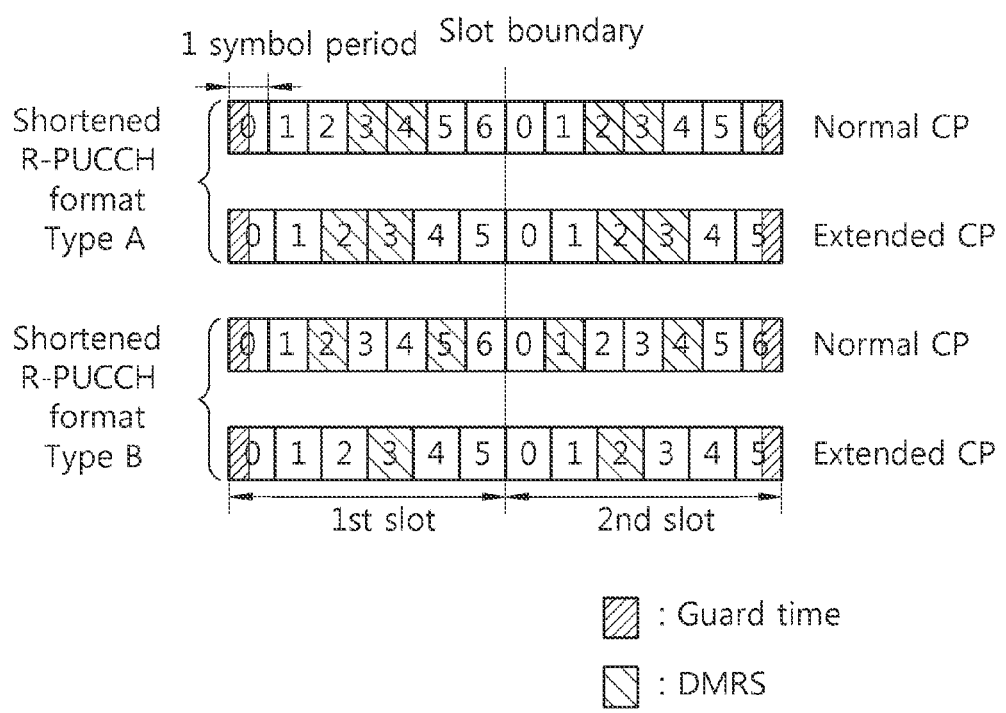
FIG. 25 shows examples of shortened R-PUCCH formats having symmetric structures on the basis of a slot boundary if only an SRS is transmitted in a non-shifting subframe.

FIG. 25 shows examples of shortened R-PUCCH formats having symmetric structures on the basis of a slot boundary if only an SRS is transmitted in a non-shifting subframe.

Referring to FIG. 25, the shortened R-PUCCH format may be a format in which an RS and a payload are symmetrically allocated on the basis of a slot boundary. For example, in a shortened R-PUCCH format type A, in case of a normal CP, a DMRS may be allocated to a symbol spaced from the slot boundary by two symbols or three symbols. That is, the DMRS may be allocated to the symbols #3 and 4 of a first slot and the symbols #2 and 3 of a second slot. The payload may be allocated to the remaining symbols other than symbols to which the guard time are allocated and symbols to which the DMRSs are allocated, in the subframe.

A relay station cannot use the first symbol and the last symbol of a subframe in order to transmit a signal because the guard time is placed in the first symbol and the last symbol of the subframe. If an SRS is transmitted in the last symbol of the subframe and a relay station does not transmit an R-SRS, the relay station may symmetrically allocate the RS and the payload on the basis of the slot boundary. In this case, the relay station may use the shortened R-PUCCH format described with reference to FIG. 25.

Figure 26:
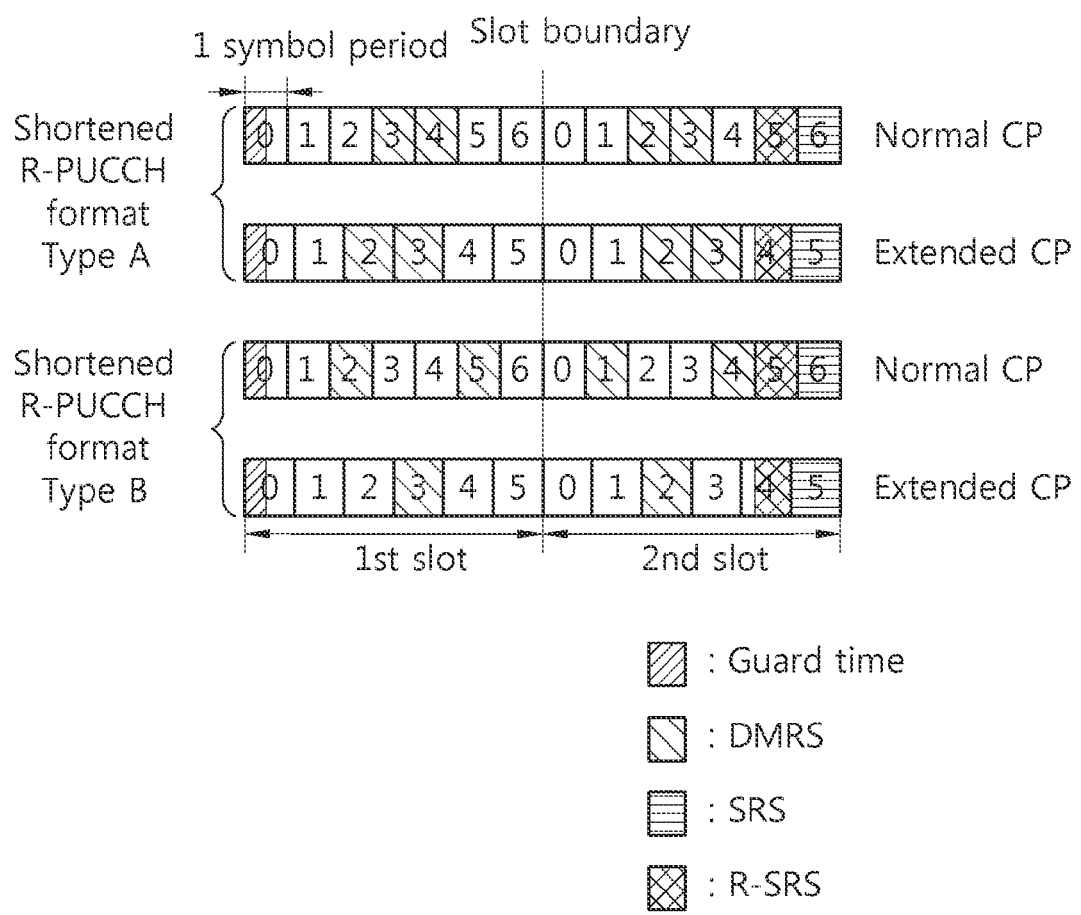
FIG. 26 shows examples of shortened R-PUCCH formats having symmetric structures on the basis of a slot boundary, if an SRS and an R-SRS are transmitted in a non-shifting subframe.

FIG. 26 shows examples of shortened R-PUCCH formats having symmetric structures on the basis of a slot boundary, if an SRS and an R-SRS are transmitted in a non-shifting subframe.

In a shortened R-PUCCH format type A, in case of a normal CP, a DMRS may be allocated to the symbols #3 and #4 of a first slot and the symbols #2 and #3 of a second slot. A payload may be allocated to the symbols #1, #2, #5, and #6 of the first slot and the symbols #0, #1, and #4 of the second slot.

The DMRS or the payload cannot be allocated to the last 2 symbols of the second slot because an R-SRS and an SRS are sequentially placed in the last 2 symbols of the second slot. The DMRS or the payload cannot be allocated to the first symbol of the first slot because the guard time is placed in the first symbol of the first slot. Under the above restriction, a relay station may symmetrically allocate the DMRS and the payload according to a shortened R-PUCCH format having the above symmetric structure. FIG. 26 is different from FIG. 25 in that the second symbol from the last of the second slot is not used.

In the shortened R-PUCCH formats having the symmetric structure described with reference to FIGS. 25 and 26, a case where symbols placed at both ends of a backhaul UL subframe cannot be used has been taken into consideration. Orthogonal sequences used in the shortened R-PUCCH format having the above symmetric structure may also be symmetrical to each other on the basis of the slot boundary. The orthogonal sequences may be used for spreading for increasing the multiplexing capacity.

Figure 27:
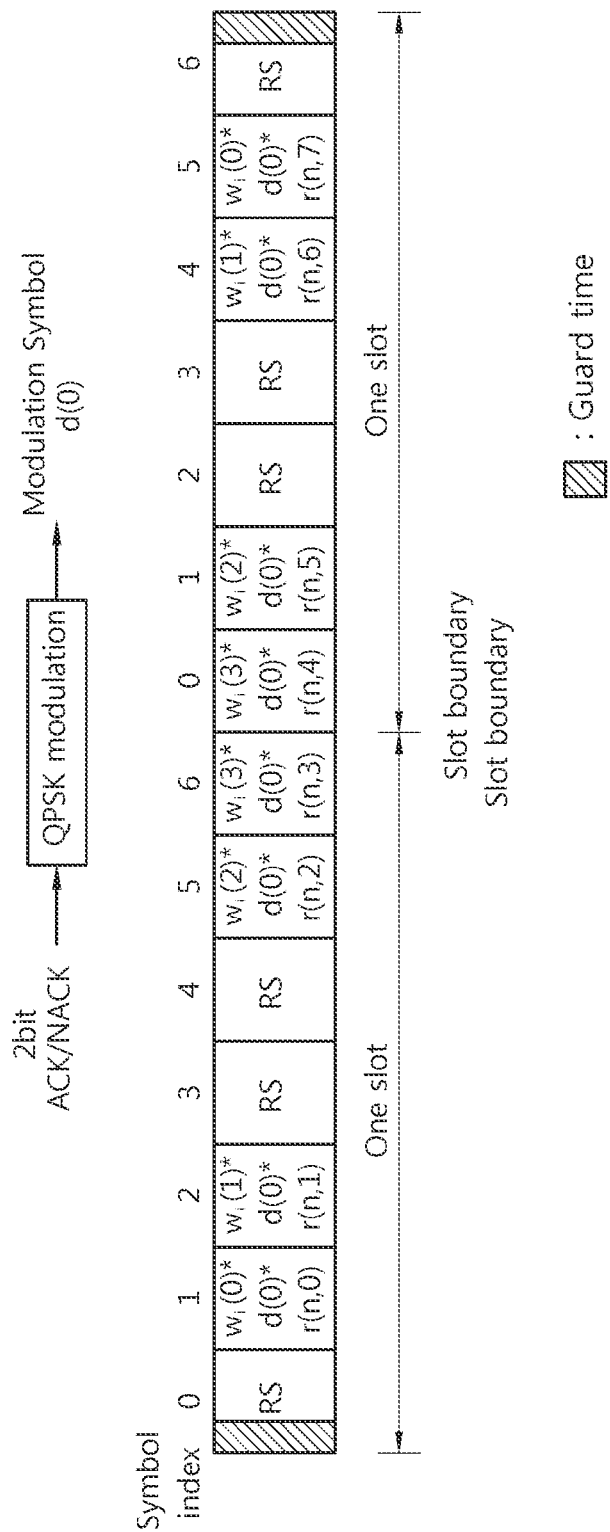
FIG. 27 shows an example in which an orthogonal sequence is applied to a shortened R-PUCCH format having a symmetric structure.

FIG. 27 shows an example in which the orthogonal sequence is applied to the shortened R-PUCCH format having the symmetric structure.

In the shortened R-PUCCH format, for example, payloads, such as ACK/NACK, may be allocated to the symbols #1, 2, 5, and 6 of a first slot and the symbols #0, 1, 4, and 5 of a second slot, and an RS may be allocated to the symbols #3 and 4 of the first slot and the symbols #2 and 3 of the second slot. In this case, in order to transmit the ACK/NACK signal, the ACK/NACK signal of 2 bits is subjected to QPSK modulation to produce one modulation symbol d(0). A modulated sequence m(n) may be generated as in Equation 4 on the basis of the modulation symbol d(0) and a cyclically shifted sequence r(n,a).

$$m(n)=d(0)\cdot r(n,a)$$

In Equation 4, the cyclically shifted sequence r(n,a) refers to a sequence obtained by cyclically shifting a sequence r(n) by a. The modulated sequence m(n) may be generated by multiplexing the cyclically shifted sequence r(n,a) by a modulation symbol. The modulated sequence m(n) may be spread using an orthogonal sequence. The following sequence may be used as an orthogonal sequence $w_i(k)$ (i is a sequence index, $0 \le k \le K-1$) having a spreading factor of K=4.

| SEQUENCE INDEX | [W(0), W(1), W(2), W(3)] |
| --- | --- |
| 0 | [+1 +1 +1 +1] |
| 1 | [+1 −1 +1 −1] |
| 2 | [+1 −1 −1 +1] |

In this case, in the orthogonal sequence, the same value is applied to a symmetrical symbol on the basis of a slot boundary. For example, $w_i(3)$ may be applied to the symbol #6 of a first slot and the symbol #0 of a second slot, $w_i(2)$ may be applied to the symbol #5 of the first slot and the symbol #1 of the second slot, $w_i(1)$ may be applied to the symbol #2 of the first slot and the symbol #4 of the second slot, and $w_i(0)$ may be applied to the symbol #1 of the first slot and the symbol #5 of the second slot.

The conventional method is a method of sequentially applying orthogonal sequence values in each slot. In the conventional method, if the orthogonal sequence value cannot be applied to the first symbol of the first slot and the last symbol of the second slot, complexity may be increased because a different orthogonal sequence value is applied to each slot. However, if the orthogonal sequence values are symmetrically applied on the basis of the slot boundary, the probability that the orthogonal sequence values applicable to the first slot and the second slot may be the same is high. Accordingly, complexity is reduced.

An example in which the orthogonal sequence has the spreading factor K=4 has been described with reference to FIG. 27, but not limited thereto. For example, the following sequence may be used as an orthogonal sequence $w_i(k)$ (i is a sequence index, $0 \le k \le K-1$) having a spreading factor K=3.

| SEQUENCE INDEX | [W(0), W(1), W(2)] |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Alternatively, the following sequence may be used as an orthogonal sequence $w_i(k)$ (i is a sequence index, $0 \le k \le K-1$) having a spreading factor K=2.

| SEQUENCE INDEX | [w(0), w(1)] |
| --- | --- |
| 0 | [1 1] |
| 1 | [1 −1] |

Alternatively, the following sequence may be used as an orthogonal sequence $w_i(k)$ (i is a sequence index, $0 \le k \le K-1$) having a spreading factor K=1.

| SEQUENCE INDEX | [w(0)] |
| --- | --- |
| 0 | [1] |

Figure 28:
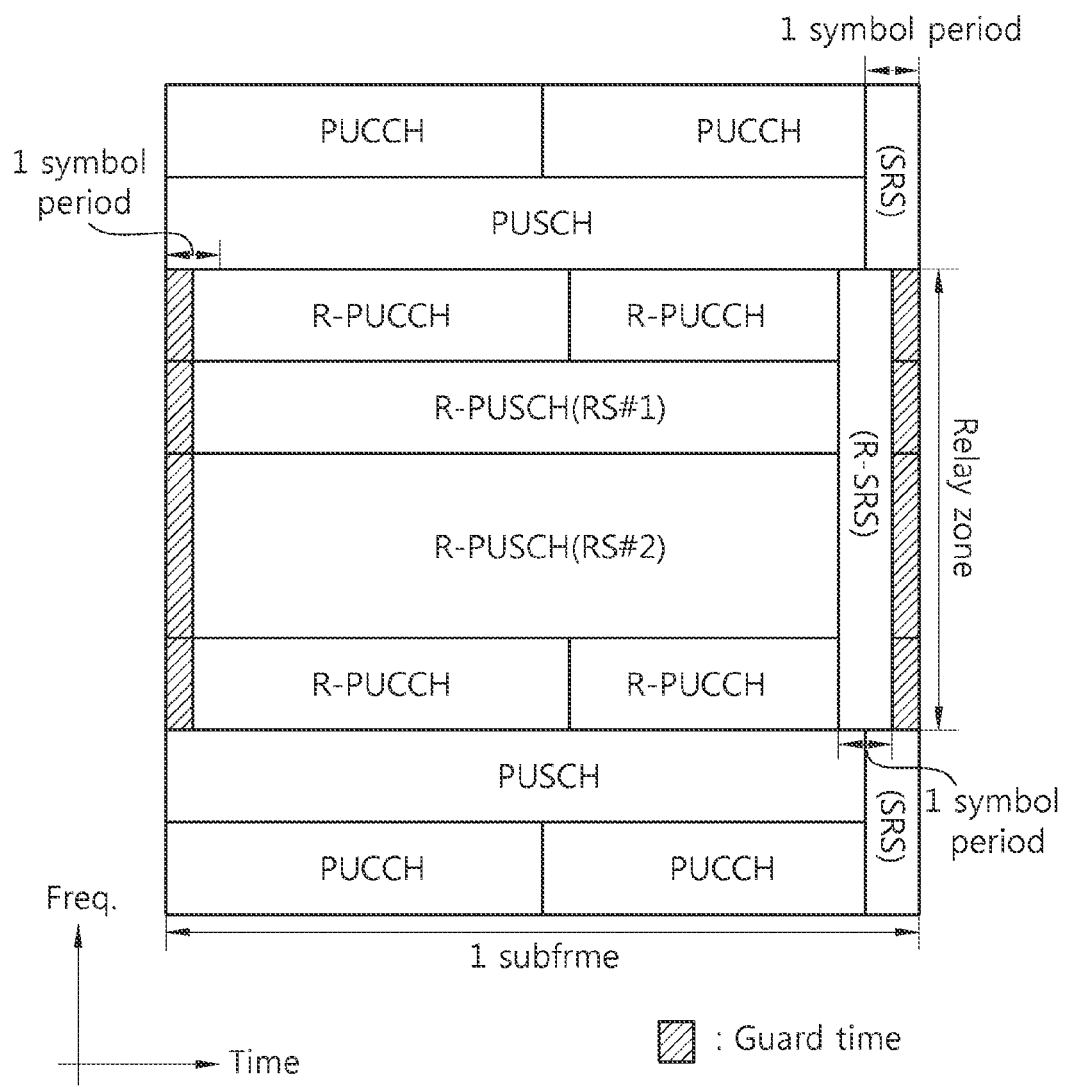
FIG. 28 shows an example of a subframe structure if an R-SRS is transmitted in a shifting subframe.

FIG. 28 shows an example of a subframe structure if an R-SRS is transmitted in a shifting subframe.

PUSCHs transmitted from a macro UE to a BS within a relay zone may be determined not to be included. In this case, a relay station may transmit the R-SRS to the BS through symbols deviated from SRSs, transmitted by the macro UE, by the guard time in the time domain. The relay station may transmit the R-SRS to the BS over the entire relay zone in the frequency domain. The SRSs may be transmitted in the bands in which PUCCHs and the PUSCHs are transmitted. FIG. 28 is different from FIG. 20 in that a symbol is deviated by guard time in the relay zone.

Figure 29:
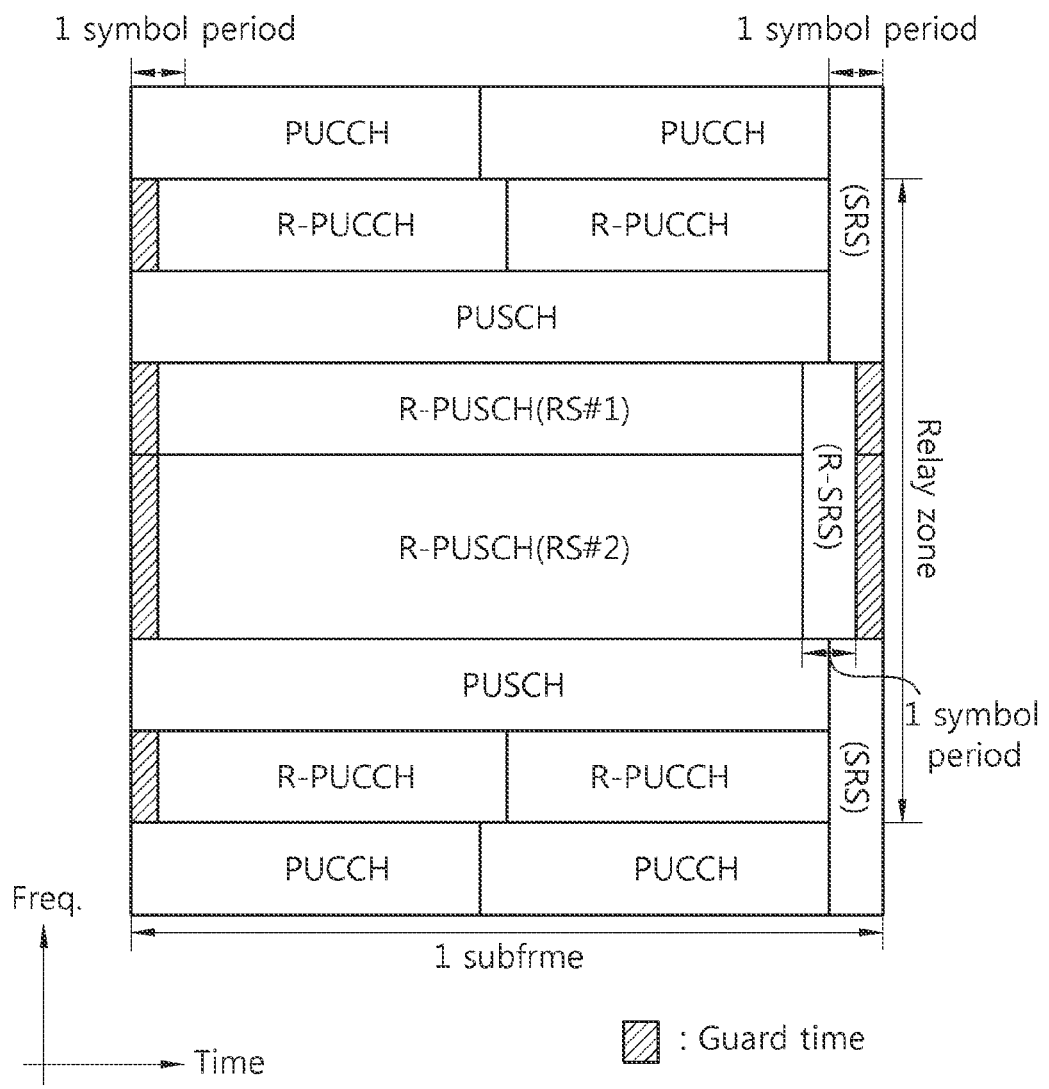
FIG. 29 shows another example of a subframe structure if an R-SRS is transmitted in a shifting subframe.

FIG. 29 shows another example of a subframe structure if an R-SRS is transmitted in a shifting subframe.

FIG. 29 may include PUSCHs transmitted by a macro UE within a relay zone, unlike FIG. 28. For example, the PUSCHs may be allocated between the bands in which R-PUCCHs are transmitted and the bands in which R-PUSCHs are transmitted. In this case, a relay station may transmit the R-SRS to a BS only in the bands in which the R-PUSCHs are transmitted in the frequency domain.

The relay station may transmit the R-SRS to the BS through symbols deviated from the SRSs, transmitted by the macro UE, by the guard time in the time domain. FIG. 29 is different from FIG. 21 in that a symbol boundary is shifted by the guard time in the R-PUCCHs and the R-PUSCHs included in the relay zone.

Figure 30:
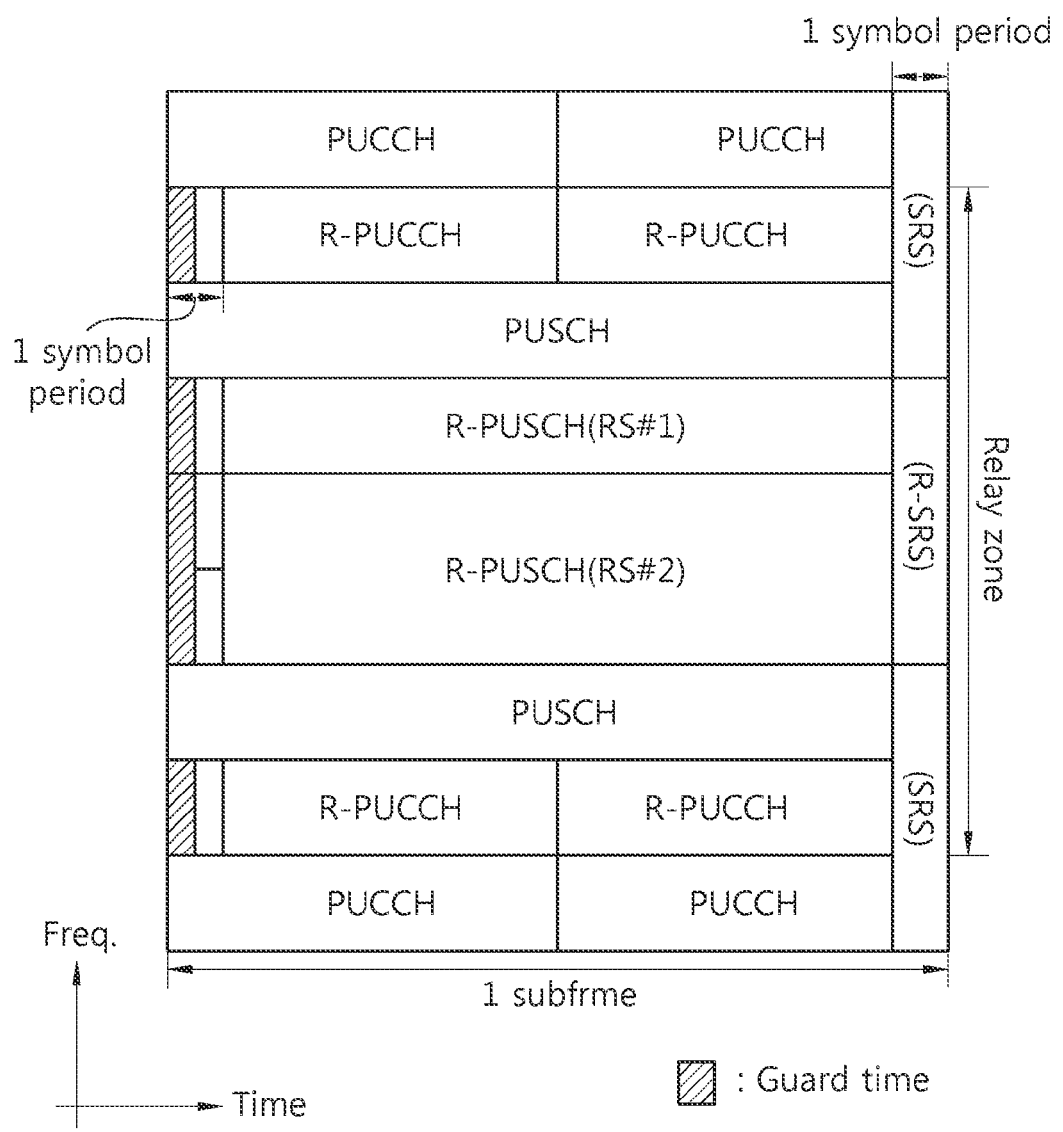
FIG. 30 shows an example of a subframe structure if guard time is placed only in the first symbol and an R-SRS is transmitted in a non-shifting subframe.

FIG. 30 shows an example of a subframe structure if the guard time is placed only in the first symbol and an R-SRS is transmitted in a non-shifting subframe.

If the guard time is placed only in the first symbol in the non-shifting subframe, the R-SRS may be transmitted in the last symbol of a second slot. That is, a relay station may transmit the R-SRS in the last symbol of the subframe in the time domain. In other words, the relay station may transmit the R-SRS in the same symbol as a symbol through which an MS transmits an SRS to a BS. The relay station may transmit the R-SRS only in the bands in which R-PUSCHs are transmitted in the relay zone. The SRS may be transmitted in the bands in which PUCCHs, the R-PUCCHs, and PUSCHs are transmitted.

Figure 31:
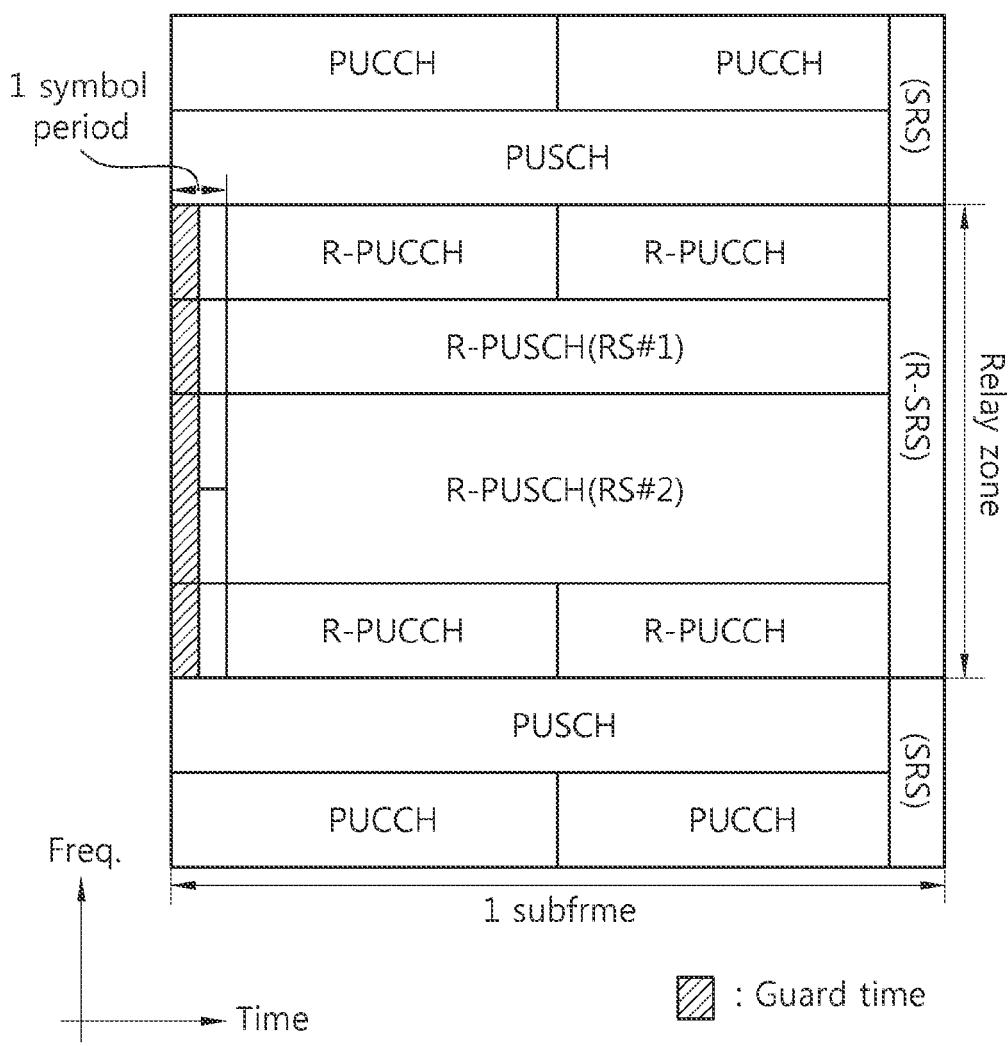
FIG. 31 shows another example of a subframe structure if guard time is placed only in the first symbol and an R-SRS is transmitted in a non-shifting subframe.

FIG. 31 shows another example of a subframe structure if the guard time is placed only in the first symbol and an R-SRS is transmitted in a non-shifting subframe.

Like in FIG. 30, if the guard time is placed only in the first symbol in the non-shifting subframe, the R-SRS may be transmitted in the last symbol of a second slot. That is, a relay station may transmit the R-SRS the last symbol of the subframe in the time domain. FIG. 31 is different from FIG. 30 in that a PUSCH band is not included in the relay zone and the R-SRS is transmitted over the entire relay zone.

Figure 32:
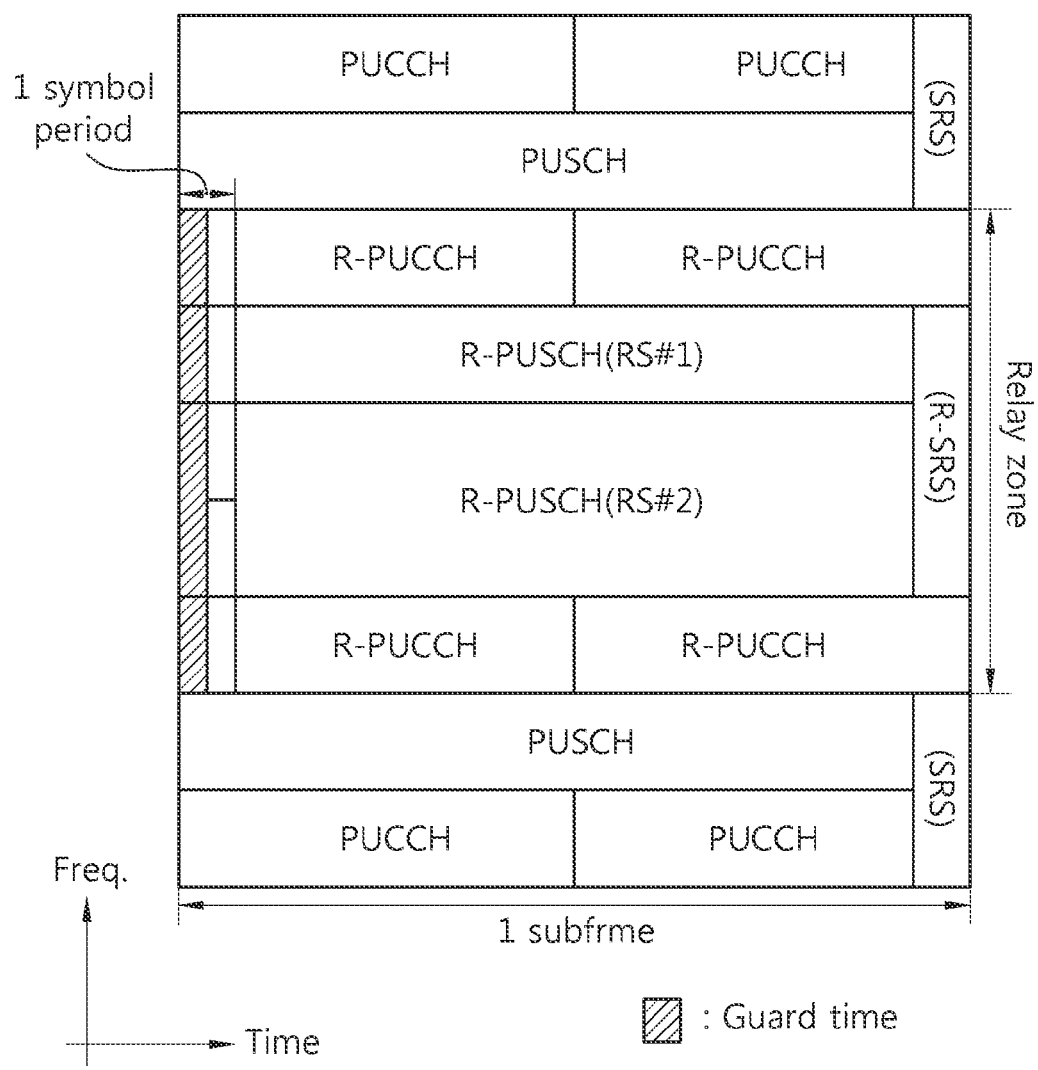
FIG. 32 shows yet another example of a subframe structure if guard time is placed only in the first symbol and an R-SRS is transmitted in a non-shifting subframe.

FIG. 32 shows yet another example of a subframe structure if the guard time is placed only in the first symbol and an R-SRS is transmitted in a non-shifting subframe.

Like the embodiment described with reference to FIG. 31, if the guard time is placed only in the first symbol in the non-shifting subframe, the R-SRS may be transmitted in the last symbol of a second slot. That is, a relay station may transmit the R-SRS in the last symbol of the subframe in the time domain. FIG. 32 is different from FIG. 31 in that the R-SRS is transmitted only in the bands in which R-PUSCHs are transmitted in the relay zone. Furthermore, FIG. 32 is different from FIG. 31 in that both the R-SRS and the SRS are not transmitted in the band in which R-PUCCHs are transmitted. That is, the last symbol of the second slot may be use to transmit a payload or a DMRS in the band in which the R-PUCCH is transmitted.

Figure 33:
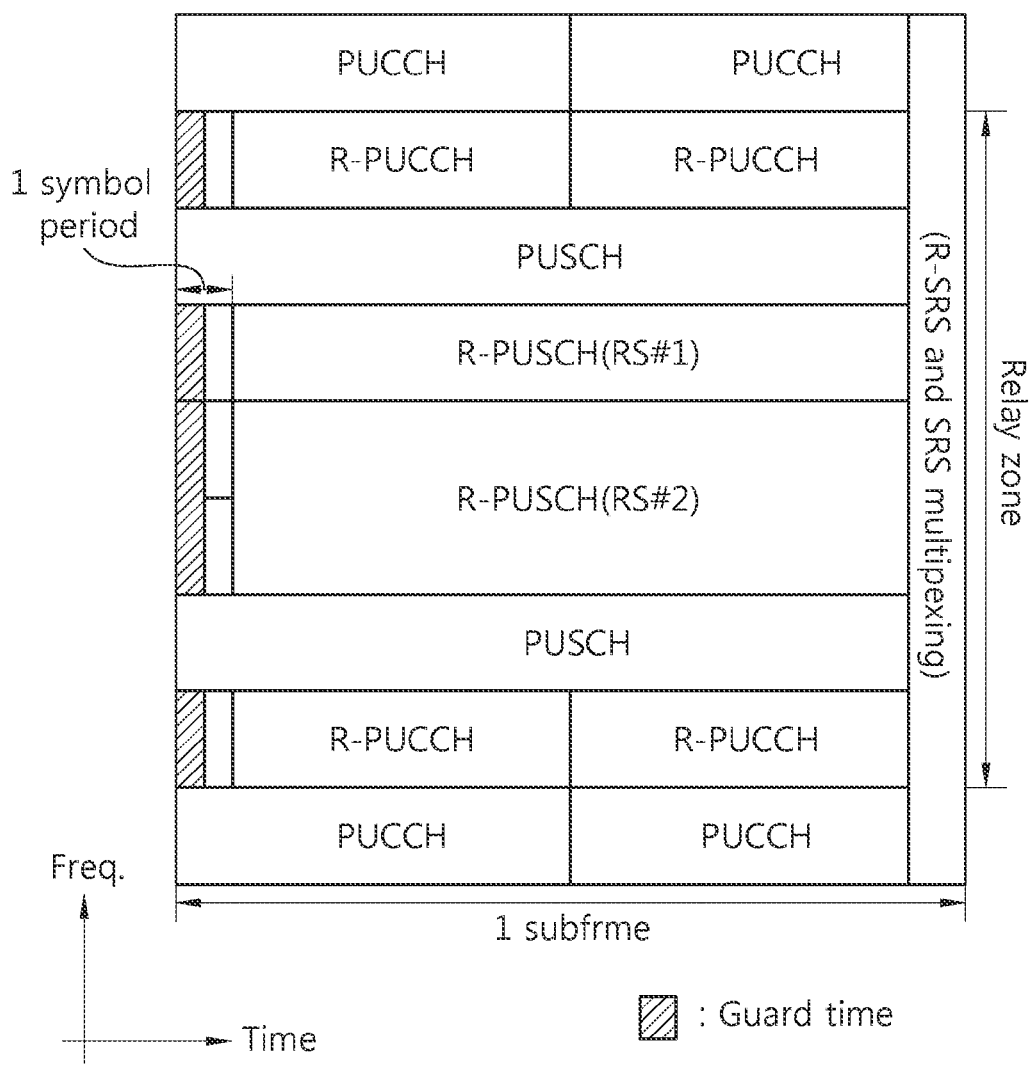
FIGS. 33 and 34 show still another example of subframe structures if guard time is placed only in the first symbol and an R-SRS is transmitted in a non-shifting subframe.
Figure 34:
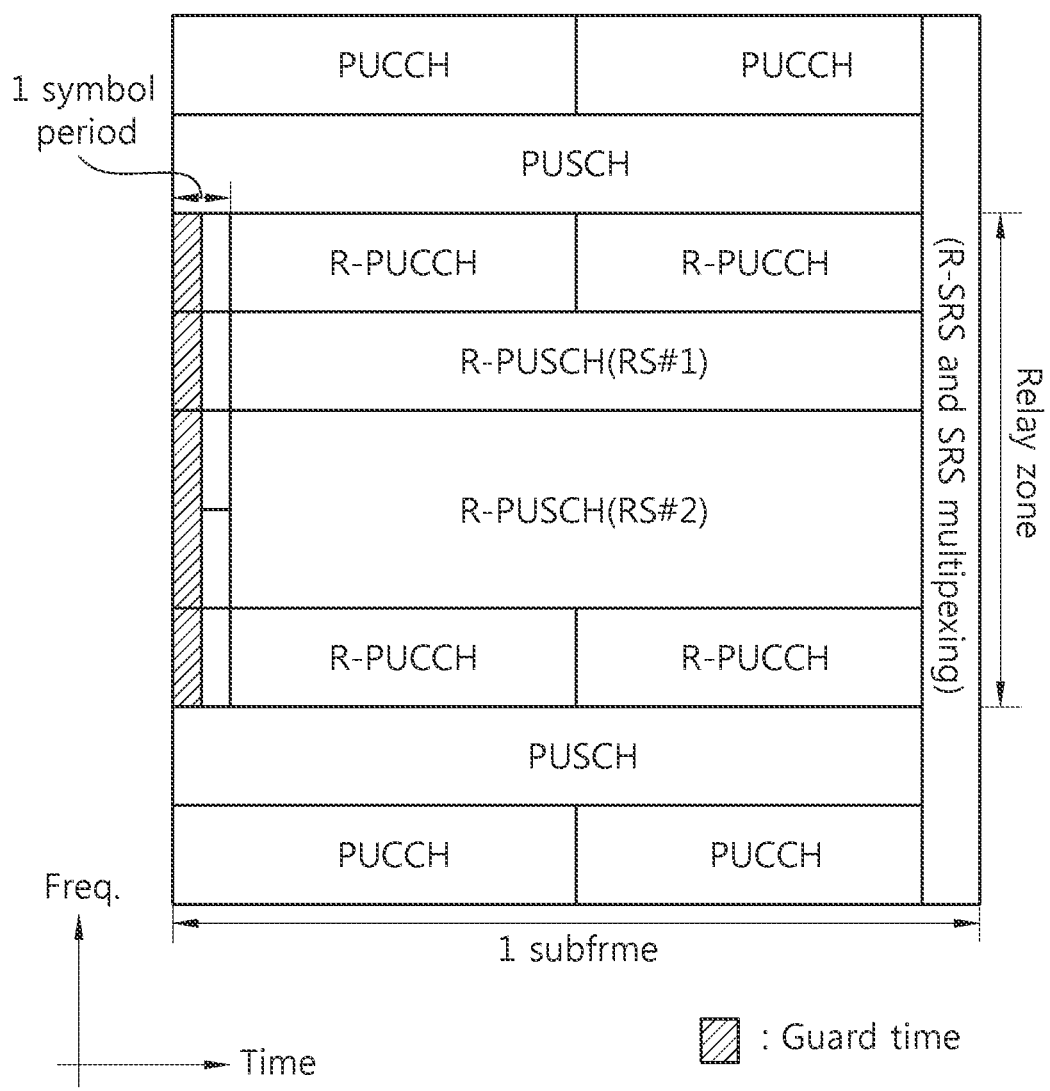

FIGS. 33 and 34 show still another example of subframe structures if the guard time is placed only in the first symbol and an R-SRS is transmitted in a non-shifting subframe.

A difference between FIG. 33 and FIG. 34 lies in that whether a PUSCH band can be included in the relay zone. That is, whether regions not allocated to transmit R-PUCCHs and R-PUSCHs can be reused to transmit the PUSCH in the relay zone. FIG. 33 shows a case where bands not allocated for R-PUCCH transmission and R-PUSCH transmission in the relay zone are reused for PUSCH transmission, and FIG. 34 shows a case where the bands not allocated for the R-PUCCH transmission and the R-PUSCH transmission in the relay zone are not reused for the PUSCH transmission.

The R-SRS may be transmitted in the last symbol of a second slot because the guard time is placed only in the first symbol of the non-shifting subframe. That is, a relay station may transmit the R-SRS in the last symbol of the subframe in the time domain. In this case, the R-SRS and an SRS are multiplexed over the entire system in the last symbol of the subframe. A method of multiplexing the R-SRS and the SRS is described below.

Figure 35:
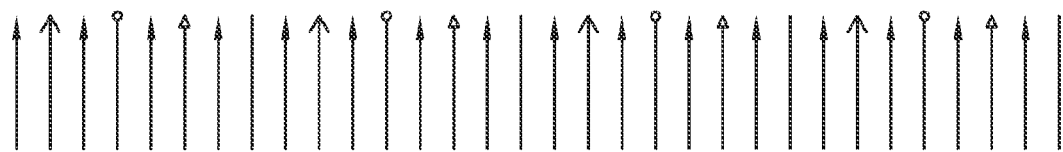
FIG. 35 shows a method of multiplexing an R-SRS and an SRS in the subframe structures of FIGS. 33 and 34.

FIG. 35 shows a method of multiplexing the R-SRS and the SRS in the subframe structures of FIGS. 33 and 34.

In the entire system band, subcarriers or resource elements can be sequentially indexed. In this case, a subcarrier having an even index may be allocated to transmit the SRS, and subcarrier having an odd index may be allocated to transmit the R-SRS. The opposite is also possible.

Alternatively, a subcarrier having an index of a multiple of an integer number may be allocated to transmit the R-SRS. For example, a subcarrier having an index of 4*N (N is a natural number) may also be allocated to transmit the R-SRS.

Alternatively, the subcarriers may also be allocated so that a plurality of the R-SRSs is distinguished from each other. For example, if four relay stations transmit respective R-SRSs in the same symbol, a subcarrier having an index (8m+1) may be allocated to the relay station 1, a subcarrier having an index (8m+3) may be allocated to the relay station 2, a subcarrier having an index (8 m+5) may be allocated to the relay station 3, and a subcarrier having an index (8 m+7) may be allocated to the relay station 4 in the entire system band so that the relay stations may use the respective subcarriers to transmit the R-SRSs (where m=0, 1, 2, . . . ). Here, a subcarrier having an even index may be allocated to transmit an SRS. Here, the relay stations 1, 2, 3, and 4 may be different relay stations or the same relay station. If the relay stations 1, 2, 3, and 4 are the same relay station, it may mean that a plurality of R-SRSs is transmitted from one relay station.

In the above example, in order to avoid a collision between the SRS and the R-SRS, the subcarrier allocated to the R-SRS may not be allocated to the SRS. To this end, a parameter for distinguishing the subcarriers on which the SRS and the R-SRS are transmitted from each other may be transmitted through a higher layer signal, such as RRC signaling. For example, if a value of the parameter is 0, it may indicate the subcarrier on which the SRS is transmitted. If a value of the parameter is 1, it may indicate the subcarrier on which the R-SRS is transmitted.

A method of allocating the SRS and the R-SRS to different subcarriers in the entire system band, allocating the R-SRS to subcarriers placed between subcarriers to which the SRS is allocated, and then multiplexing the SRS and the R-SRS as described above is called a transmission comb, for the sake of convenience.

In each of the subframe structures described with reference to FIGS. 28 to 34, the relay zone or the band in which the R-PUSCH is transmitted may be configured semi-statically.

A case where the placement of guard time between two consecutive subframes is unnecessary is described, and a method of utilizing radio resources generated because the guard time is not placed is described.

The following table shows a case where the guard time is necessary and a case where the guard time is unnecessary.

| Subframe Configuration | 1st subframe | 2nd subframe | Need for guard time between two subframes |
|---|---|---|---|
| FDD/TDD | Access UL (Rx) | Backhaul UL (Tx) | Yes |
| UL to UL | Backhaul UL (Tx) | Access UL (Rx) | Yes |
|  | Backhaul UL (Tx) | Backhaul UL (Tx) | No |
| TDD | Backhaul DL (Rx) | Backhaul UL (Tx) | Yes |
| DL to UL | Access DL (Tx) | Backhaul UL (Tx) | Yes |
| TDD | Backhaul UL (Tx) | Backhaul DL (Rx) | Yes |
| UL to DL | Backhaul UL (Tx) | Access DL (Tx) | Yes |

Referring to the above table, the placement of guard time between two consecutive subframes is unnecessary only when a relay station transmits a signal to a BS in the first subframe and then transmits a signal to the BS even in the second subframe in FDD or TDD.

Figure 36:
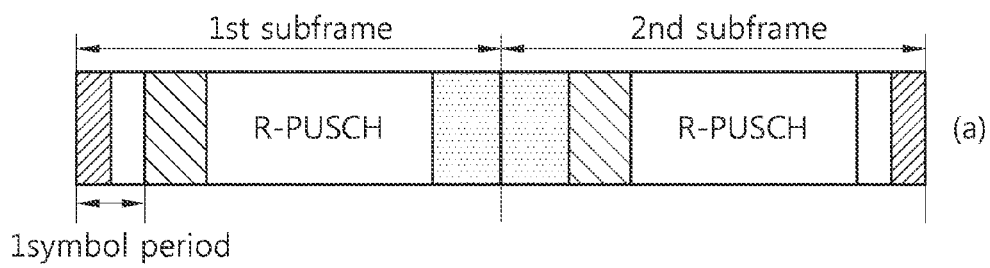
FIG. 36 shows radio resources generated when the placement of guard time between two consecutive subframes is unnecessary, in relation to a non-shifting subframe and a shifting subframe.
Figure 36:
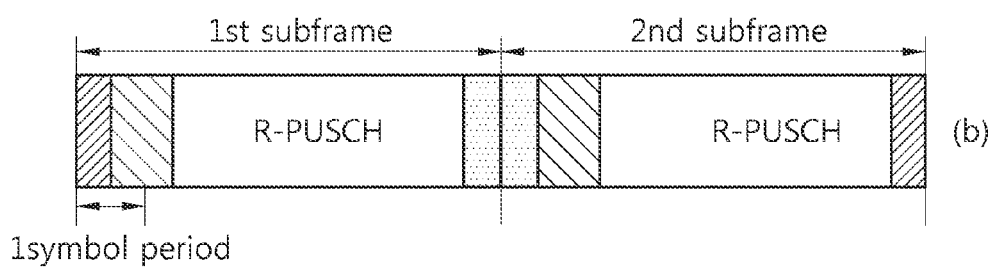

FIG. 36 shows radio resources generated when the placement of the guard time between two consecutive subframes is unnecessary in relation to a non-shifting subframe and a shifting subframe. FIG. 36(a) shows the non-shifting subframe, and FIG. 36(b) shows the shifting subframe.

Radio resources generated between two consecutive subframes because guard time is not placed are called special resources. The special resources may be used for various purposes. For example, the special resources may be used for an R-PUSCH, an R-PUCCH, BSI reporting, and an SRS. If the special resources are used for an R-PUSCH, an R-PUCCH, BSI reporting, and an SRS, relevant information may be transmitted aperiodically or in a fixed cycle.

Aperiodic BSI reporting may be scheduled like in 3GPP LTE release 8.

Figure 37:
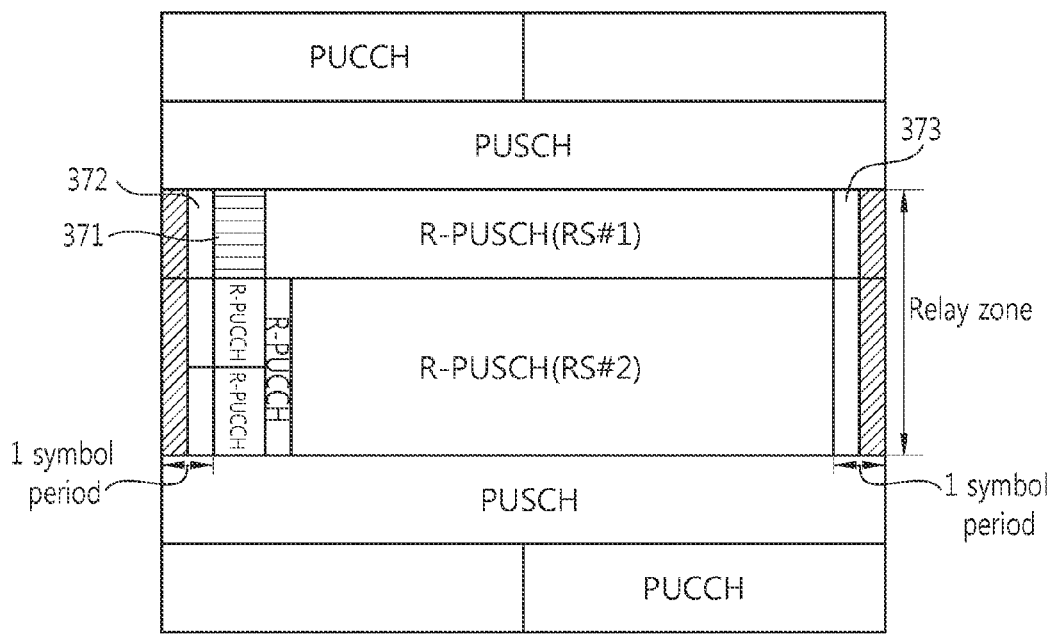
FIG. 37 shows a subframe structure in which an R-PUCCH and an R-PUSCH are subjected to TDM if guard time is placed in the first symbol and the last symbol of a non-shifting subframe.

FIG. 37 shows a subframe structure in which an R-PUCCH and R-PUSCHs are subjected to TDM if the guard time is placed in the first symbol and the last symbol of a non-shifting subframe.

A relay zone is allocated to a specific frequency band between frequency bands in which PUCCHs are transmitted. That is, the relay zone may be allocated to a frequency band in which a PUSCH is transmitted.

The R-PUCCH and the R-PUSCH are subjected to TDM within the relay zone. That is, the R-PUCCH and the R-PUSCH are distinguished from each other in the time domain. A relay station may not use a first symbol or a last symbol or both within the relay zone to transmit a signal because guard time is placed in the first symbol or the last symbol or both. Furthermore, frequency bands may be distinguished from each other for every relay station within the relay zone and then allocated.

The R-PUCCH is not necessarily transmitted within a frequency band allocated to each relay station. For example, in FIG. 37, in case of a relay station 1 RS #1, the R-PUCCH is not transmitted, but only the R-PUSCH is transmitted in the allocated frequency band. In case of a relay station 2 RS #2, both the R-PUCCH and the R-PUSCH are transmitted in the allocated frequency band. If the R-PUCCH is not transmitted, relevant radio resources 371 may be used to transmit the R-PUSCH. The radio resources 371 may be a resource element or a CDM (code division multiplexing) resource element. The CDM resource element may be used when a plurality of payloads (e.g., a plurality of ACK/NACK) has to be transmitted in the radio resources 371.

Alternatively, the relevant radio resources 371 may be left for R-PUCCH transmission although the R-PUCCH is not actually transmitted. A CCE index to which the R-PUCCH is allocated may be determined by the CCE index of the R-PDCCH. The radio resources 371 are hereinafter called a reservation region.

The R-PUSCH may use only a smaller number of symbols than that of a PUSCH owing to guard time and symbols on which the R-PUCCH is transmitted in the time domain. The number of symbols used in the R-PUSCH may be set to a specific number in order to reduce implementation complexity or a different number of symbols may be used for every relay station.

FIG. 37 illustrates the case where the guard time is placed in the first symbol and the last symbol of the non-shifting subframe, but the guard time may be placed only in the first symbol of the non-shifting subframe. In this case, the R-PUSCH may also be transmitted in the last symbol of the non-shifting subframe.

If the guard time is placed in the first symbol and the last symbol within the relay zone and the guard time is smaller than one symbol (e.g., the guard time is a ½ symbol), radio resources of a ½ symbol remain in each of the first symbol and the last symbol. In case of the relay station 1, radio resources 372 and 373 are combined, and thus radio resources of one symbol or more may remain in the time domain.

Figure 38:
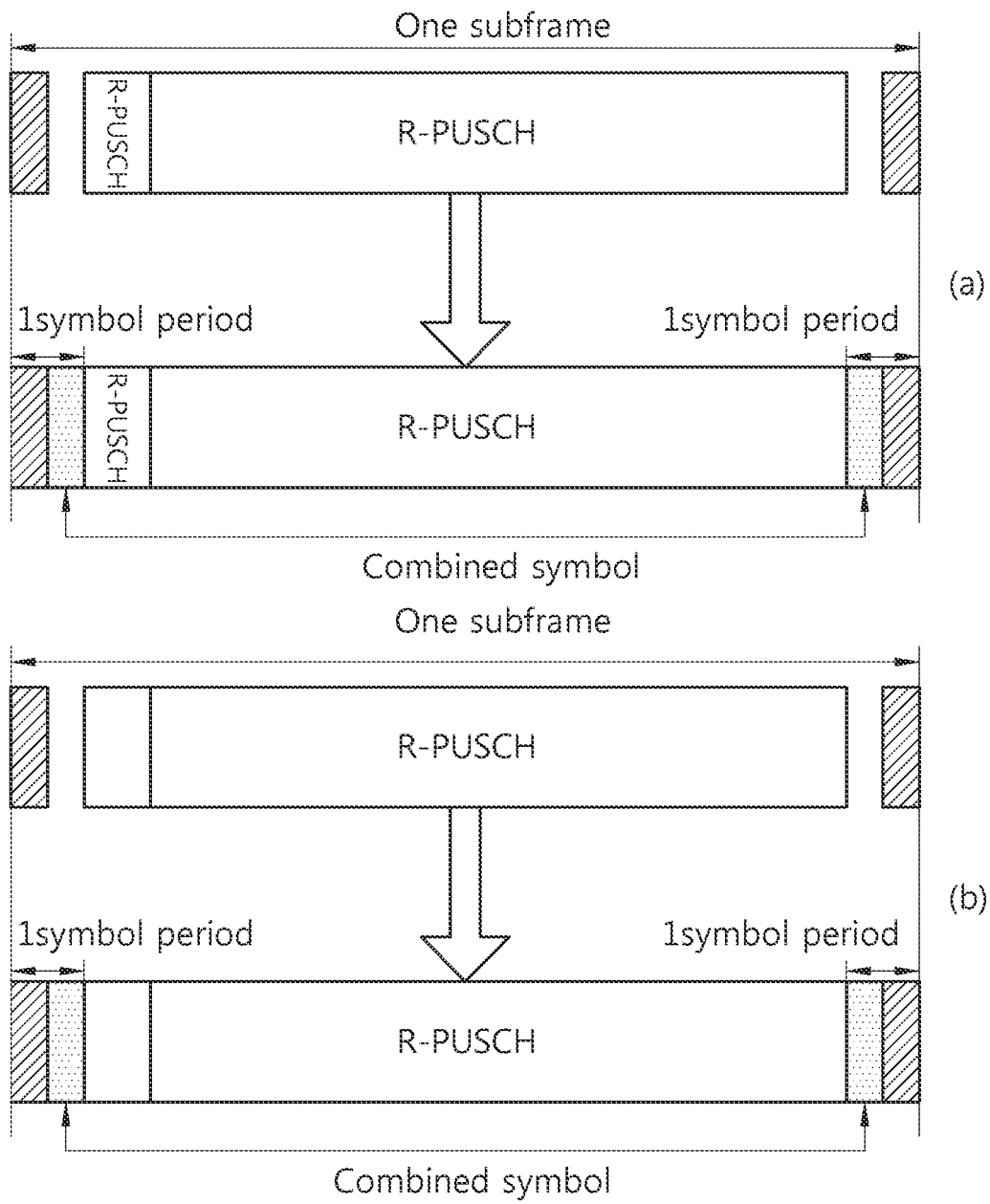
FIG. 38 shows radio resources remained in the first symbol and the last symbol of a non-shifting subframe if guard time is placed in the first symbol and the last symbol.

FIG. 38 shows radio resources remained in the first symbol and the last symbol of a non-shifting subframe if the guard time is placed in the first symbol and the last symbol. The guard time may be, for example, a ½ symbol.

Referring to FIG. 38(a) and FIG. 38(b), the radio resources remained in the first symbol and the last symbol may be combined to form one symbol. FIG. 38(a) shows a case where an R-PUCCH is transmitted. Here, the combined symbol may be used for R-PUCCH or R-PUSCH transmission. FIG. 38(b) shows a case where an R-PUCCH is not transmitted. In this case, the combined symbol may be used for only R-PUSCH transmission.

Figure 39:
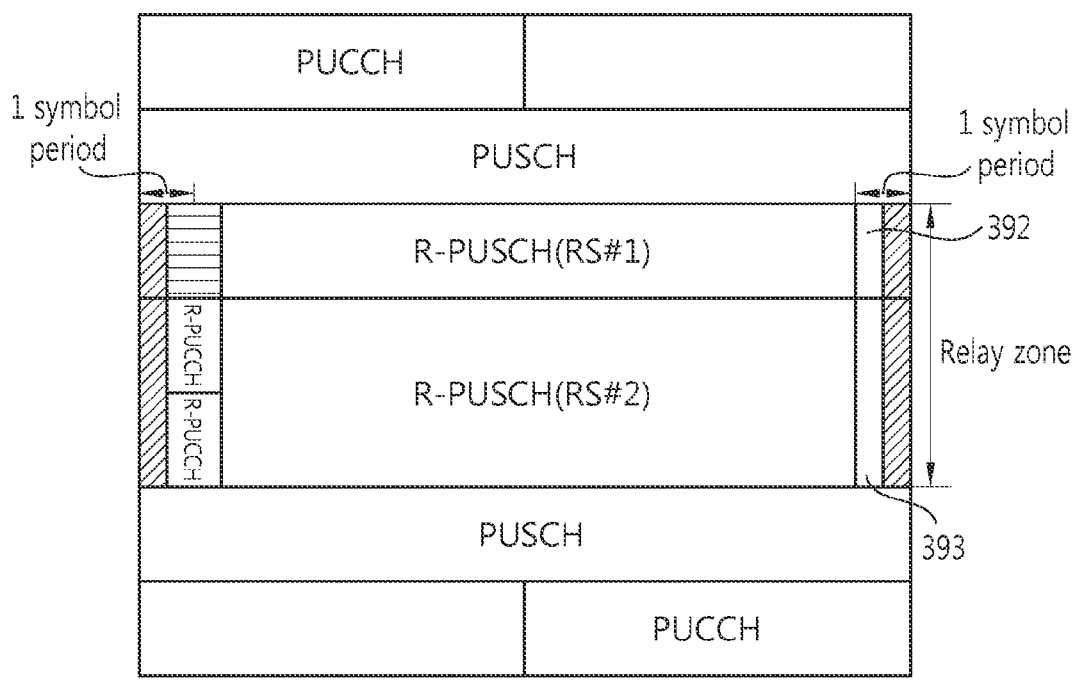
FIG. 39 shows a subframe structure in which an R-PUCCH and an R-PUSCH are subjected to TDM if guard time is placed in the first symbol and the last symbol of a shifting subframe.

FIG. 39 shows a subframe structure in which an R-PUCCH and an R-PUSCH are subjected to TDM if the guard time is placed in the first symbol and the last symbol of a shifting subframe.

FIG. 39 is different from FIG. 37 in that the boundary of a symbol is forward shifted in the time domain of a relay zone. Accordingly, the relay zone may not be identical with a band in which a PUSCH is transmitted at the boundary for every symbol. Furthermore, the number of symbols included in the relay zone may be increased as compared with FIG. 37. For example, if each guard time is a ½ symbol in case of a normal CP, the relay zone may use 12 symbols in the time domain in FIG. 37, but the relay zone may use 13 symbols in the time domain in FIG. 39. If a radio resource region 392 or 393 generated because a symbol boundary has moved is called a special resource region, the special resource region may be used for R-PUSCH transmission. The method of FIG. 39 is the same as the method described with reference to FIG. 37 except the above difference.

Figure 40:
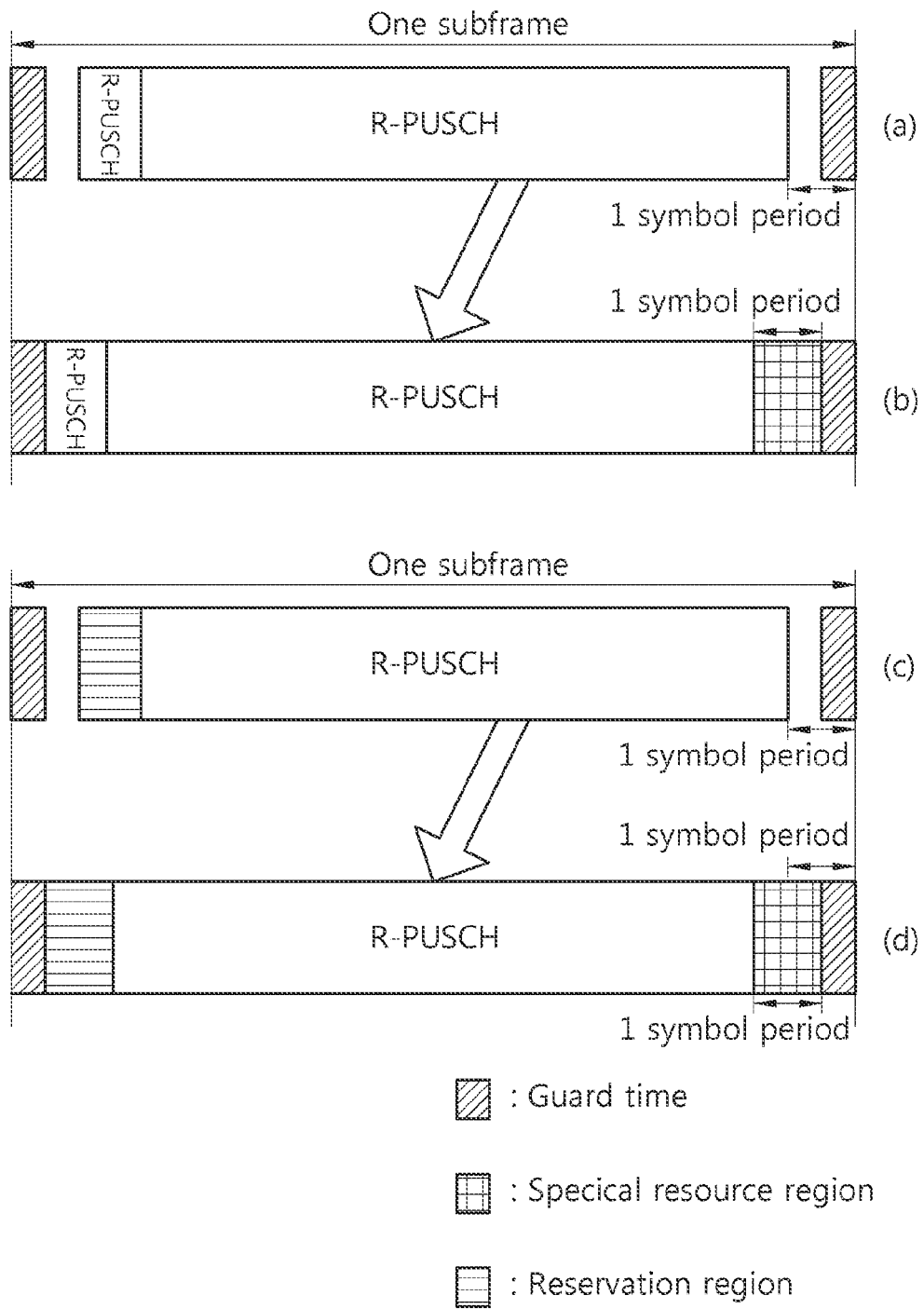
FIG. 40 shows a special resource region if guard time is placed in the first symbol and the last symbol of a shifting subframe. The guard time may be, for example, a ½ symbol.

FIG. 40 shows the special resource region if the guard time is placed in the first symbol and the last symbol of a shifting subframe. The guard time may be, for example, a ½ symbol.

FIG. 40(a) shows that an R-PUCCH and an R-PUSCH are transmitted in the non-shifting subframe, and FIG. 40(b) shows that an R-PUCCH and an R-PUSCH are transmitted in the shifting subframe. As shown in FIG. 40(b), in the shifting subframe, points of time at which the R-PUCCH and the R-PUSCH are transmitted are forward shifted, as compared with the non-shifting subframe. Consequently, additional radio resources (i.e., a special resource region) are generated prior to guard time placed in the last of the subframe. FIG. 40(c) and FIG. 40(d) show the non-shifting subframe and the shifting subframe in which the R-PUCCH is not transmitted. Like in FIG. 40(b), in FIG. 40(d), a special resource region is generated. The special resource region may be used to transmit the R-PUSCH or may be used for special purposes.

Figure 41:
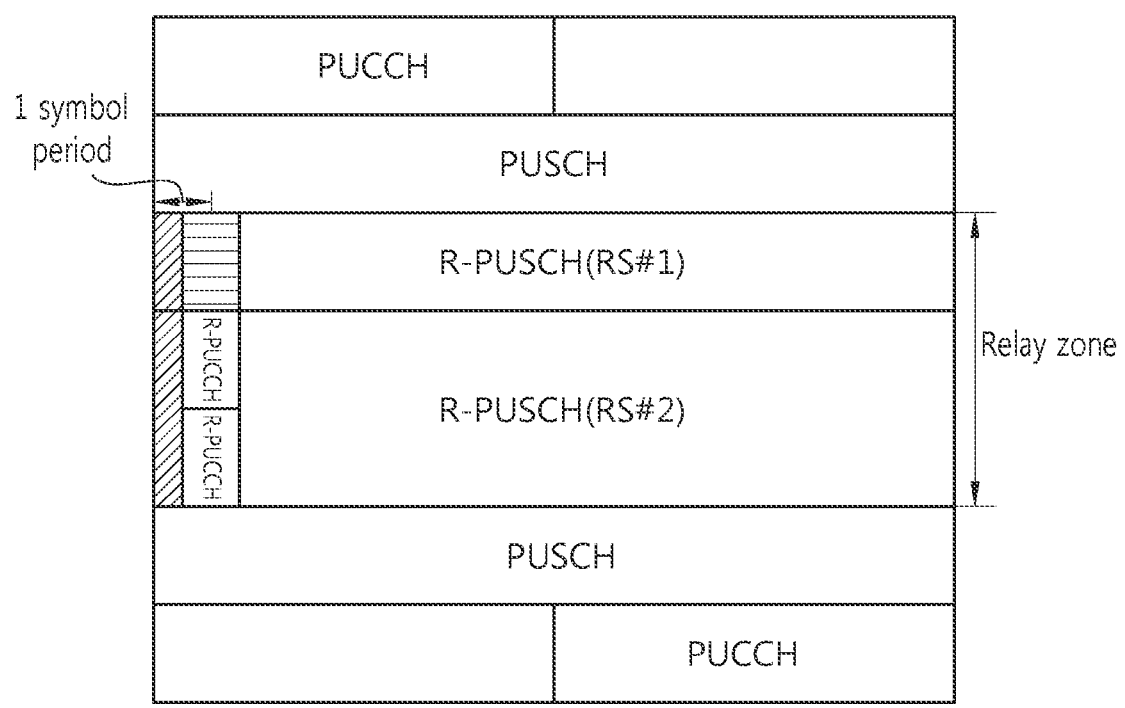
FIG. 41 shows a subframe structure in which an R-PUCCH and an R-PUSCH are subjected to TDM if guard time is placed only in the first symbol of a shifting subframe.

FIG. 41 shows a subframe structure in which an R-PUCCH and an R-PUSCH are subjected to TDM if the guard time is placed only in the first symbol of a shifting subframe.

The last symbol included in the relay zone may also be used because the guard time is placed only in the first symbol of the subframe. The relay zone is allocated to a specific frequency band between frequency bands in which PUCCHs are transmitted. The R-PUCCH and the R-PUSCH are subjected to TDM within the relay zone. The frequency bands may be distinguished from each other and allocated within the relay zone for every relay station. The R-PUCCH is not necessarily transmitted within the frequency band allocated to the relay station. For example, in FIG. 41, in case of a relay station 1 RS#1, the R-PUCCH is not transmitted, but only the R-PUSCH is transmitted in the allocated frequency band. In case of a relay station 2 RS#2, however, both the R-PUCCH and the R-PUSCH are transmitted in the allocated frequency band. If the R-PUCCH is not transmitted, relevant radio resources may be used to transmit the R-PUSCH. Alternatively, although the R-PUCCH is not actually transmitted, the relevant radio resources may remain for R-PUCCH transmission. For example, the relevant radio resources may remain for ACK/NACK transmission. Here, if a plurality of ACK/NACK has to be transmitted, radio resources may be subjected to CDM. A CCE index to which the R-PUCCH is allocated may be determined by the CCE index of the R-PDCCH.

The R-PUSCH may use a smaller number of symbols than that of a PUSCH owing to the guard time and the symbol in which the R-PUCCH is transmitted in the time domain. The number of symbols used in the R-PUSCH may be set to a specific number in order to reduce implementation complexity or a different number of symbols may be used for every relay station.

FIG. 41 is different from FIG. 39 in that the guard time is placed in the start portion of the subframe in the relay zone. Accordingly, there is an advantage in that a larger number of radio resources may be used as compared with the method described with reference to FIG. 39.

If the guard time is placed only in the start position of the shifting subframe, but not placed in the end position thereof, a relay station may have a problem in receiving a signal from a relay UE at the start position of a subsequent subframe in the shifting subframe.

Figure 42:
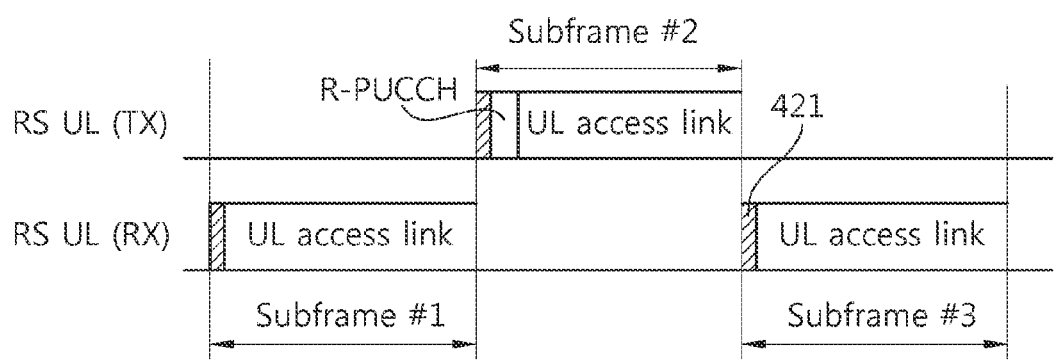
FIG. 42 shows an operation of a relay station transmitting and receiving signals in a series of shifting subframes in each of which the guard time is placed only in a first ½ symbol.

FIG. 42 shows an operation of a relay station transmitting and receiving signals in a series of shifting subframes in each of which the guard time is placed only in a first ½ symbol.

The relay station transmits a signal to a BS in a subframe #2 and receives a signal from a relay UE in a subframe #3. In this case, since the relay station cannot receive and decode a signal from the relay UE in a region 421 including the first ½ symbol of the subframe #3, access uplink performance may be degraded. Accordingly, the relay UE may puncture a symbol (i.e., the first ½ symbol of the subframe #3) on which the relay station cannot receive a signal and then transmit a signal or may perform rate matching and then transmit a signal (e.g., in case of an LTE-A UE). Alternatively, the relay UE may transmit a signal from the start position of the subframe #3 irrespective of whether the relay station can receive a signal (e.g., in case of the existing LTE UE). The relay station may attempt to receive a signal, transmitted by the existing LTE UE in the subframe #3, from the first symbol of the subframe #3 for backward compatibility and may receive and decode a signal, transmitted by an LTE-A UE, from a point of time at which the first ½ symbol of the subframe #3 has elapsed.

A method of a relay station transmitting an R-SRS to a BS in the subframe structure in which the R-PUCCH and the R-PUSCH are subjected to TDM, described with reference to FIGS. 37 to 42, is described below.

Figure 43:
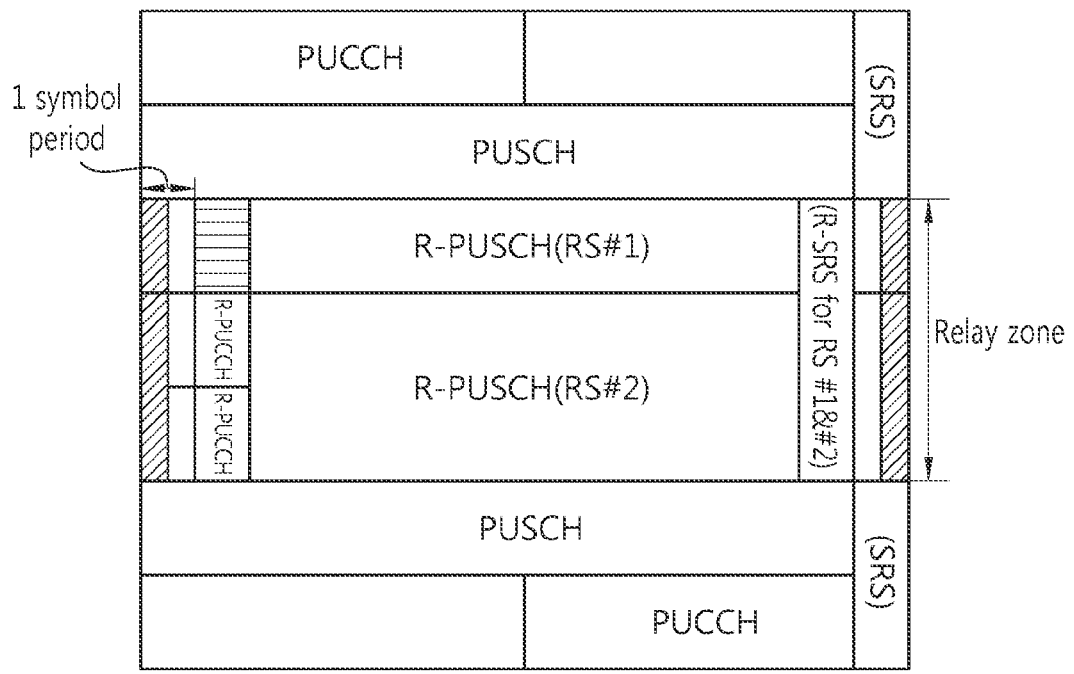
FIG. 43 shows an example in which an R-SRS is transmitted if guard time is placed in the first symbol and the last symbol of a non-shifting subframe.

FIG. 43 shows an example in which an R-SRS is transmitted if the guard time is placed in the first symbol and the last symbol of a non-shifting subframe.

The R-SRS may be transmitted in a band in which an R-PUSCH is transmitted in the frequency domain. The band in which the R-PUSCH is transmitted may be fixed or semi-statically allocated. The band in which the R-SRS is transmitted may be determined according to the band in which the R-PUSCH is transmitted. The band in which the R-SRS is transmitted does not overlap with the band in which an SRS is transmitted in the frequency band. The band in which the R-PUSCH is transmitted or the band in which the R-SRS is transmitted may be informed through a higher layer signal, such as RRC signaling or may be informed through a physical layer signal, such as a scheduling grant.

The R-SRS does not overlap with the SRS even in the time domain. For example, the R-SRS may be transmitted in the second symbol from the last of a subframe in the time domain. If the R-SRS is transmitted in the subframe, the number of symbols available for a relay station is reduced by 1. Accordingly, in the format of the R-PUSCH, one symbol may be punctured or subjected to rate matching.

Figure 44:
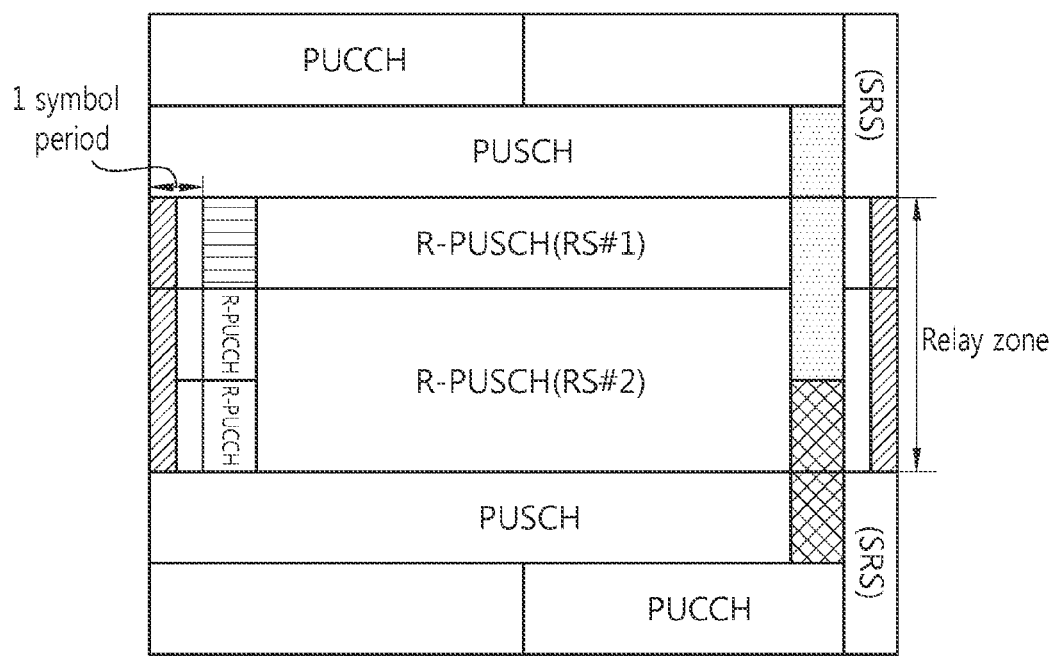
FIG. 44 shows another example in which an R-SRS is transmitted if guard time is placed in the first symbol and the last symbol of a non-shifting subframe.

FIG. 44 shows another example in which an R-SRS is transmitted if the guard time is placed in the first symbol and the last symbol of a non-shifting subframe.

The R-SRS may be transmitted in bands other than bands in which PUCCHs are transmitted in the frequency band in which an SRS can be transmitted. The R-SRS is not necessarily transmitted in a band identical with the band in which the R-PUSCH is transmitted. For example, in FIG. 44, a band in which a relay station 2 RS#2 transmits an R-PUSCH is not identical with a band in which the relay station 2 RS#2 transmits an R-SRS. That is, the R-SRS may overlap with the band in which the PUSCH is transmitted and then transmitted. In this case, the number of symbols available for the band in which the PUSCH is transmitted is reduced by 1. Accordingly, in the format of the PUSCH, one symbol may be punctured or subjected to rate matching. FIG. 44 is different from FIG. 43 in the frequency band in which the R-SRS can be transmitted.

Figure 45:
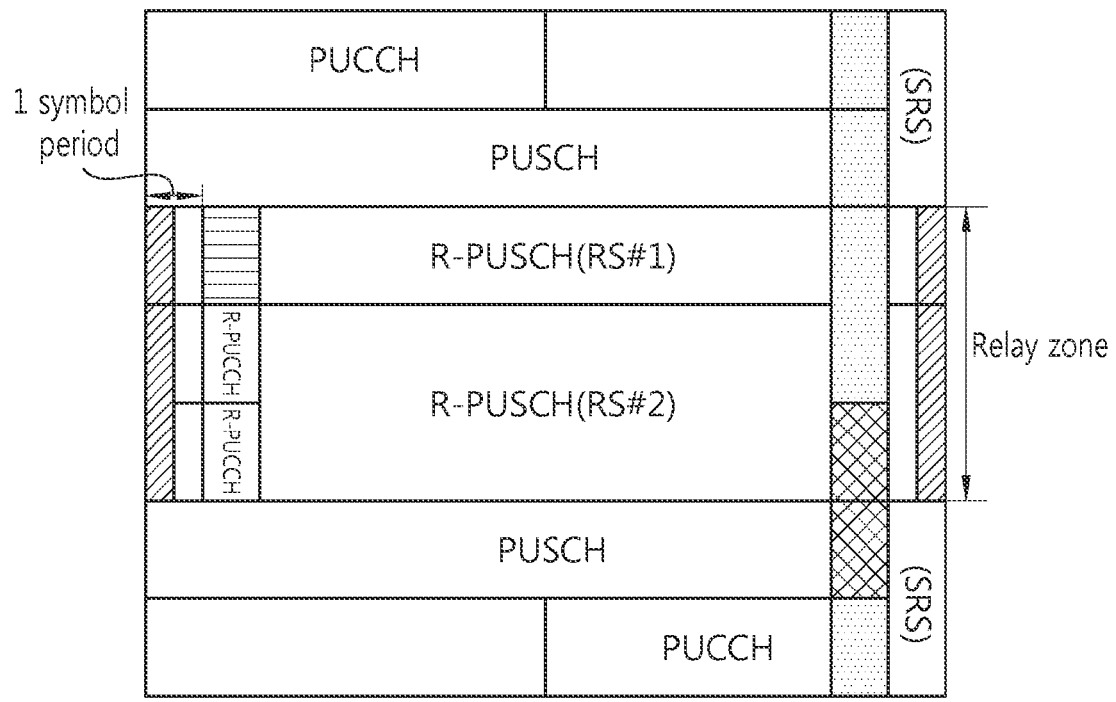
FIG. 45 shows yet another example in which an R-SRS is transmitted if guard time is placed in the first symbol and the last symbol of a non-shifting subframe.

FIG. 45 shows yet another example in which an R-SRS is transmitted if the guard time is placed in the first symbol and the last symbol of a non-shifting subframe.

FIG. 45 is different from FIG. 44 in that a band in which the R-SRS is transmitted is the entire system band. In this case, a PUSCH or a PUCCH transmitted by a macro UE may be influenced by the R-SRS. However, an influence on a wireless communication system is not great because the R-SRS is not frequently transmitted.

The method described with reference to FIGS. 43 to 45 may also be applied to a case where the guard time is placed only in the first symbol of the non-shifting subframe. If the guard time is placed only in the first symbol of the non-shifting subframe, the R-SRS is transmitted in the last symbol of the subframe.

Figure 46:
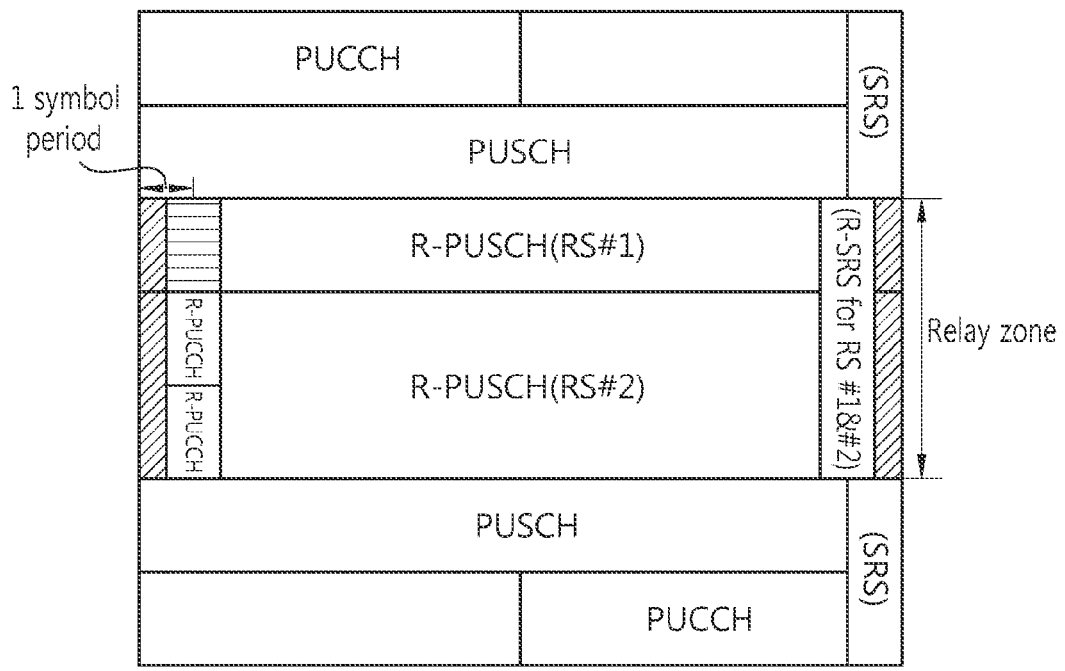
FIG. 46 shows an example in which an R-SRS is transmitted if guard time is placed in the first symbol and the last symbol of a shifting subframe.

FIG. 46 shows an example in which an R-SRS is transmitted if the guard time is placed in the first symbol and the last symbol of a shifting subframe.

FIG. 46 is different from FIG. 43 in that symbols included in the relay zone are forward shifted. A symbol on which the R-SRS is transmitted may be forward shifted by the guard time, as compared with a symbol on which an SRS is transmitted.

For example, if each guard time of the first symbol and the last symbol is a ½ symbol, symbols included in the relay zone are forward shifted by the ½ symbol. In case of a normal CP, the number of symbols included in the relay zone is 13.

Figure 47:
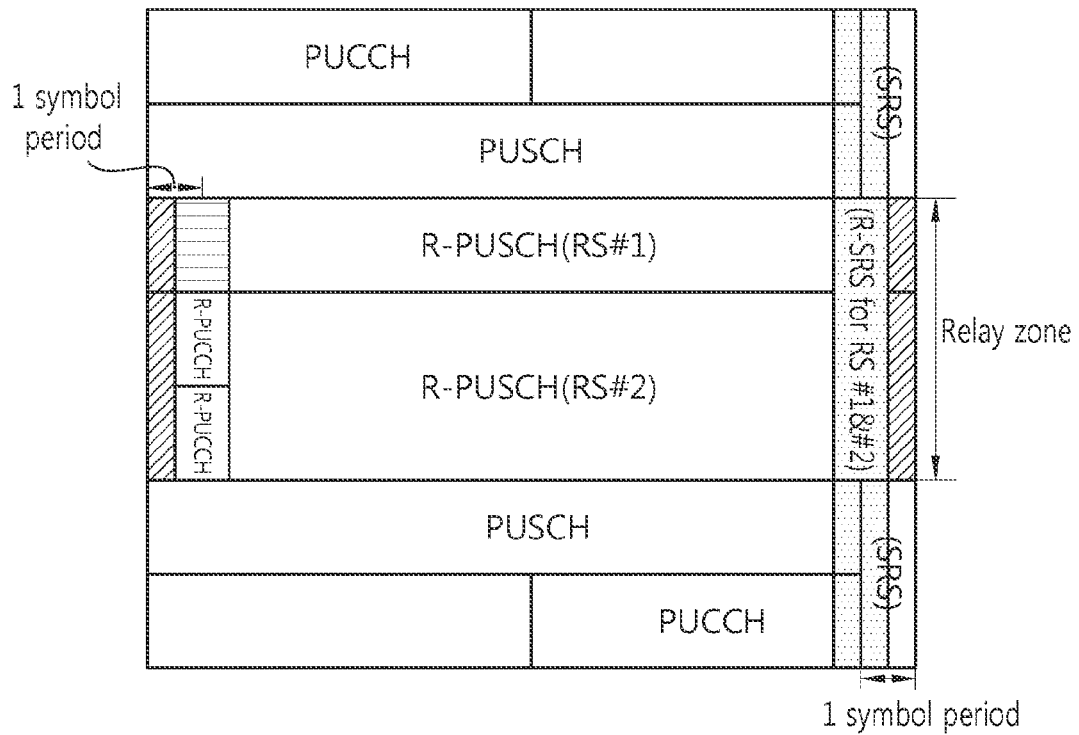
FIG. 47 shows an example in which an R-SRS is transmitted in the entire system band if guard time is placed in the first symbol and the last symbol of a shifting subframe.

FIG. 47 shows an example in which an R-SRS is transmitted in the entire system band if the guard time is placed in the first symbol and the last symbol of a shifting subframe.

A PUSCH or a PUCCH transmitted by a macro UE may be influenced because the R-SRS is transmitted in the entire system band. If the R-SRS is transmitted, the PUCCH, the PUSCH, and the R-PUSCH have to have one symbol punctured or subjected to rate matching. However, an influence on a wireless communication system is not great because the R-SRS is not frequently transmitted.

Figure 48:
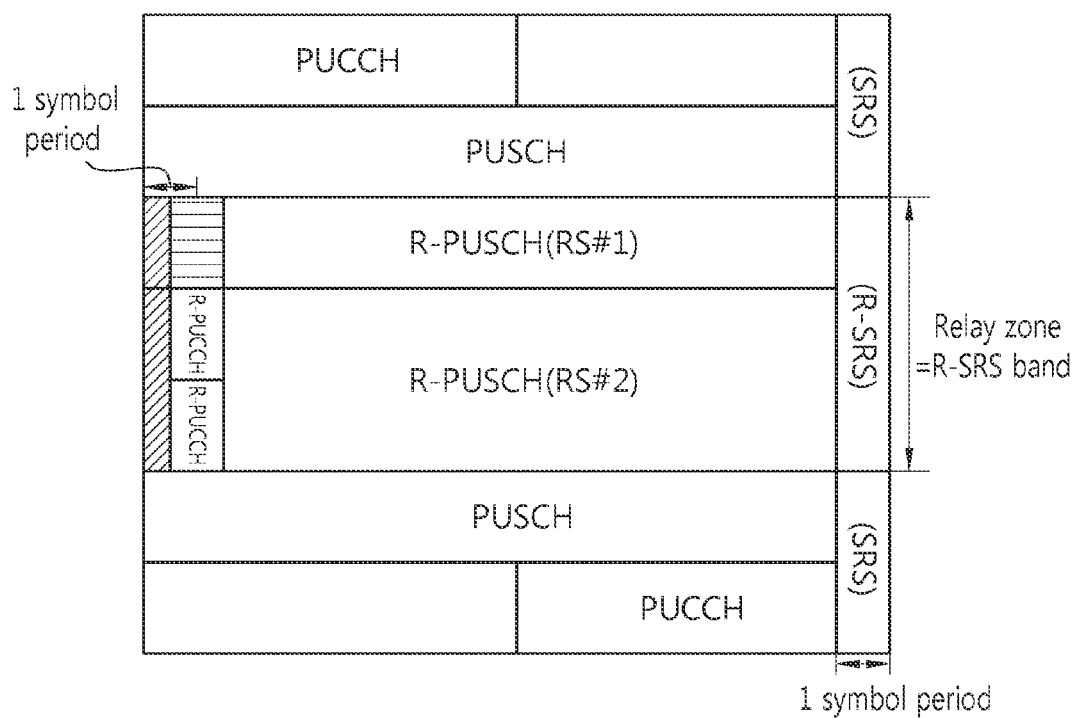
FIG. 48 shows an example in which an R-SRS is transmitted if guard time is placed only in the first symbol of a shifting subframe.

FIG. 48 shows an example in which an R-SRS is transmitted if the guard time is placed only in the first symbol of a shifting subframe.

Symbols included in the relay zone are more forward shifted than symbols included in the band in which a PUSCH is transmitted. However, the boundary of a symbol in which the R-SRS is transmitted in the relay zone is identical with the boundary of a symbol in which an SRS is transmitted. A frequency band in which the R-SRS is transmitted may be limited to the band in which the R-PUSCH is transmitted.

Figure 49:
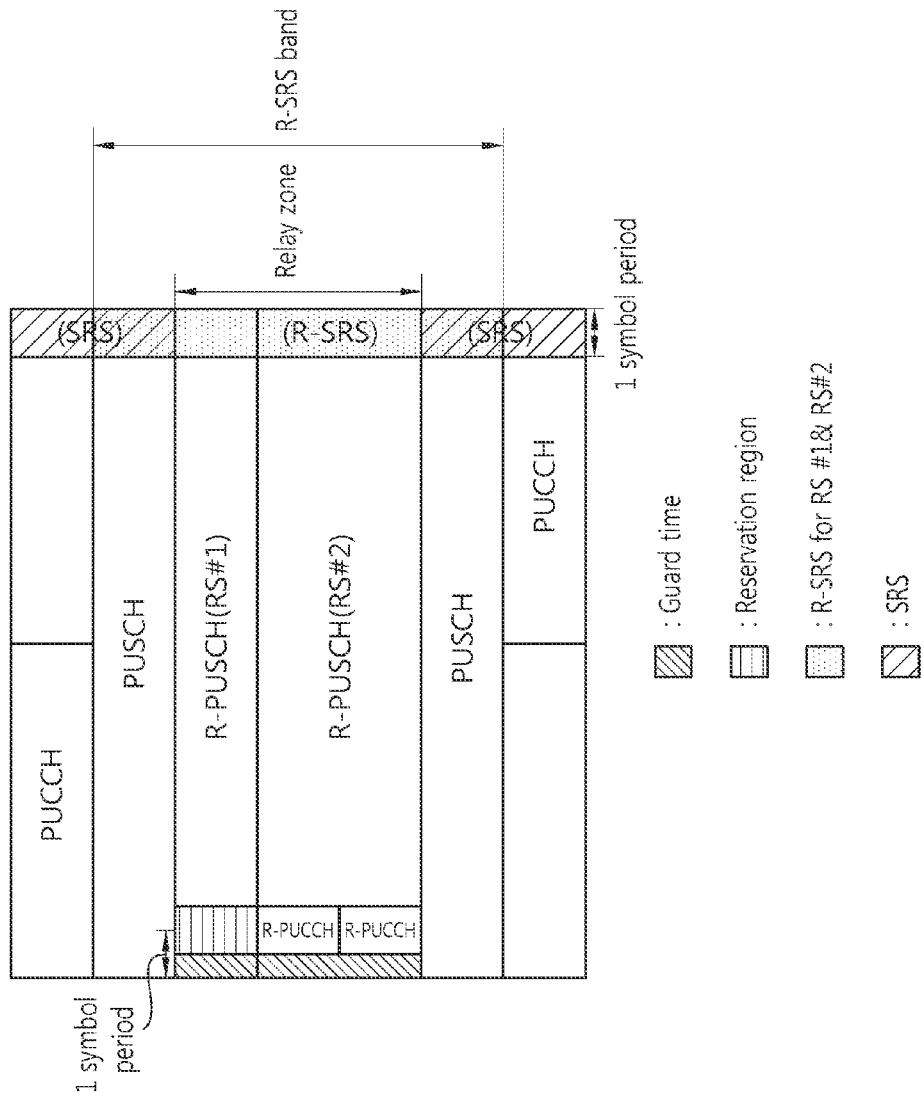
FIG. 49 shows another example in which an R-SRS is transmitted if guard time is placed only in the first symbol of a shifting subframe.

FIG. 49 shows another example in which an R-SRS is transmitted if the guard time is placed only in the first symbol of a shifting subframe.

FIG. 49 is different from FIG. 48 in that a frequency band in which the R-SRS can be transmitted includes bands other than bands in which PUCCHs are transmitted, from the entire system band. Accordingly, both the R-SRS and the SRS can be transmitted at the same time in some bands (e.g., the bands in which PUSCHs are transmitted).

Figure 50:
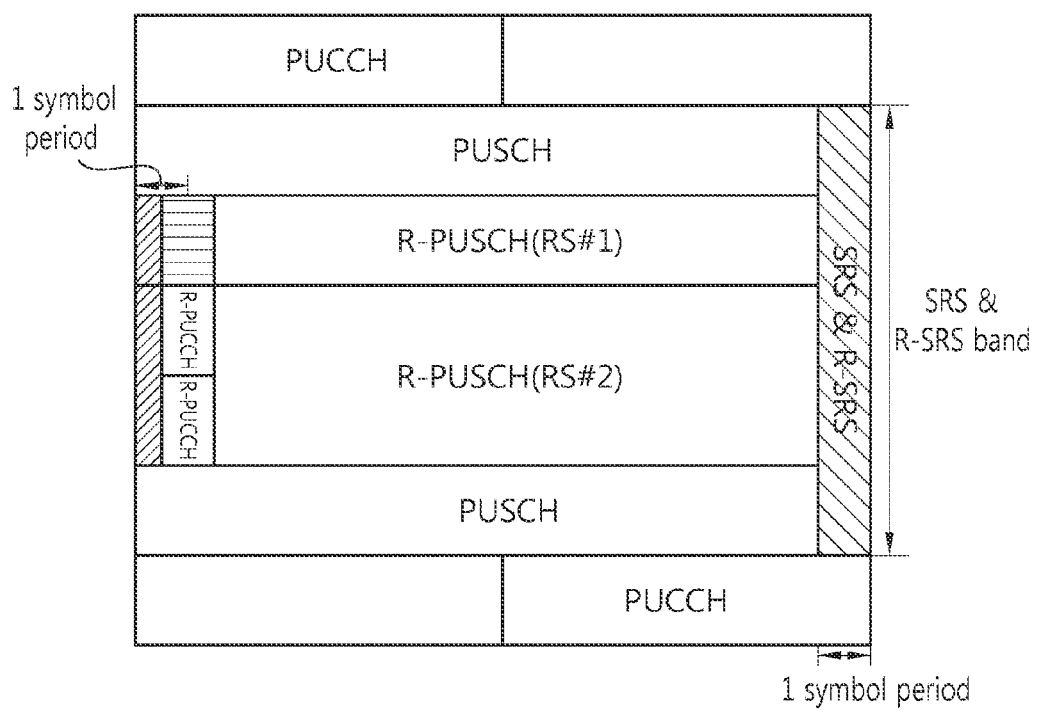
FIG. 50 shows yet another example in which an R-SRS is transmitted if guard time is placed only in the first symbol of a shifting subframe.

FIG. 50 shows yet another example in which an R-SRS is transmitted if the guard time is placed only in the first symbol of a shifting subframe.

FIG. 50 is the same as FIG. 49 in that a frequency band in which the R-SRS can be transmitted includes bands other than bands in which PUCCHs are transmitted, from the entire system band. However, FIG. 50 is different from FIG. 49 in that the R-SRS is multiplexed with the SRS and then transmitted in the band in which the R-SRS may be transmitted. The multiplexing method may use the 'transmission comb' method described with reference to FIG. 35. For example, the R-SRS and the SRS may be multiplexed so that the R-SRS can be transmitted through a subcarrier having an even index and the SRS can be transmitted through a subcarrier having an odd index, and vice versa.

Figure 51:
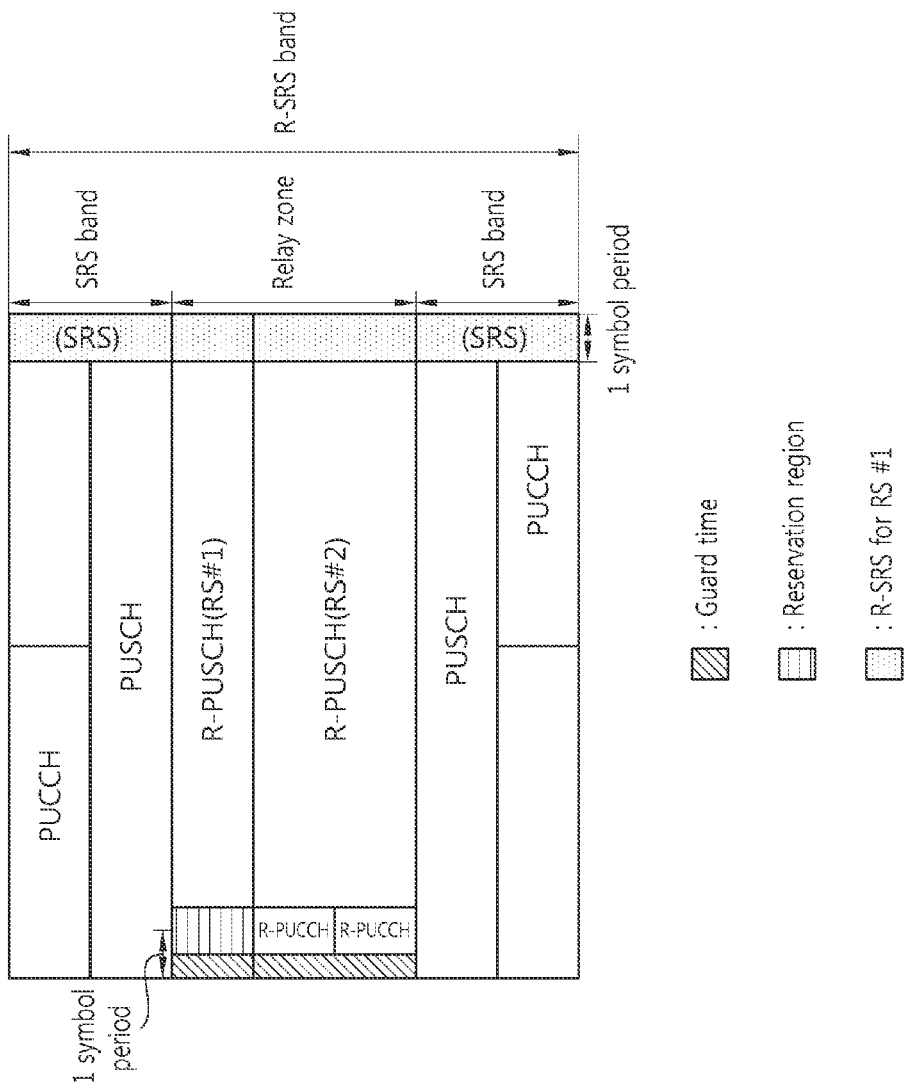
FIG. 51 shows still another example in which an R-SRS is transmitted if guard time is placed only in the first symbol of a shifting subframe.

FIG. 51 shows still another example in which an R-SRS is transmitted if the guard time is placed only in the first symbol of a shifting subframe.

FIG. 51 is different from FIG. 49 in that a frequency band in which the R-SRS can be transmitted is the entire system band. The R-SRS may be multiplexed with the SRS.

Figure 52:
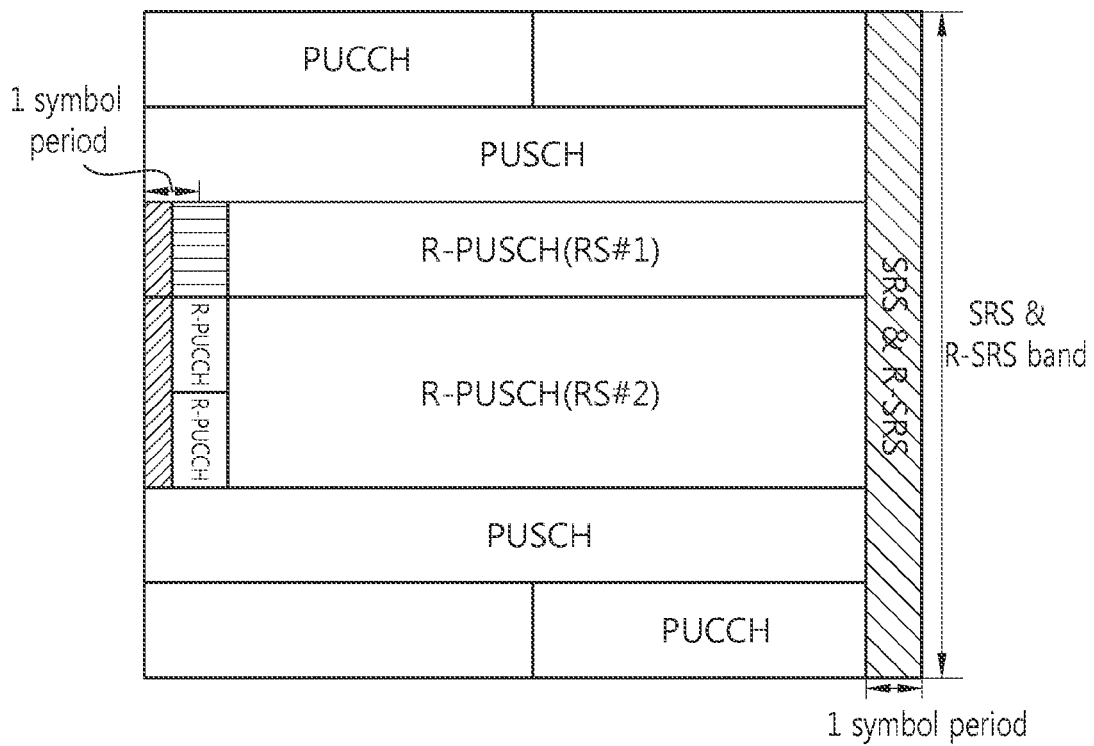
FIG. 52 shows further another example in which an R-SRS is transmitted if guard time is placed only in the first symbol of a shifting subframe.

FIG. 52 shows further another example in which an R-SRS is transmitted if the guard time is placed only in the first symbol of a shifting subframe.

FIG. 52 is the same as FIG. 51 in that a frequency band in which the R-SRS can be transmitted is the entire system band. However, FIG. 52 is different from FIG. 51 in that the R-SRS is multiplexed with the SRS and then transmitted in the band in which the R-SRS can be transmitted. The multiplexing method may use the 'transmission comb' method described with reference to FIG. 35.

Figure 53:
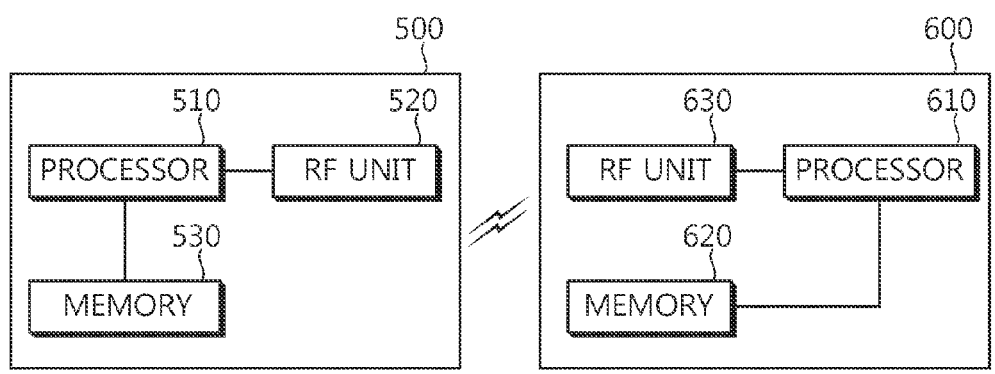
FIG. 53 is a block diagram showing a wireless communication system in which the embodiments of the present invention are implemented.

FIG. 53 is a block diagram showing a wireless communication system in which the embodiments of the present invention are implemented. A BS 500 includes a processor, 510, memory 530, and an RF (radio frequency) unit 520. The processor 510 performs scheduling for allocating radio resources to a relay station and receiving a signal from a relay station. In the above embodiments, the procedures, schemes, and functions performed by the BS may be implemented by the processor 510. The memory 530 is coupled to the processor 510 and configured to store various pieces of information for driving the processor 510. The RF unit 520 is coupled to the processor 510 and configured to transmit or receive or both a radio signal. The BS may become a source station or a destination station.

A relay station 600 includes a processor 610, memory 620, and an RF unit 630. The processor 610 transmits R-PUCCHs and R-PUSCHs through radio resources allocated thereto. In the above embodiments, the procedures, schemes, and functions performed by the relay station may be implemented by the processor 610. The memory 620 is coupled to the processor 610 and configured to store various pieces of information for driving the processor 610. The RF unit 630 is coupled to the processor 610 and configured to transmit or receive or both a radio signal. The relay station may become a source station or a destination station.

The processor 510, 610 may include ASICs (Application-Specific Integrated Circuits, other chipsets, logic circuits, and/or data processors. The memory 530, 620 may include ROM (Read-Only Memory), RAM (Random Access Memory), flash memory, memory cards, storage media and/or other storage devices. The RF unit 520, 630 may include a baseband circuit for processing a radio signal. When the above-described embodiment is implemented in software, the above-described scheme may be implemented using a module (process or function) which performs the above function. The module may be stored in the memory 530, 620 and executed by the processor 510, 610. The memory 530, 620 may be placed inside or outside the processor 510, 610 and connected to the processor 510, 610 using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

Although the some embodiments of the present invention have been described above, a person having ordinary skill in the art will appreciate that the present invention may be modified and changed in various ways without departing from the technical spirit and scope of the present invention. Accordingly, the present invention is not limited to the embodiments and the present invention may be said to include all embodiments within the scope of the claims below.

The invention claimed is:

1. A method of a relay station transmitting a signal in a wireless communication system, the method comprising:

receiving, by the relay station, a parameter distinguishing a first subcarrier set used for a relay-sounding reference signal (R-SRS) from a second subcarrier set used for a sounding reference signal (SRS);

placing, by the relay station, a guard time in a subframe including a plurality of symbol periods in a time domain; and transmitting, by the relay station, a control signal or data to a base station using symbol periods other than a symbol period which includes the guard time in the subframe, wherein the guard time is equal to or shorter than one symbol period, and wherein, when the subframe is configured to transmit a relay-sounding reference signal (R-SRS), if the guard time is placed only in a first symbol period of the subframe and if the parameter indicates the first subcarrier set, the R-SRS and the SRS are multiplexed in a whole system frequency band, the R-SRS and the SRS are transmitted through a last symbol period of the subframe in a time domain, R-SRS is transmitted via the last symbol through subcarriers having an odd index, and the SRS is transmitted from a macro user equipment to the base station via the last symbol through subcarriers having an even index, and if the guard time is placed both in the first symbol period and in the last symbol period of the subframe, the R-SRS is transmitted through a second to last symbol period of the subframe in a time domain and the R-SRS is transmitted only in a frequency band used for a transmission of the data.

2. The method of claim 1, wherein the R-SRS is transmitted only in a frequency band in which the data is transmitted or a frequency band in which the control signal and the data are transmitted.

3. The method of claim 1, wherein, if the guard time is placed only in a first symbol period of the subframe, the guard time placed in the first symbol period is a ½ symbol period.

4. The method of claim 1, wherein a boundary of symbol periods in a frequency band in which the control signal or the data is transmitted is shifted by the guard time from a boundary of symbol periods in a frequency band in which a user equipment transmits a control signal or data to the base station.

5. The method of claim 1, wherein the relay station transmits the control signal and the data in an identical frequency band, but transmits the control signal and the data by performing TDM (Time Division Multiplexing) for the control signal and the data in a time domain.

6. A signal transmission apparatus of a relay station, comprising:

a radio frequency unit configured to transmit and receive a radio signal; and a processor coupled to the radio frequency unit, wherein the processor is configured to receive a parameter distinguishing a first subcarrier set used for a relay-sounding reference signal (R-SRS) from a second subcarrier set used for a sounding reference signal (SRS), place a guard time within a subframe including a plurality of symbol periods in a time domain, and transmit a control signal or data to a base station using symbol periods other than a symbol period which includes the guard time in the subframe, wherein the guard time is equal to or shorter than one symbol period, and wherein, when the subframe is configured to transmit a relay-sounding reference signal (R-SRS), if the guard time is placed only in a first symbol period of the subframe and if the parameter indicates the first subcarrier set, the R-SRS and the SRS are multiplexed in a whole system frequency band, the R-SRS and the SRS are transmitted through a last symbol period of the subframe in a time domain, the R-SRS is transmitted through subcarriers having an odd index and the SRS is transmitted from a macro user equipment to the base station through subcarriers having an even index, and if the guard time is placed both in the first symbol period and in the last symbol period of the subframe, the R-SRS is transmitted through a second to last symbol period of the subframe in a time domain and the R-SRS is transmitted only in a frequency band used for a transmission of the data.

* * * * *